(12) United States Patent
Islam et al.

(10) Patent No.: US 10,361,968 B2
(45) Date of Patent: Jul. 23, 2019

(54) SYSTEM AND METHOD FOR SERVICE EXPIRATION IN A CLOUD PLATFORM ENVIRONMENT

(71) Applicant: ORACLE INTERNATIONAL CORPORATION, Redwood Shores, CA (US)

(72) Inventors: Nazrul Islam, Santa Clara, CA (US); Rajiv Mordani, Sunnyvale, CA (US); Byron Nevins, Pacifica, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 14/478,321

(22) Filed: Sep. 5, 2014

(65) Prior Publication Data
US 2015/0089067 A1    Mar. 26, 2015

Related U.S. Application Data

(60) Provisional application No. 61/880,784, filed on Sep. 20, 2013.

(51) Int. Cl.
| | |
|---|---|
| *G06F 8/60* | (2018.01) |
| *G06F 9/50* | (2006.01) |
| *H04L 12/911* | (2013.01) |
| *H04L 12/24* | (2006.01) |

(52) U.S. Cl.
CPC .............. *H04L 47/741* (2013.01); *G06F 8/60* (2013.01); *G06F 9/50* (2013.01); *G06F 9/5072* (2013.01); *H04L 41/5045* (2013.01); *H04L 47/78* (2013.01); *G06F 2209/504* (2013.01); *Y02D 10/22* (2018.01)

(58) Field of Classification Search
None
See application file for complete search history.

(56) References Cited

U.S. PATENT DOCUMENTS

| | | |
|---|---|---|
| 7,185,142 B2 | 2/2007 | Yagi |
| 8,495,197 B1 | 7/2013 | Nagargadde et al. |
| 8,635,351 B2 | 1/2014 | Astete |
| 2007/0022203 A1 | 1/2007 | Haberkorn et al. |

(Continued)

OTHER PUBLICATIONS

Office Action issued by United States Patent and Trademark Office for U.S. Appl. No. 14/478,331, dated Feb. 26, 2016, 7 pages.

(Continued)

*Primary Examiner* — Sargon N Nano
*Assistant Examiner* — Christopher B Robinson
(74) *Attorney, Agent, or Firm* — Tucker Ellis LLP

(57) ABSTRACT

In accordance with an embodiment, described herein is a system and method for providing service expiration in a cloud computing environment. In accordance with an embodiment, the system includes a plurality of services which can be used by applications within the cloud environment, wherein the services can be associated with and utilize resources within the cloud environment. A service expiration component associates reservations with the services, periodically determines a status of the reservations and of any expired services associated therewith, and instructs the system to release the resources of expired services, for use by other services.

20 Claims, 29 Drawing Sheets

(56) References Cited

U.S. PATENT DOCUMENTS

| | | |
|---|---|---|
| 2009/0133051 A1 | 5/2009 | Hildreth |
| 2010/0325624 A1 | 12/2010 | Bartolo et al. |
| 2011/0184990 A1 | 7/2011 | Murphy |
| 2011/0213870 A1 | 9/2011 | Cai et al. |
| 2012/0072762 A1* | 3/2012 | Atchison ............... G06F 9/5072 714/2 |
| 2012/0084165 A1* | 4/2012 | Hirose ................... G06Q 10/02 705/26.1 |
| 2012/0089971 A1 | 4/2012 | Williams et al. |
| 2012/0102103 A1* | 4/2012 | Jacobson ............ G06F 9/45533 709/204 |
| 2012/0144044 A1 | 6/2012 | Verma |
| 2012/0179824 A1* | 7/2012 | Jackson ................ G06F 9/5027 709/226 |
| 2013/0073667 A1* | 3/2013 | Mukkara ............... G06F 9/5061 709/213 |
| 2013/0191542 A1* | 7/2013 | Matczynski .......... G06F 9/5022 709/226 |
| 2013/0311778 A1* | 11/2013 | Cherukuri ........... H04L 63/0272 713/171 |
| 2014/0172954 A1* | 6/2014 | Salsburg ................. H04L 67/10 709/203 |
| 2014/0173694 A1 | 6/2014 | Kranz |
| 2014/0201732 A1 | 7/2014 | Haag et al. |
| 2014/0215509 A1 | 7/2014 | Angiolillo |
| 2014/0215590 A1 | 7/2014 | Brand |
| 2014/0359552 A1 | 12/2014 | Misra et al. |
| 2014/0379924 A1* | 12/2014 | Das ........................ H04L 47/72 709/226 |
| 2015/0019735 A1 | 1/2015 | Pogrebinsky |
| 2015/0067128 A1 | 3/2015 | Naseh et al. |
| 2015/0135281 A1 | 5/2015 | Peddada |
| 2015/0237498 A1 | 8/2015 | Freedman et al. |
| 2016/0019636 A1 | 1/2016 | Adapalli et al. |
| 2016/0132252 A1* | 5/2016 | Bish ...................... G06F 3/0652 711/159 |

OTHER PUBLICATIONS

Office Action issued by United States Patent and Trademark Office for U.S. Appl. No. 14/476,578, dated Mar. 10, 2016, 19 pages.
Office Action issued by United States Patent and Trademark Office for U.S. Appl. No. 14/476,581, dated Mar. 10, 2016, 18 pages.
Office Action issued by United States Patent and Trademark Office for U.S. Appl. No. 14/747,718, dated Aug. 25, 2016, 28 pages.
Office Action issued by United States Patent and Trademark Office for U.S. Appl. No. 14/478,331, dated Jul. 28, 2016, 7 pages.
Office Action issued by United States Patent and Trademark Office for U.S. Appl. No. 14/576,578, dated Jun. 29, 2016, 29 pages.
Office Action issued by United States Patent and Trademark Office for U.S. Appl. No. 14/476,581, dated Jun. 30, 2016, 25 pages.
United States Patent and Trademark Office, Office Action dated Mar. 29, 2018 for U.S. Appl. No. 14/478,331, 10 Pages.
United States Patent and Trademark Office, Office Action dated Nov. 15, 2017 for U.S. Appl. No. 14/476,578, 63 Pages.
United States Patent and Trademark Office, Office Action dated Nov. 16, 2017 for U.S. Appl. No. 14/476,581, 53 Pages.
United States Patent and Trademark Office, Office Action dated Dec. 27, 2016 for U.S. Appl. No. 14/478,331, 12 Pages.
United States Patent and Trademark Office, Office Action dated Feb. 24, 2017 for U.S. Appl. No. 14/476,578, 58 Pages.
United States Patent and Trademark Office, Office Action dated Mar. 13, 2017 for U.S. Appl. No. 14/476,581, 56 Pages.
United States Patent and Trademark Office, Office Action dated Dec. 27, 2018 for U.S. Appl. No. 14/478,331, 15 Pages.

* cited by examiner

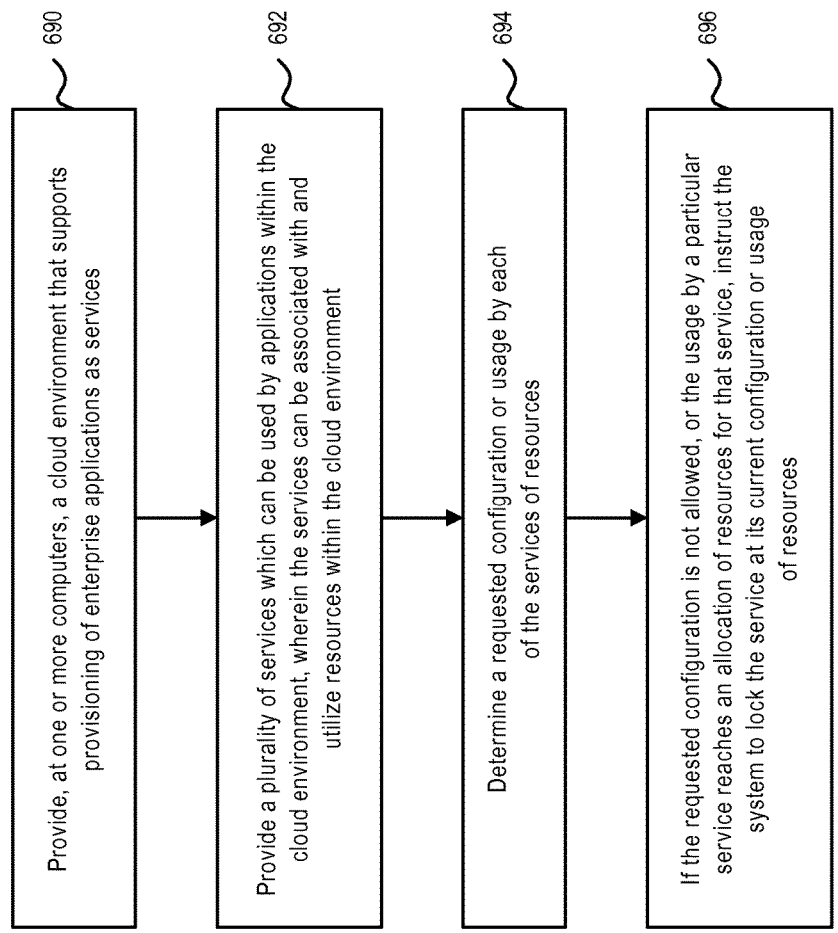

SYSTEM AND METHOD FOR SERVICE EXPIRATION IN A CLOUD PLATFORM ENVIRONMENT

CLAIM OF PRIORITY

This application claims the benefit of priority to U.S. Provisional application titled "SYSTEM AND METHOD FOR SERVICE EXPIRATION, LOCKING, QUOTA, AND OTHER FUNCTIONALITY IN A CLOUD PLATFORM ENVIRONMENT", Application No. 61/880,784, filed Sep. 20, 2013, which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to cloud computing, and providing of services within such environments, and are particularly related to a system and method for providing service expiration in a cloud environment.

BACKGROUND

A cloud computing environment enables responsibilities which previously may have been provided by an organization's own information technology department, to be delivered as service layers within a cloud environment, for use by consumers that are either internal (i.e., private) or external (i.e., public) to the organization. The resources of a cloud environment are typically shared by multiple users, for example, in the case of a multitenant environment by the multiple tenants in that environment, to run services. In such an environment, it is useful to be able manage the use of those services that will! utilize resources, in particular when a service is no longer needed by a user or tenant, or if the service will consume too many resources.

SUMMARY

In accordance with an embodiment, described herein is a system and method for providing service expiration in a cloud computing environment. In accordance with an embodiment, the system includes a plurality of services which can be used by applications within the cloud environment, wherein the services can be associated with and utilize resources within the cloud environment. A service expiration component associates reservations with the services, periodically determines a status of the reservations and of any expired services associated therewith, and instructs the system to release the resources of expired services, for use by other services.

BRIEF DESCRIPTION OF THE FIGURES

FIG. 29 is a flowchart of a method of supporting service locking in a cloud environment, in accordance with an embodiment.

DETAILED DESCRIPTION

In accordance with an embodiment, a cloud computing environment enables responsibilities which previously may have been provided by an organization's own information technology department, to be delivered as service layers within a cloud environment, for use by consumers that are either internal (i.e., private) or external (i.e., public) to the organization. Described herein are a variety of hardware and/or software components and features, which can be used in delivering an infrastructure, platform, and/or applications to support cloud computing.

Figure 1:
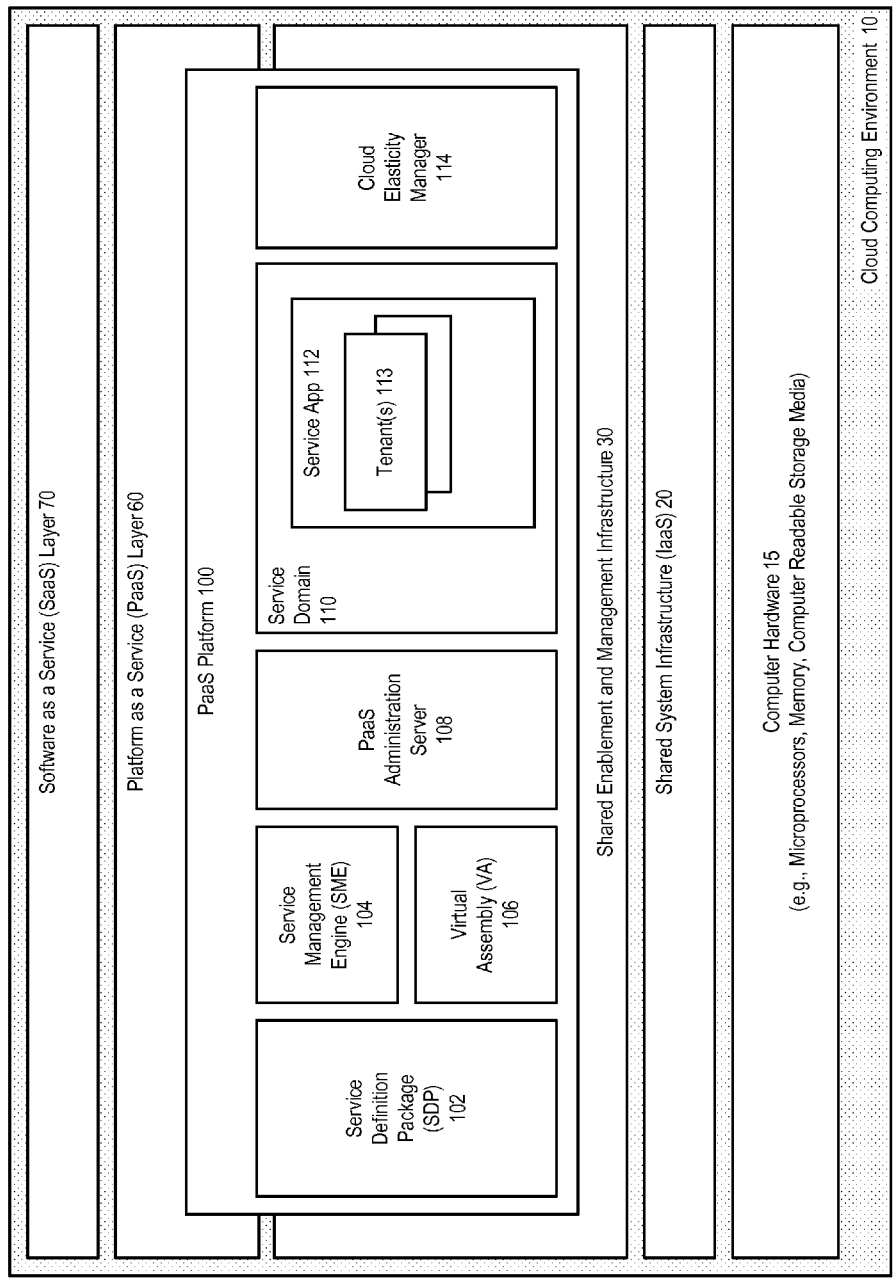
FIG. 1 illustrates a system which can utilize a hybrid service management engine plugin, in accordance with an embodiment.

FIG. 1 illustrates an example of a cloud computing environment, in accordance with an embodiment. As shown in FIG. 1, a cloud computing environment (referred to herein in some embodiments as a cloud environment, or cloud) 10 can generally include a combination of one or more Infrastructure as a Service (IaaS) 20, Platform as a Service (PaaS) 60, and/or Software as a Service (SaaS) 70 layers, which can be delivered as service layers within the cloud environment. The cloud environment can be implemented as a system that includes a computer hardware 15, such as one or more conventional general purpose or specialized digital computers, computing devices, machines, microprocessors, memory and/or computer readable storage media.

In accordance with an embodiment, each of the IaaS, PaaS, and/or SaaS layers can generally include a variety of components. For example, in accordance with an embodiment, the IaaS layer can include a shared database hardware (e.g., an Exadata machine), and/or shared application server hardware (e.g., an Exalogic machine); while the PaaS layer can include one or more PaaS services, such as a database service, application server service, and/or WebCenter service; and the SaaS layer can include various SaaS services, such as enterprise applications (e.g., Oracle Fusion SaaS), and/or ISV or custom applications. The cloud environment can also include a shared enablement and managing infrastructure 30, which provides enablement and management tools that support the various service layers, for example, identity management, virtual assembly builder, system provisioning, tenant management, or other components.

In accordance with an embodiment, the cloud environment can include a PaaS platform component 100 (referred to herein in some embodiments as a PaaS platform, or CloudLogic), which enables the provisioning of enterprise software applications within the environment. For example, the PaaS platform can be provided as an installable software suite that provides a self-service provisioning experience for enterprise applications such as Fusion Middleware (FMW).

As shown in FIG. 1, in accordance with an embodiment, the PaaS platform can include one or more service definition package (SDP) 102, service management engine (SME) 104, virtual assembly (VA) 106, PaaS administration server 108, service domain 110 including one or more service applications (apps) 112 for use by one or more cloud accounts or tenants 113, and/or elasticity manager 114 components.

The example shown in FIG. 1 is provided as an illustration of an exemplary cloud environment and PaaS platform. In accordance with other embodiments, different and/or other types or arrangements of components can be included.

In accordance with an embodiment, the following terms are used herein.

PaaS Platform Component (PaaS Platform, Platform, CloudLogic): In accordance with an embodiment, a PaaS platform component is an installable software suite that provides a self-service provisioning experience for enterprise applications, such as FMW or other enterprise applications.

Site: In accordance with an embodiment, a site is the entity created and configured by the Platform Administrator from a PaaS platform installation, which tenants and Platform Administrators interact with to perform the various operations in the platform. In accordance with an embodiment, a site can be implemented as a WebLogic domain.

Tenant: In accordance with an embodiment, a tenant (referred to herein in some embodiments as an account) is an entity that is associated with users that consume the platform as a service, and establishes an administrative scope that administrators use to access PaaS services. For example, a tenant can be created for an organization, department, or group. Roles such as Tenant Administrator can be associated with a tenant; and quotas can be assigned to a tenant. A tenant can create one or more environments, and have one or more sub-tenants. Consumed resources, such as services with their virtual machines, databases, DNS entries, load balancer and other configurations, can be associated with a tenant.

Sub-tenant: In accordance with an embodiment, a sub-tenant is an entity that exists under a tenant. A sub-tenant has a quota assigned from the overall tenant's quota. For example, a tenant can have one or more sub-tenants, and the Tenant Administrator can assign a quota from the overall tenant quota to each sub-tenant. A sub-tenant can create one or more environments.

Service Definition Package: In accordance with an embodiment, a service definition package (SDP) is a package that contains the information necessary for a particular type of service to be offered by the PaaS platform. For example, each type of FMW service can provide its own SDP. An SDP can contain custom code that is installed into the cloud platform, and a virtual assembly that contains the topology and configuration of a set of virtual appliances that will comprise a running instance of the service, upon being deployed onto a set of virtual machines (VMs).

Service Management Engine: In accordance with an embodiment, a service management engine (SME) provides a generic means to plug any service type into the system. For example, an SME takes care of the service-specific provisioning, lifecycle, management, and monitoring support for a service type or provider type.

Service Type: In accordance with an embodiment, a service type is a representation of software functionality that can be instantiated within the PaaS platform site for a tenant. A service type is created based on an SDP, with additional configuration information supplied by the Platform Administrator. Some of this configuration information may supply values that are specific to an installation of the PaaS platform product or the enterprise in which it is running; while some configuration information may reflect the Platform Administrator's choices of options supported by the SDP. Multiple service types can be created from a single SDP, by making different configuration choices.

Environment: In accordance with an embodiment, an environment is a collection of services and their associated providers that are managed together as a group. An environment can be created for the purpose of running an application or providing some higher level service. Environments provide the ability to operate on the collection of services as a whole, with operations such as start, stop, backup, and destroy. An environment provides the functions of an association group, and a management group.

Service: In accordance with an embodiment, a service is an instantiation of a service type. An environment can be associated with multiple services; and within a particular tenant there can be one or more environments with multiple services for a single service type. Typically, a service provides both a service administration interface, and an end-user interface. A service can be associated with identity, database, or other service features that are required by the service; and with a service runtime that runs on one or more VMs.

Provider Type: In accordance with an embodiment, a provider type is a special form of service type that supports providers instead of services. Provider types are created by the Platform Administrator in the same way as service types. As with service types, a provider type is created based on an SDP, with additional configuration information supplied by the Platform Administrator. Some of this configuration information may supply values that are specific to this installation of the PaaS platform product or the enterprise in which it is running; while some configuration information may reflect the Platform Administrator's choices of options supported by the SDP. Multiple provider types can be created from a single SDP, by making different configuration choices.

Provider: In accordance with an embodiment, a provider is a specialization of a service. Unlike services, which are created by explicit action of a Tenant Administrator, providers are created on-demand to satisfy the dependencies of services. A provider is an instantiation of a provider type, and represents the use of the resource managed by the provider type by a particular instance of a service type. Services can be associated with multiple providers. When creating a service, an orchestration engine matches the requirements of a service type with the capabilities of the configured provider types, and then requests the service type to create an instance of a service, and the provider types to create instances of the providers for use by this instance of the service. The orchestration engine then associates the service with the providers.

Association Resource: In accordance with an embodiment, an association resource (sometimes referred to as a provider resource) enables a service to keep track of configuration information for a particular association. For example, if a Java Service is associated with two different database providers, it may need to create a connection pool for each database. The association resource enables the Java Service to keep track of which connection pool is associated with which database, so that, if the orchestration engine needs to change one of the associations, the Java Service will know which connection pool to change.

Runtime: In accordance with an embodiment, a runtime is a representation of the installed and operational software that provides the functionality of a service or a provider. Runtimes are managed by the custom code included in an SDP, in some instances using facilities provided by the PaaS platform, such as its virtualization and provisioning support. Runtimes can be layered, with each layer being shared (multi-tenant), or not shared (dedicated). For example, with a Java Service, the runtime layers may include an application server, a Java virtual machine (JVM), a guest operating system (OS), and a host operating system. When unqualified, the expression "service runtime" generally refers to the top-most layer. For example, a multi-tenant service runtime is a runtime that is shared by multiple services; while a dedicated service runtime is a runtime that is not shared among multiple services.

Service Resource Type: In accordance with an embodiment, a service resource type is a special form of service type that supports service resources instead of services. Service resource types are created by the Platform Administrator in the same way as service types. As with service types, a service resource type is created based on an SDP, with additional configuration information supplied by the Platform Administrator. Multiple service resource types can be created from a single SDP, by making different configuration choices.

Service Resource: In accordance with an embodiment, a service resource is a specialization of a service. Unlike services, which are created by explicit action of a Tenant Administrator, and providers which are created on-demand to satisfy the dependencies of services, service resources are associated with services to satisfy the dependencies of artifacts/applications deployed to services. A service resource can be associated, or disassociated, with a service after the service has been created. A service resource dependency of a service is optional and may be configured by the Platform or Tenant Administrator based on the needs of the artifacts/applications that would be deployed to the service. For example, a service may indicate support for multiple kinds of service resource dependencies; and the Platform or Tenant Administrator may associate multiple service resources for a dependency. A service resource is an instantiation of a service resource type, and represents the use of the infrastructure managed by the service resource type, by a particular instance of a service type. A Service can be associated with one or more service resources. The association of a service to a service resource can happen at any time in the lifecycle of the service, once the service and service resource have been created.

Quota: In accordance with an embodiment, a quota provides a mechanism to limit consumption of a resource, by establishing an upper bound on the resource usage. Examples of quota-controlled resources include CPU, disk, and the number of VMs in use. PaaS layer quotas can also be supported, for example the number of services that can be provisioned. Quotas can be assigned to tenants, and a Tenant Administrator can allocate their quota to projects or groups which they manage.

Namespaces: In accordance with an embodiment, the PaaS platform can use a naming hierarchy, such as a Nimbula-style naming hierarchy and multipart naming scheme. There can be reserved namespaces for SDPs, service-types, provider-types, service-resource-types, service-resources, environments, and services. Namespaces can be defined and reserved at the global level, and per tenant.

Platform Administrator/System Administrator (Role): In accordance with an embodiment, a Platform or System Administrator is responsible for installing, configuring, managing, and maintaining the PaaS platform infrastructure and environment, including the resources that are made available to applications running in the environment. The Platform or System Administrator is also responsible for downloading and installing SDPs to support additional service types, setting up or configuring virtualization technology for the platform to use, and installing and configuring providers.

Cloud Account Administrator (Role): In accordance with an embodiment, a Cloud Account Administrator is responsible for the provisioning of new services, management of generic service properties such as their Quality of Service (QoS) settings and their associations, and the locking and termination of services. A Cloud Account Administrator can assign Service Administrators for each service.

Tenant Administrator (Role): In accordance with an embodiment, a Tenant Administrator is responsible for creating sub-tenants and assigning Tenant Administrator to the sub-tenant groups, and for the provisioning of new services, management of generic service properties, and the locking and termination of services. A Tenant Administrator can assign Service Administrators for each service.

Service Administrator (Role): In accordance with an embodiment, a Service Administrator is responsible for administering and managing a specific service after it has been provisioned. A Service Administrator interacts with the service's administration interface to perform administration and management operations.

Service Runtime Administrator (Role): In accordance with an embodiment, a Service Runtime Administrator is responsible for configuring and managing service runtimes.

Application Deployer (Role): In accordance with an embodiment, an Application Deployer deploys an application to the provisioned service, and is responsible for installing, configuring, and running the application. Once the application is running, it can be made available to an End User.

End User (Role): In accordance with an embodiment, an End User is the user of the applications that are deployed to the service. The End User interacts with the user interface provided by the application running in the service. If the service itself provides an interface for users to consume the functionality that it exposes, then the End User can use that service's interface.

Figure 2:
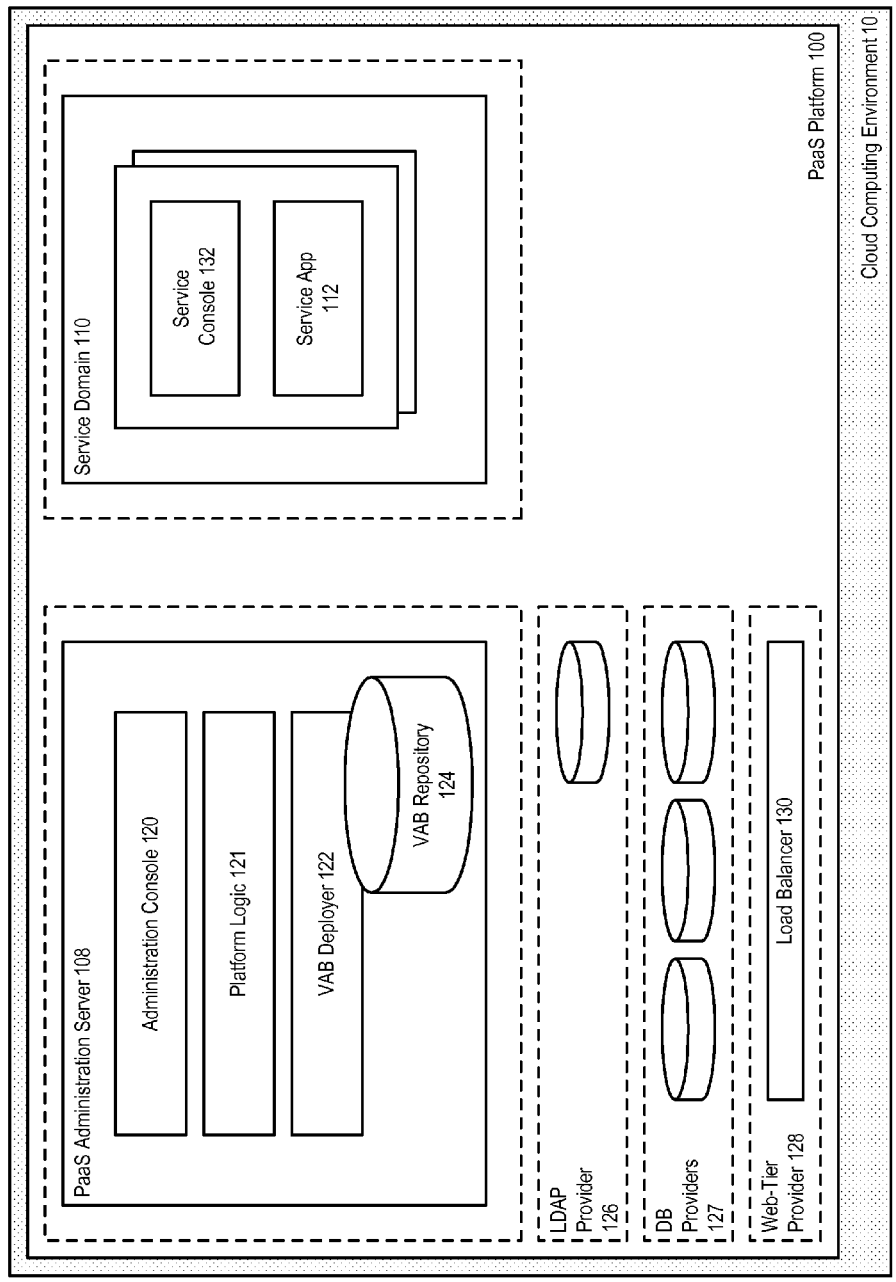
FIG. 2 illustrates a PaaS platform component, including an administration server and a service domain, in accordance with an embodiment.

FIG. 2 illustrates an administration server and a service domain, in accordance with an embodiment. As shown in FIG. 2, in accordance with an embodiment, the PaaS platform (platform) comprises a PaaS administration server 108, which supports an administration console 120, cloud platform provisioning/management logic 121, and virtual assembly builder (VAB) deployer 122, together with a virtual assembly or VAB repository 124. The VAB deployer can be provided by functionality, components, or products such as Oracle Virtual Assembly Builder (OVAB). The VAB deployer (e.g., OVAB Deployer) can then be used by the platform to manage those VMs that will host the servicing applications.

In accordance with an embodiment, the PaaS administration server can be implemented as a WebLogic (WLS) server application, together with, e.g., Glassfish modules embedded therein to provide cloud platform functionality. A service domain, including a service app and service console 132, can be provided for housing enterprise applications, such as FMW applications, that will ultimately service user requests. In accordance with an embodiment, the service domain components may be instantiated multiple times as part of provisioning requests.

In accordance with an embodiment, provider server types that will be used by the PaaS administration server and the service domain, examples of which include LDAP 126, database 127, and Web tier 128 or load-balancer 130 providers, can be provided in pools that are not provisioned by the administration server, but are external services registered with the cloud environment. In accordance with an embodiment, the PaaS platform can make use of a load-balancer provider to forward all incoming, e.g., Web requests, that are directed to the services. For example, each service can be associated with a virtual host name that will be registered with the load-balancer provider during service provisioning.

Figure 3:
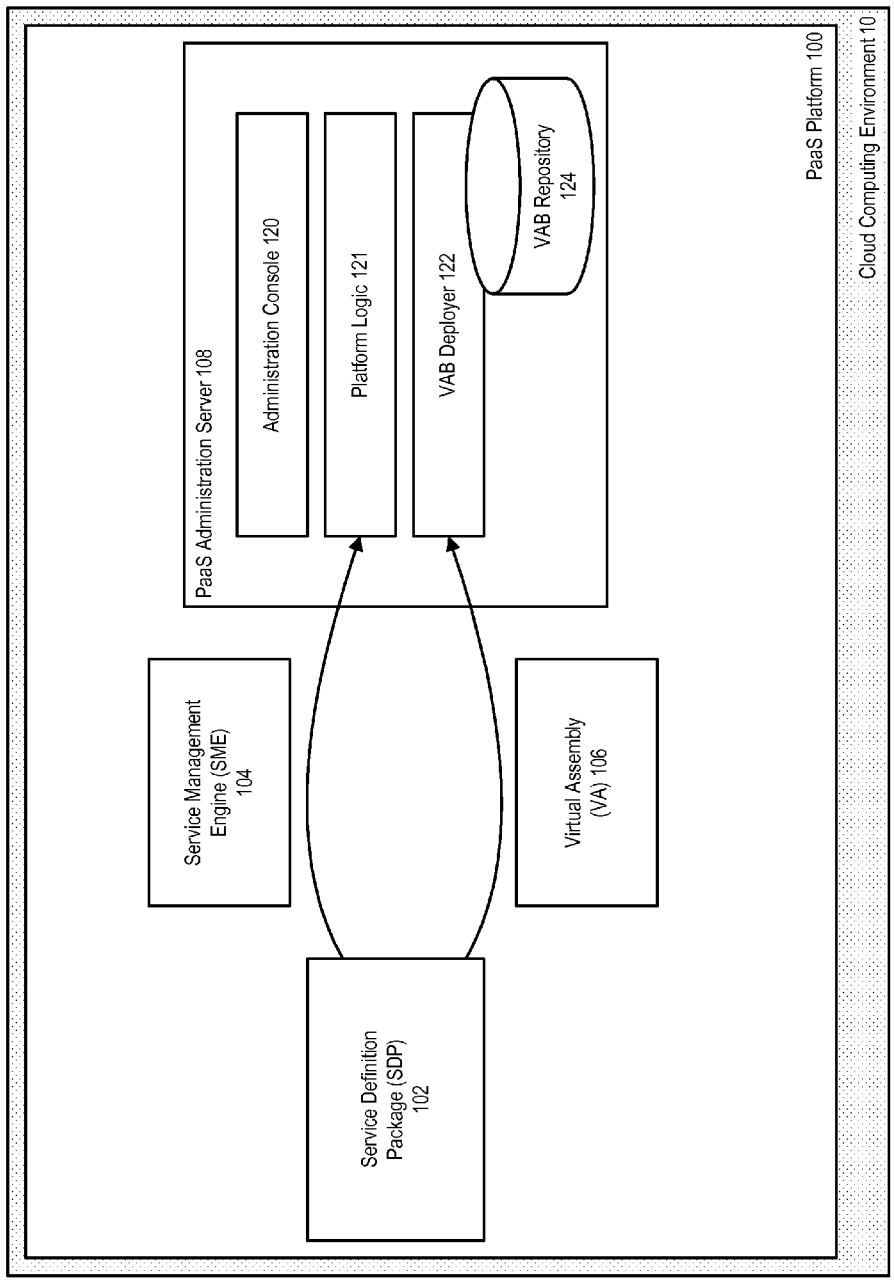
FIG. 3 illustrates the use of service definition packages and service management engines with an administration server, in accordance with an embodiment

FIG. 3 illustrates the use of service definition packages and service management engines with an administration server, in accordance with an embodiment. As shown in FIG. 3, in accordance with an embodiment, new enterprise application service types (e.g., new FMW service types), which the administrator wishes to make available for use within the PaaS platform, can be installed from an SDP. Each SDP contains custom code that can be injected into the platform, for use in supporting, e.g., elasticity and provisioning; together with a virtual assembly (e.g., an OVAB assembly) that contains the topology and configuration of a set of virtual appliances that will comprise a running instance of the enterprise application service, once the assembly is deployed onto a set of VMs.

Figure 4:
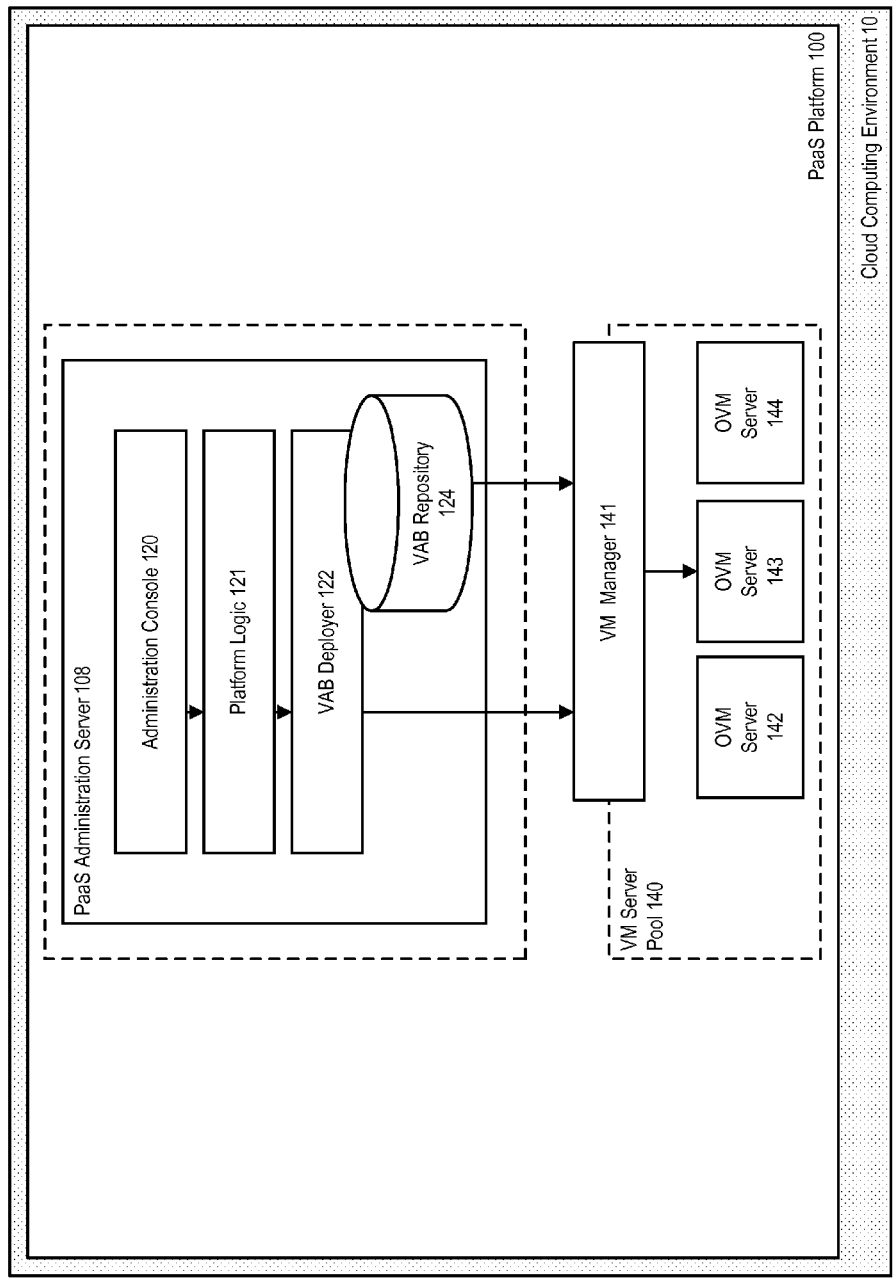
FIG. 4 illustrates the interaction between an administration server and a virtualization manager, in accordance with an embodiment

FIG. 4 illustrates the interaction between an administration server and a virtualization manager, in accordance with an embodiment. As shown in FIG. 4, in accordance with an embodiment, a VM manager component 141 (e.g., Oracle's OVM Manager) can be used by the PaaS platform to manage the pool 140 of VMs 142, 143, 144, which are then used in instantiating a service assembly. When a request is made from a platform module to instantiate an assembly, or a single appliance in the case of a scale-up request, the VAB deployer application (e.g., OVAB Deployer) can interact with the VM manager to fulfill the request. By delegating the infrastructure/virtualization responsibilities to the VM manager and VAB deployer in this manner, the platform can be abstracted from the target deployment platform.

Figure 5:
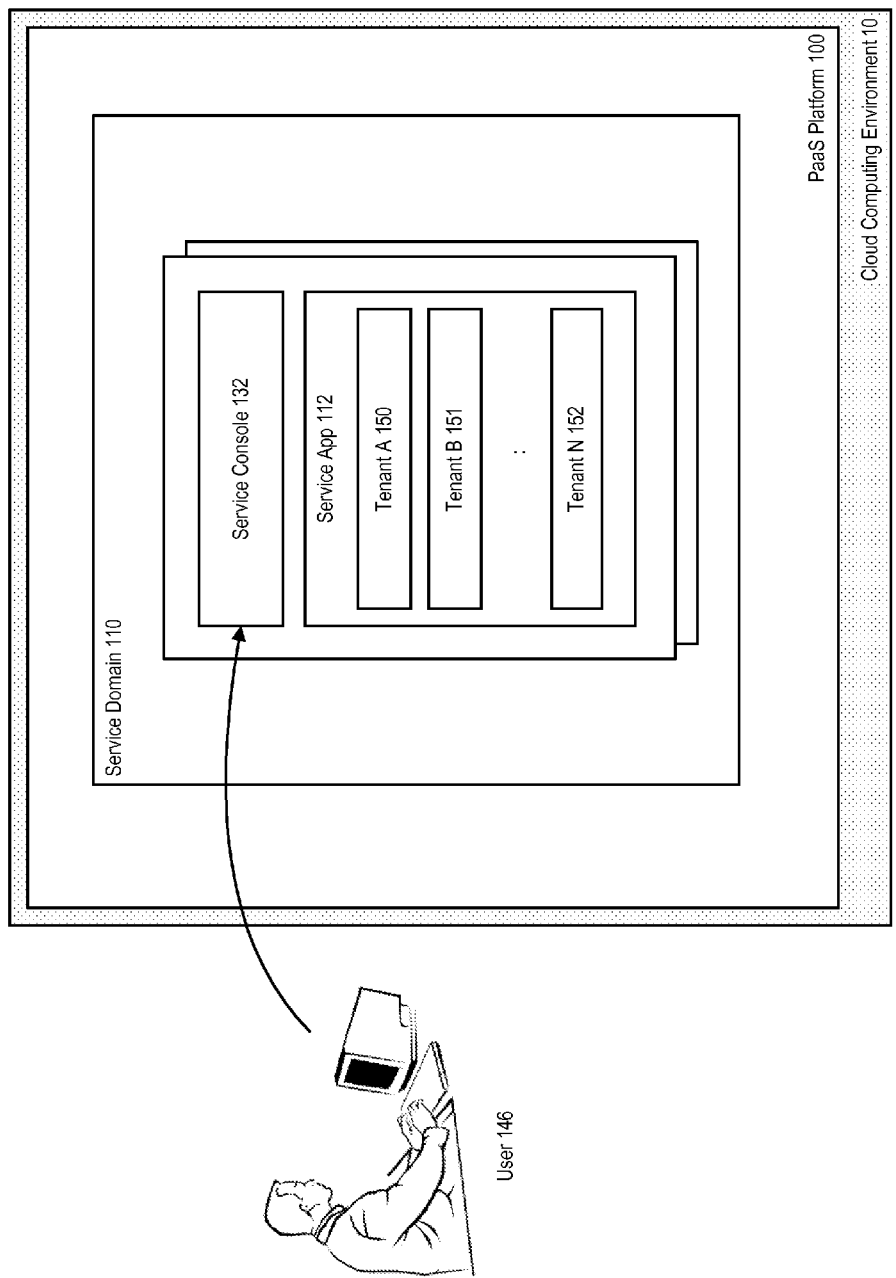
FIG. 5 illustrates a multiple tenant service domain, in accordance with an embodiment.

FIG. 5 illustrates a multiple tenant service domain, in accordance with an embodiment. As shown in FIG. 5, in accordance with an embodiment, a service domain can include multiple tenants 150, 151, 152, that are configurable using the service console. Multi-tenancy, like virtualization, is a density optimization that allows the use of less resources to support more clients and, similar to virtualization, should be transparent to the applications themselves. Although multi-tenancy involves the use of shared resources, the sharing need not be part of the logical model of the applications—these models are instead referred to as using "multitenant" and "dedicated" resources. Alternatively, applications may share resources in a manner that is part of the logical model of the applications; for example, two applications may purposely access a shared database because they intend to operate on the same data—these models are referred to as using "shared" and "unshared" resources.

In accordance with an embodiment, some service types may support both dedicated and multitenant uses, based on their particular configuration. Other service types may support either only dedicated use, or only multitenant use. Service types that are able to support multiple tenants on the same runtime can provision their runtimes in a multitenant manner, during the instantiation process, based on the configuration of the service type. A single instantiated service runtime that has been marked as multitenant-capable will be reused for a finite number of additional service provisioning requests, as determined by the service type and based on its configuration. Generally, it is left to the service application to support a particular tenancy mode; service applications that are not multitenant will only be able to support a single account for each service instance. Once a service has been instantiated from its VM assembly, end users 146 can interact with the system and the instantiated services, in the same manner as they would interact with an on-premise version of that service.

Figure 6:
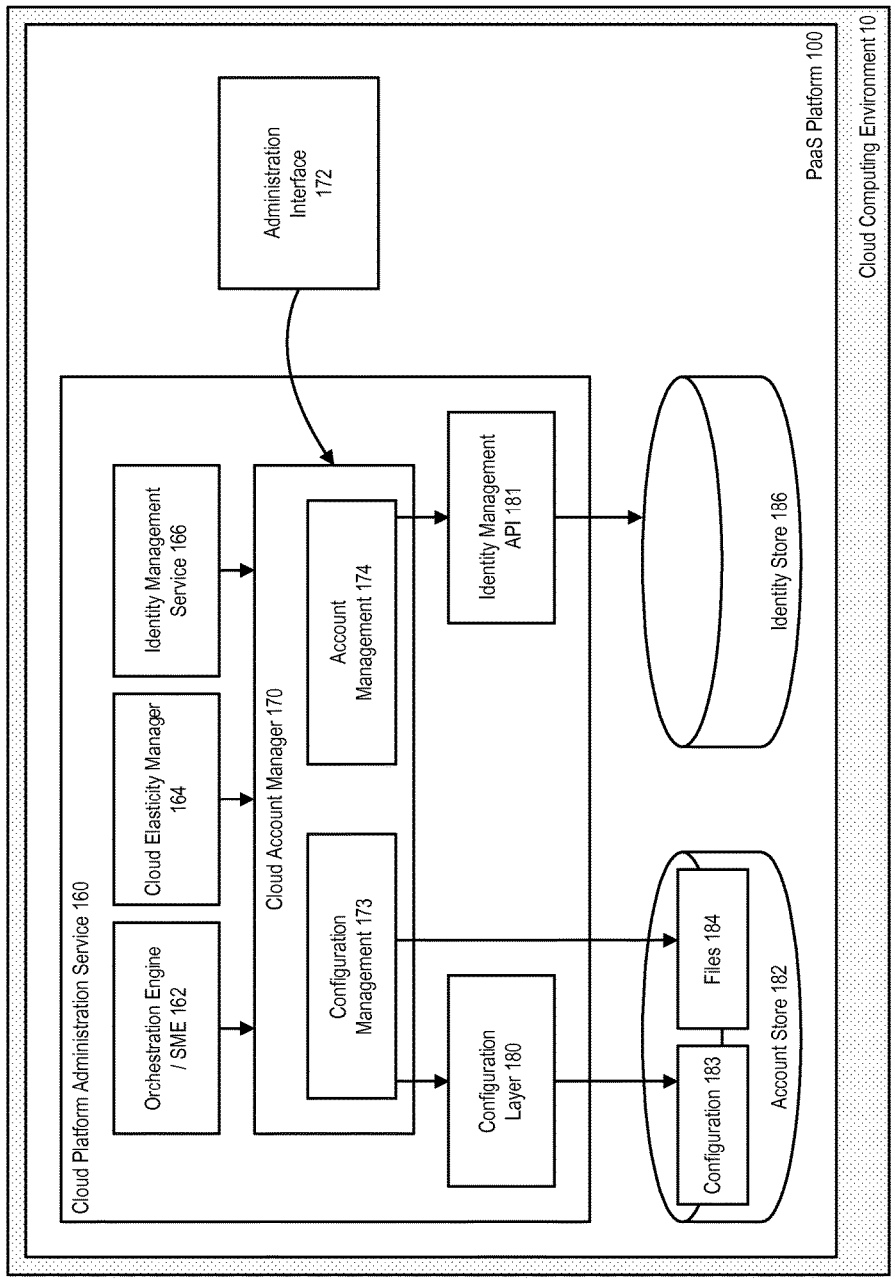
FIG. 6 illustrates a cloud account manager, in accordance with an embodiment

FIG. 6 illustrates a cloud account manager, in accordance with an embodiment. As shown in FIG. 6, in accordance with an embodiment, the PaaS platform can include a cloud platform administration service (CPAS) 160, together with a cloud account manager 170 which supports functions such as account management, and provides a framework that other modules, such as the orchestration engine/SMEs 162, cloud elasticity manager (CEM, referred to herein in some embodiments as an elasticity manager) 164, or identity management service 166), can use to access account-specific data. A configuration management component 173 can use a configuration layer 180 to persist account specific configuration 183 and other files 184 to an account store 182. An account management module 174 provides the ability to manage accounts for a CPAS domain, which can be exposed through the use of a command-line, REST, or other identity management application program interface (API) 181.

In accordance with an embodiment, users can either be managed within an identity store 186 managed by the PaaS platform, or alternatively can be provided from an external, e.g., corporate LDAP, or other means of user identification; and can access the cloud account manager through an administration interface 172. Account and configuration data can also be stored on a file system or other means of storage that is accessible from nodes of a CPAS cluster.

Service Definition Package (SDP)

Figure 7:
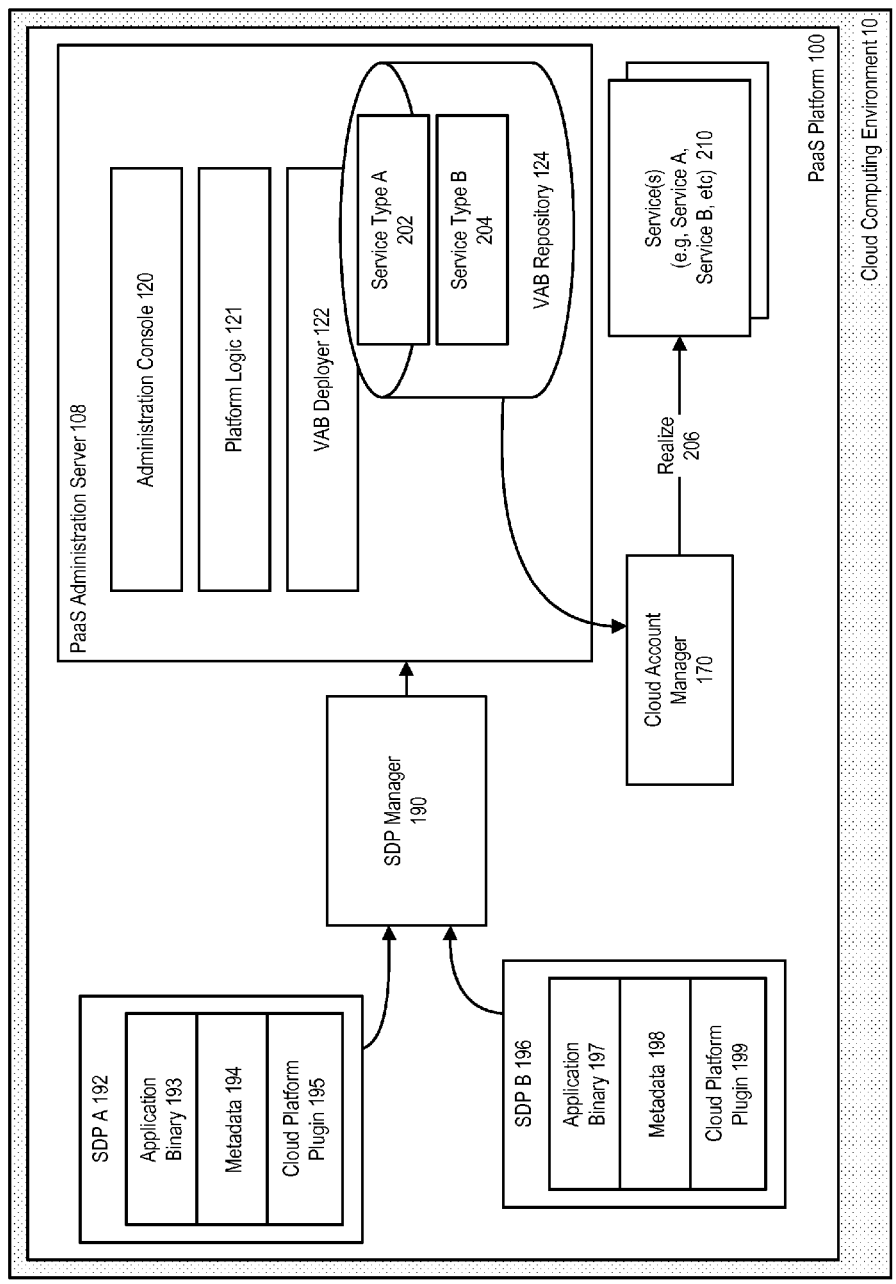
FIG. 7 illustrates the use of a service definition package, in accordance with an embodiment.

FIG. 7 illustrates the use of a service definition package, in accordance with an embodiment. As shown in FIG. 7, in accordance with an embodiment, each SDP 192, 196 can include a binary 193, 197; a metadata 194, 198 (e.g., the SDP name, service type, version, vendor, or virtualization support metadata such as indicating whether the SDP supports OVAB, EC2, or Native); and one or more plugins 195, 199 that enable the SDP to be used within a PaaS platform or cloud environment.

For example, in accordance with an exemplary embodiment, each SDP can include an assembly, reference, package, archive, or template, which can be used to install a service on a particular virtualization provider (e.g., OVAB); an assembly bundled within the SDP or a reference to an assembly (e.g., an EC2-specific reference); a service management engine (SME) plugin for the service type, which enables platform functionality such as elasticity metric gatherers, or alerts to be used with the service; a plugin for use with a VAB deployer (e.g., OVAB Deployer) during its assembly rehydration process; and other dependency and configuration information, such as scalability limits or whether the service is a multitenant or dedicated service.

In accordance with an embodiment, installing an SDP will install, e.g., the OVAB assembly into the OVAB repository; appropriate SME plugins will be registered with the cloud platform; and metric gatherers, alerts and actions will be installed in the PaaS platform. After a System Administrator installs the SDP, a Cloud Account Administrator can then use a cloud account administration interface to request for a service of that type.

In accordance with an embodiment, when an SDP is installed into a PaaS platform domain, it is consumed by an SDP Manager 190, which is responsible for obtaining a list of SDPs available to be installed the local system, downloading an SDP if necessary, installing parts of the SDP into the right places, maintaining a list of those SDPs that have been installed, and, if necessary, uninstalling an SDP by uninstalling all of its parts from the places they were previously installed.

In accordance with an embodiment, the SDP manager can interface with other system components by installing an SME plugin to the CPAS, which can then take responsibility for replicating the SME plugin to other CPAS instances in the cluster, installing the VAB assembly 202, 204 into the VAB deployer, interfacing with other tools such as Enterprise Manager to provide a customized console interface for the service if the service provides one, and installing configuration data for the service into the CPAS. Subsequently, during realization 206 of a service, the service 210 can be realized as an instance of those service types defined by the SDP and installed as assemblies in the VAB repository.

Service Management Engine (SME)

Figure 8:
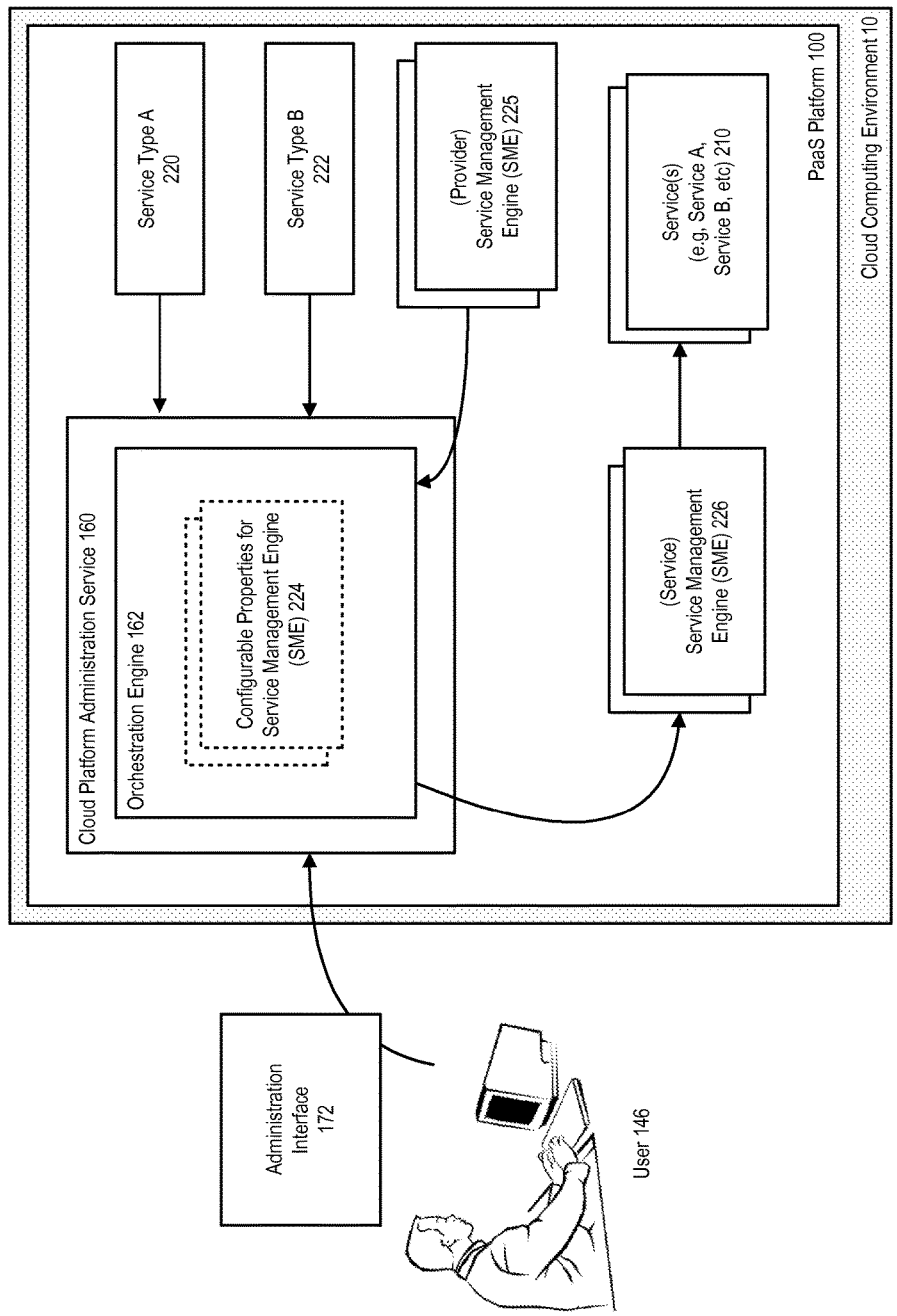
FIG. 8 illustrates the use of a service management engine, in accordance with an embodiment.

FIG. 8 illustrates the use of a service management engine, in accordance with an embodiment. In accordance with an embodiment, a Service Management Engine (SME) provides a generic means to plug any service type into the system. For example, an SME takes care of the service-specific provisioning, lifecycle, management, and monitoring support for a service type or provider type. There can be different classes of SMEs; for example, provider SMEs can be provided to handle different providers. Service SMEs can be dynamically incorporated into the platform domain by installing an appropriate SDP, which are then registered by the SDP manager. The set of registered service SMEs then become the service types that are available to Cloud Account Administrators to create services.

In accordance with an embodiment, each service type supported in the PaaS platform domain maps to a specific service SME. A service SME handles all service-related activities, such as creation, monitoring, management, patching, upgrade, and deletion for that service. In accordance with an embodiment, the contract that is implemented by an SME is referred to as a Service Management Interface (SMI).

Referring to the example shown in FIG. 8, when OVAB is used as a virtualization provider, interaction with the OVAB Deployer can be handled by a virtualization API (e.g., an OVAB client API). In accordance with an embodiment, the orchestration process can then proceed as follows: a Cloud Account Administrator can discover, e.g., SOA service types 220, 222 that are available in the PaaS platform domain, and initiate creation of an, e.g., SOA service. The orchestration engine iterates through the available service SMEs in the system, and determines which service SMEs can handle this service type 224. In this example, the orchestration engine can discover an appropriate SOA SME to handle creation of the SOA service. The orchestration engine can then call into the SME to get all provider dependencies for that SME 225. For example, the SME may return database and load-balancer provider dependencies. The orchestration engine can then call a get-user or similar configurable properties function for the SME, and expose those properties in a user interface, so that the Cloud Account Administrator can edit the properties if desired. User-provided inputs can be supplied to the SME, for example to update an OVAB deployment plan. The orchestration engine then performs any pre-provisioning association between the SME and the provider SMEs upon which it depends. For example, the orchestration engine can perform pre-provisioning association between the SOA SME and a database provider SME, which results in the creation of schema and tables required by the SOA service, in addition to populating the deployment plan with the database provider configuration. When any pre-provisioning association is complete, the orchestration engine can then call into the SME 226 to provision the service.

At this point, the deployment plan is generally complete except for network configurations. In accordance with an embodiment, the deployment plan together with an assembly ID can be pushed, e.g., to the OVAB API, which takes care of filling the deployment plan with the remaining network configurations. Then, the orchestration engine can call, e.g., a Web service API of the OVAB Deployer, to provision the OVAB assembly. Once the assembly is provisioned, the virtual machine information can be retrieved and passed back to the SME, which in turn passes the information back to the orchestration engine. The orchestration engine can then perform any post-provisioning association between the SME and the provider SMEs on which it depends. For example, post-provisioning association between the SOA SME and a load-balancer provider SME may result in the creation of a virtual server to handle and route requests for this SOA service.

Orchestration Engine (OE)

Figure 9:
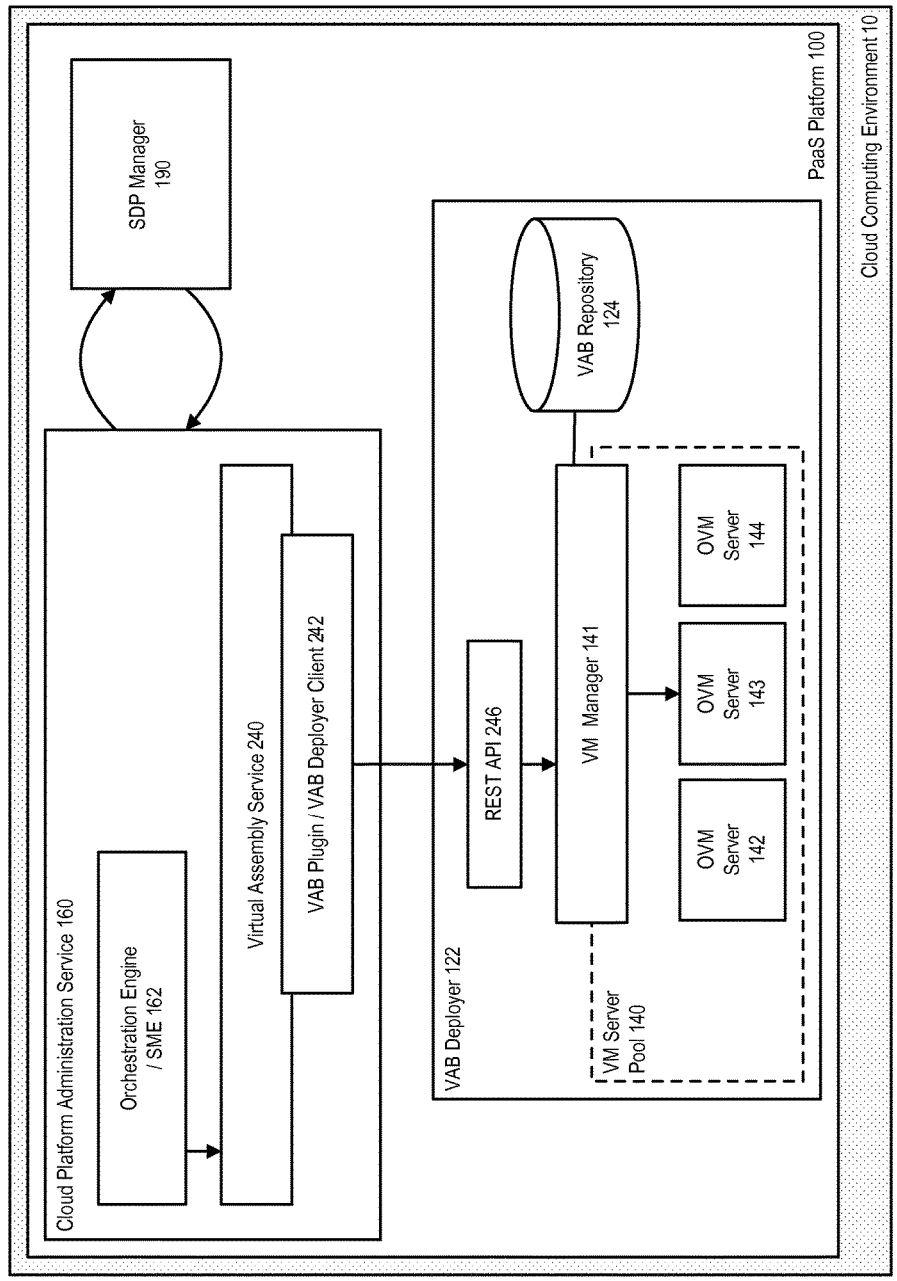
FIG. 9 illustrates the use of an orchestration engine, in accordance with an embodiment.

FIG. 9 illustrates the use of an orchestration engine, in accordance with an embodiment. In accordance with an embodiment, the orchestration engine enables life-cycle management of the services in a PaaS platform. In particular, the orchestration engine coordinates the interactions among various components in the platform domain while creating or managing a service, enables the pluggability of SMEs for various service types in the platform, aids in provisioning the service by selecting appropriate SMEs from among those available in the platform, and helps in managing the configuration of providers such as DB Providers, IDM Providers, and LB Providers.

In accordance with an embodiment, the orchestration engine, as part of creating a service, ensures that dependencies of the service, such as its provider dependencies, are satisfied, by selecting appropriate providers, and coordinating association between the providers and service. The act of association can be performed during pre-provisioning and/or post provisioning-phases. The act of installing and configuring an SME can be performed by the SDP manager as part of registering a pre-packaged service type or a customized service type. The orchestration engine helps expose the deployment plan configuration, which can be configured by the Cloud Account Administrator, including recognizing phases and tasks that match the requirements of the platform for its service creation action, and other life-cycle related activities.

In accordance with an embodiment, the orchestration engine also acts as a gateway for service management, monitoring, scaling actions that could be initiated by other containers in the PaaS platform domain, or by an administrator. For example, the elasticity engine, described in further detail below, can communicate with the orchestration engine to manage, monitor, and scale services based on a service's QoS configuration. The orchestration engine can also play a role in service maintenance actions, such as patching and upgrade, which may require disassociating or re-associating services in a phased manner.

In accordance with an embodiment, services created by a cloud account administrator are visible and accessible only to that particular cloud account (tenant), and are isolated from other cloud accounts in the PaaS platform domain. Such isolation can be provided by the orchestration engine with the help of a cloud account management module.

In accordance with an embodiment, SMEs can be registered with the orchestration engine such that multiple SMEs for a given "family" of service (e.g., "database") can be present in the system. A default SME can also be configured for a particular service family on a per-cloud account basis.

As shown in FIG. 9, in accordance with an embodiment, the orchestration and service management components can interface with the virtualization layer through a virtualization service 240, plugin 242, and virtualization API 246 that abstracts supported virtualization operations. In accordance with an embodiment that uses OVAB, this API can be an OVAB Deployer interface, which enables OVAB Deployer to perform the tasks of assembly creation. In accordance with an embodiment, the orchestration engine/SME can upload and deploys assemblies through the OVAB virtualization API, in addition to managing their lifecycle.

To support developer or demonstration scenarios, in accordance with an embodiment, the system can also implement solutions that run on native OS processes (i.e., with no virtualization). This capability can be implemented by providing a "physical plugin", which implements a portion of the virtualization API.

Elasticity Manager (EM)

Figure 10:
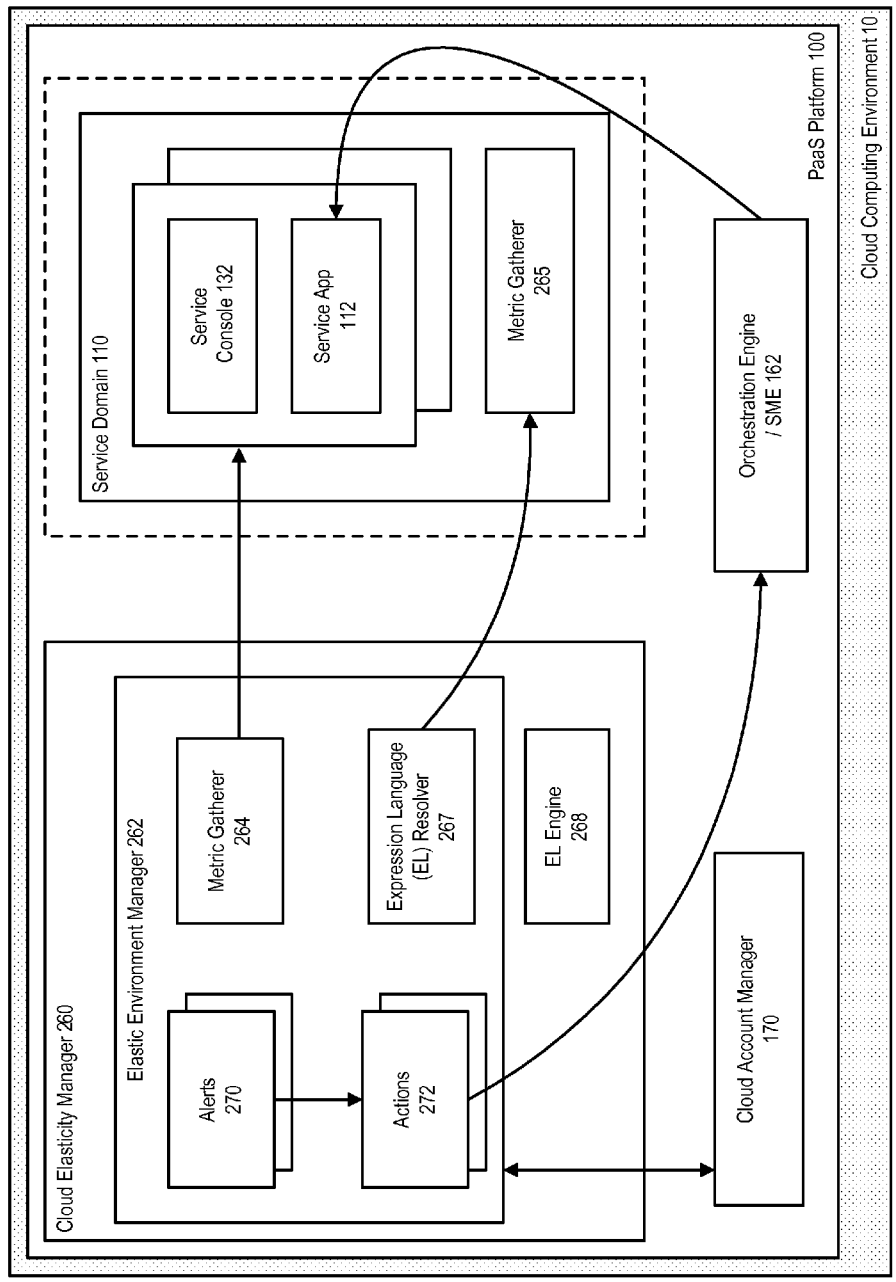
FIG. 10 illustrates the use of an elasticity manager, in accordance with an embodiment.

FIG. 10 illustrates the use of an elasticity manager, in accordance with an embodiment. As shown in FIG. 10, in accordance with an embodiment, the elasticity manager 260, including an environment manager 262, can use metric gatherers 264, 265 and alerts 270, e.g., as HK2 contracts, to determine the health of services running in an environment. Once the state of the environment is determined, the elasticity manager can take appropriate actions 272.

In accordance with an embodiment, a metric gatherer is an object that collects and maintains metric data about a service periodically. For example, a metric gatherer may periodically collect heap statistics such as used or committed memory; or metrics regarding CPU usage. Generally, the metric gatherers provide information about the state of some resource usage. Metrics can also be provided by external monitoring tools, for example by a Java bean component.

In accordance with an embodiment, an alert object periodically checks the health of a service in an environment, by analyzing metric data gathered by one or more metric gatherers over a period of time. For example, an alert may examine CPU usage for a previous several minutes to determine if the environment is under stress. After the alert determines the state of the service or environment, it can execute an action, such as sending an email, logging a message, sending an event, or scaling-up or scaling-down a service. In accordance with an embodiment, an alert can take multiple actions.

In accordance with an embodiment, the elasticity manager can include a unified Expression Language (EL) engine 268, which allows alerts and metric gatherers to be specified as EL expressions. In accordance with an embodiment, the elasticity manager allows external EL Resolver objects 267 to be registered, which enables other types of objects, such as MBeans or POJOs, to be used in an expression.

Update and Patching of SDPs

In accordance with an embodiment, services can be periodically maintained to ensure that they are up-to-date with, e.g., bug fixes, security updates and configuration changes. To help ensure homogeneous environments, services should be updated in a timely manner, with the same set of patches and configuration updates. In accordance with an embodiment, an update is defined to be a change which has to be made to the system; examples of which include application of a security patch, upgrade of a component, or changing of a configuration value. Depending on the type of update, some updates may require a service or system downtime, while other updates may not require a downtime; and each of these scenarios can be taken into account.

Tenant Manager

In accordance with an embodiment, a tenant manager component enables configuration and management of tenants that utilize services and resources within the cloud environment, including accessing information in a tenant store repository describing a plurality of tenants, and providing administrative isolation between the plurality of tenants. The tenant manager enables receiving administrative commands to configure or manage particular ones of the plurality of tenants, and applying the administrative commands to the particular tenants associated with the received administrative commands, for use in configuring or managing use by those tenants of the services and resources within the cloud environment.

In accordance with an embodiment, the tenantmanager (Cloud Tenant Manager) can be responsible for tasks such as:

Tenant Management: in accordance with an embodiment, this module provides ability to manage tenants for a PaaS platform or cloud environment, such as a Cloud Logic site. Tenant management operation can be exposed through CLI and REST interfaces. A tenant can have multiple users. The users can either be managed in an identity store managed by the cloud environment, e.g., CloudLogic, or come from a corporate LDAP; and Providing a framework that other modules use to persist account specific data: in accordance with an embodiment, this module is responsible for providing framework that is used by various services of the PaaS platform or cloud environment, such as a CloudLogic environment, to access and manipulate account specific data. This data is stored on a file system that is accessible from all nodes of an e.g., CloudLogic or other cloud environment cluster.

In accordance with an embodiment, the system can include one directory per tenant that will store configuration and files for the tenant.

In accordance with an embodiment, tenants will be created by a platform admin. These tenants are generally called top level tenants. The platform admin will assign a tenant admin to a tenant at creation time.

The relationship between tenant admins and tenant is many-to-many, i.e., a given tenant can have multiple user assigned to it as tenant admins and a given user can be assigned to multiple tenants as tenant admin. The tenant admin of a top level tenant can create sub-tenants under the tenant, and assign tenant admins to those sub-tenants.

Figure 11:
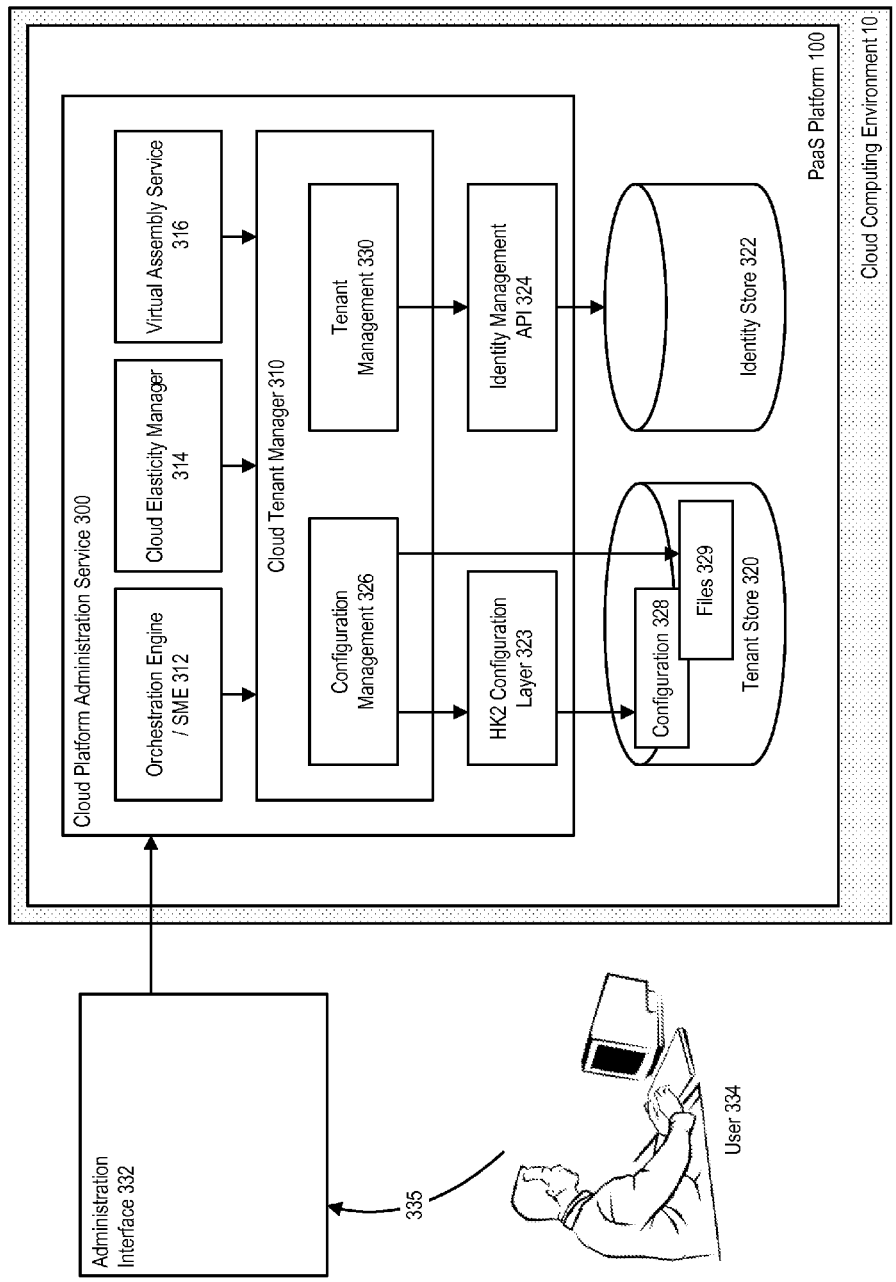
FIG. 11 illustrates use of a tenant manager in a cloud environment, in accordance with an embodiment.

FIG. 11 illustrates use of a tenant manager in a cloud environment, in accordance with an embodiment.

As shown in FIG. 11, in accordance with an embodiment, to support tenants, the PaaS platform can include a cloud platform administration service (CPAS) 300, together with a cloud tenant manager 310 which supports functions such as account management, and provides a framework that other modules, such as the orchestration engine/SMEs 312, cloud elasticity manager 314, or virtual assembly service 316, can use to access tenant-specific data.

In accordance with an embodiment, the cloud tenant manager can include a configuration management component 326 that can use a HK2 configuration layer 323 to persist tenant-specific configuration 328 and other files 329 to a tenant store 320.

In accordance with an embodiment, a tenant management module 330 provides the ability to manage accounts for a CPAS domain, which can be exposed through the use of an identity management API 324 and an identity store 322.

An administrative interface 332 allows users 334 to configure or manage 335 tenants within the environment.

Figure 12:
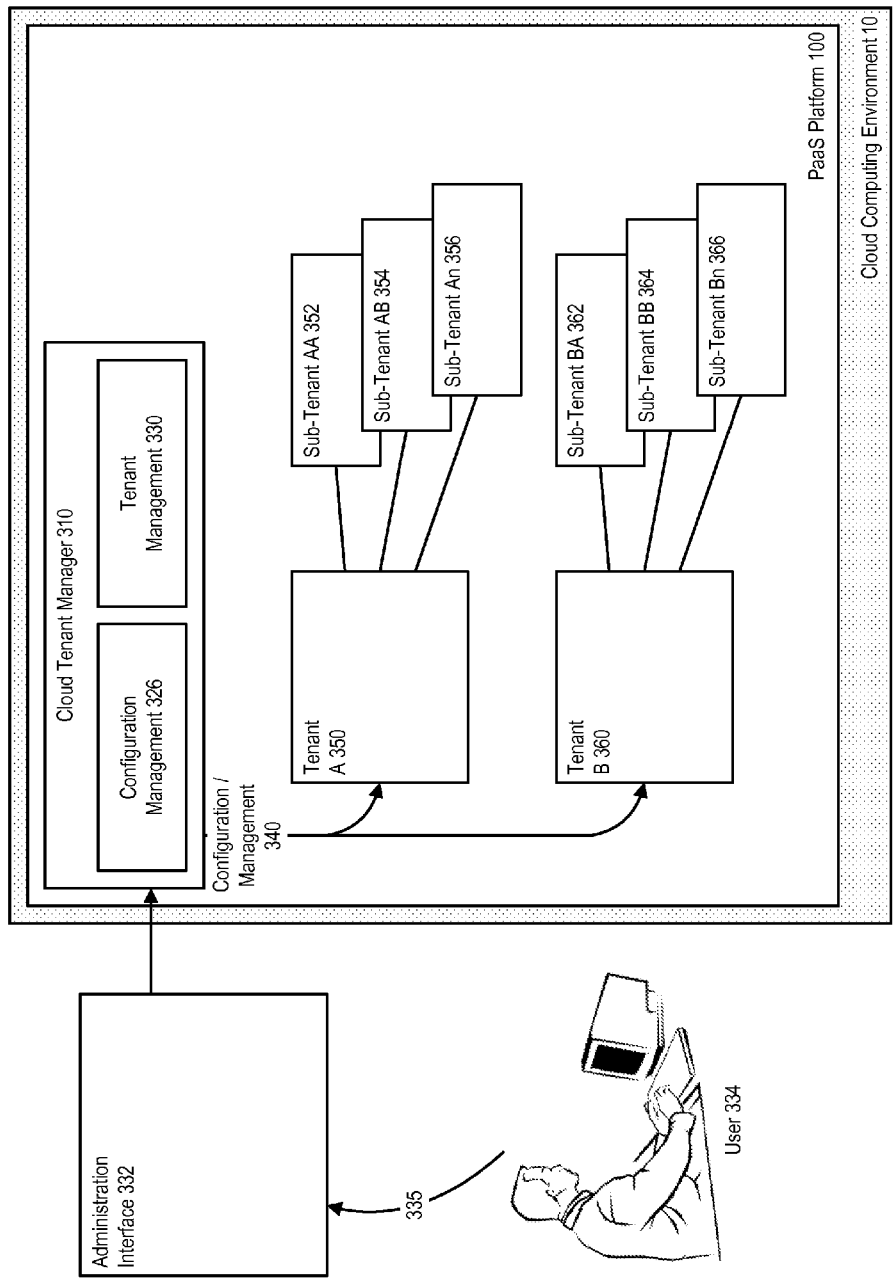
FIG. 12 further illustrates use of a tenant manager in a cloud environment, in accordance with an embodiment.

FIG. 12 further illustrates use of a tenant manager in a cloud environment, in accordance with an embodiment.

As shown in FIG. 12, in accordance with an embodiment, the user can configure or manager 340 a plurality of tenants, including in this example a first tenant A 350, and a second tenant B 360.

In accordance with an embodiment, each tenant can be associated with sub-tenants hierarchically beneath the tenant, for example sub-tenants AA 352, AB 354, An 356 beneath tenant A, and sub-tenants BA 362, BB 364, BN 366 beneath tenant B.

Figure 13:
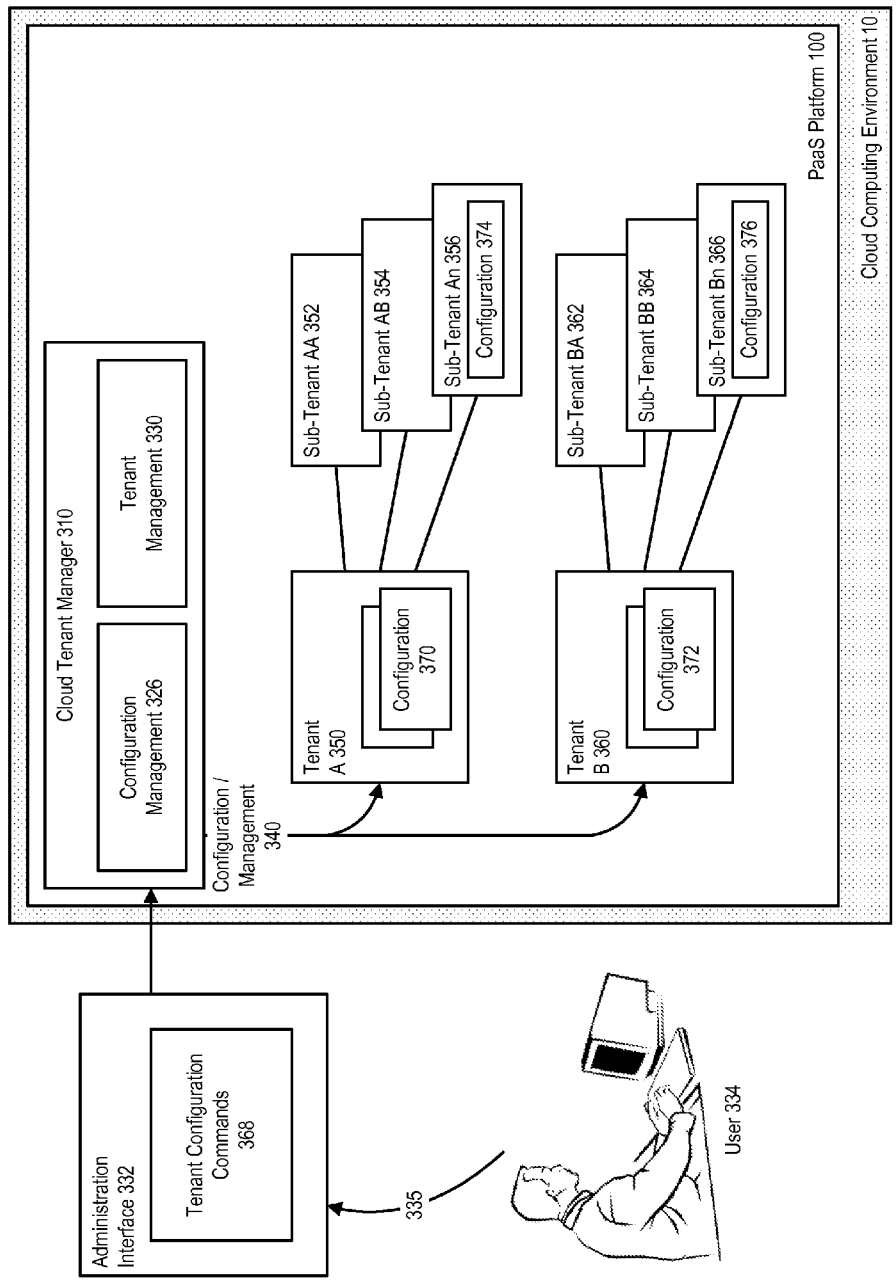
FIG. 13 further illustrates use of a tenant manager in a cloud environment, in accordance with an embodiment.

FIG. 13 further illustrates use of a tenant manager in a cloud environment, in accordance with an embodiment. As shown in FIG. 13, each of the tenants and/or sub-tenant can be associated with configurations, such as those shown 370, 372, 374, 376.

Figure 14:
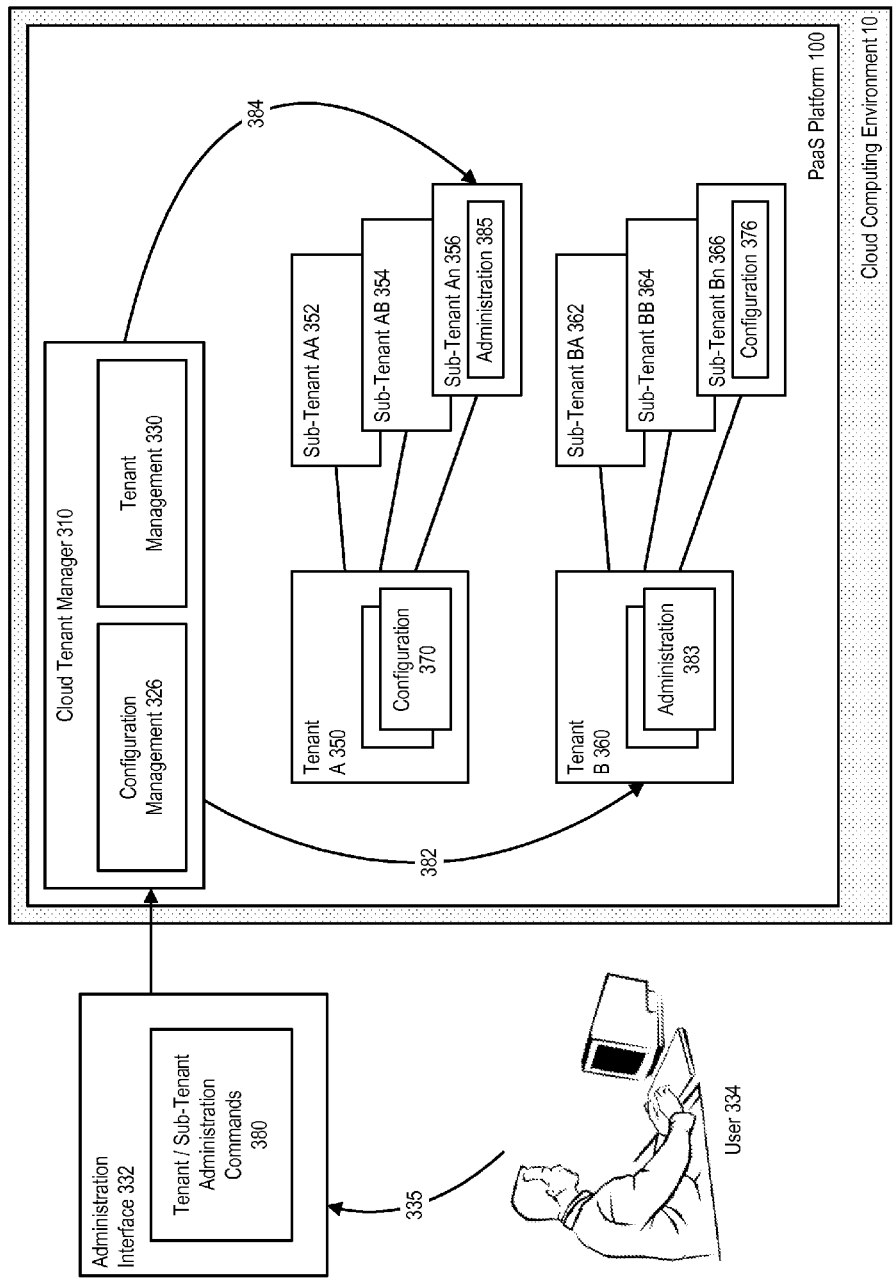
FIG. 14 further illustrates use of a tenant manager in a cloud environment, in accordance with an embodiment.

FIG. 14 further illustrates use of a tenant manager in a cloud environment, in accordance with an embodiment.

As shown in FIG. 14, in accordance with an embodiment, the system allows a user to provide tenant/sub-tenant administration commands (administrative commands) 380, which the cloud tenant manager can then selectively apply 382, 384, to particular tenant or sub-tenants within the platform or cloud environment, for example to provide administration 383, 385, at particular tenants or sub-tenants respectively.

In accordance with an embodiment, creation of another level of sub-tenants is not allowed under a sub-tenant. Sub-tenants can be referenced by, e.g., a CLI, using hierarchical names. For example, if a tenant T1 has two sub-tenants st1 and st2, they will be referenced using T1/st1 and T1/st2.

In accordance with an embodiment hierarchical names are not used for any other artifacts, such as environments, or services.

In accordance with an embodiment, tenants/sub-tenants are isolated from each other. For example, a given tenant admin assigned to a given tenant/sub-tenant will only be able to operate on and view data for that tenant/sub-tenant.

Tenants/sub-tenants can have environments under them. For example, in accordance with an embodiment, at tenant/sub-tenant creation, an environment named "env1" will be automatically created under it. A tenant admin for the tenant can create more environments under the tenant.

In accordance with an embodiment, services are always created under an environment. All environments will be assigned an environment admin at creation, and only the assigned environment admins can operate on the environment.

In accordance with an embodiment, all the names for artifacts created under tenant/sub-tenant will be scoped to that tenant/sub-tenant. This means it is possible, for example, to have env1 occur multiple time under a given tenant, for example T1/env1, T1/st1/env1, T1/st2/env1, and so on. The hierarchical name used for env1 here is provided just for purposes of illustration.

Framework to Manage Data Associated with a Tenant

In accordance with an embodiment, the TenantManager is responsible for providing framework that will be used by various modules of a PaaS platform or cloud environment such as a CloudLogic environment, to access and manipulate tenant specific data. This data can be stored on a file system. In accordance with an embodiment, there is one directory per tenant to store artifacts for each tenant. All artifacts created by any tenant admin of a tenant will share the same name space, and will be visible to all other tenant admins of the tenant.

Data Associated with Tenants

In accordance with an embodiment, some examples of data associated with a tenant include Configuration/Status data associated with a tenant/sub-tenant, which can be stored in a file called "tenant.xml" under directory corresponding to the top level tenant; environments created for a tenant/sub-tenant; services provisioned for a tenant/sub-tenant; CEM configuration data—alert configuration, MetricGatherer Configuration for such services; tenant/sub-tenant tombstone information like organization, creation date etc.; files associated with a tenant. A subdirectory can be provided under each tenant's directory for each category of file. Key stores can be associated with a tenant.

Data Modelling Mechanism

In accordance with an embodiment, a data model for all of config/status data described above can be defined by respective modules. For example, a model for CEM data above should come from a CEM module. Modules can use a mechanism similar to one used by config beans to define data model, for example they will use interfaces using javabean patterns to define data they are planning to store with TenantManager. An example is provided below:

```
@TenantScoped
@Configured
public interface AlertConfig extends ConfigBeanProxy {
    @Attribute
    String getName( );
    void setName(String value);
    @Attribute
    String getSchedule( );
    void setSchedule(String value);
    ...
    @Element
    AlertActions getAlertActions( );
    void setAlertActions(AlertActions alertActions);
}
```

As illustrated in the above example, the @TenantScoped annotation designates that this interface is defining model for data that is scoped per tenant. Several Java bean properties are defined using @Attribute and @Element. Each property is an attribute of entity being defined (AlertConfig in this case).

As illustrated in the example, each @Attribute annotation can be of type that is one of Java primitive, String.

Each @Element annotation can be of type another @TenantScoped entity or collection of @TenantScoped entity.

It is possible to have inheritance hierarchy among @TenantScoped entity. For example, an @Element representing collections of @TenantScoped entity can contain polymorphic @TenantScoped entities from a hierarchy, providing a hierarchical data model similar to config beans. In accordance with an embodiment, the root of this hierarchy is @TenantScoped entity Tenant, which contains list of @TenantScoped entity TenantEnvironment, and so on.

Usage Pattern for Accessing Tenant Specific Data

In accordance with an embodiment, the code that needs to access data for a tenant can get hold of the Tenant reference, and navigate from there.

Obtain Tenant Through Method on TenantManager.

```
@Service
public class AClassFromCEM {
    @Inject TenantManager tenantManager;
    pubic void processEnvironments(String tenant) {
        //Obtain root for target tenant's hierarchy
        Tenant tenantConfig = tenantManager.getTenant(tenant);
        // Navigate to required information
        Environments environments = tenantConfig.getEnvironments( );
        //Iterate through environments data here
        ...
    }
}
```

Inject Tenant

```
public class AClassFromCEM {
@Inject
Tenant tenantConfig;
@Inject
TenantManager am;
    void processEnvironments(String tenant) {
        am.setCurrentTenant(tenant);
        // Navigate to required information
        Environments environments = tenantConfig.getEnvironments( );
        //Iterate through environments data here
        am.resetCurrentTenant( );
    }
}
```

Mutate Tenant Specific Data

In accordance with an embodiment, the same pattern can be used as for config beans to mutate tenant configuration. An example illustrating such a pattern is provided below. This pattern can be used for advanced use cases where more granular locking is required.

```
public class AClassIntendingToMutate {
@Inject
TenantManager am;
    void consumingCode(String tenant) {
    // Obtain the data to be mutated.
    Tenant tenantConfig = am.getTenant(tenant);
    AlertConfig = tenantConfig.get...( );
    // Obtain a lock on filesystem for this process.
    //
    tenantConfig.lock( );
        ...
        ConfigSuppoort.apply(new ConfigCode( ) {
            public Object run(ConfigBeanProxy... params) {
                AlertConfig alertConfig = (AlertConfig) params[0];
                FooConfig fooConfig = (FooConfig) param[1];
                alertConfig.setXXX(..);
                fooConfig.setXXX(..);
            }
        , tenantConfig.getAlertConfig( ), tenantConfig.getFooConfig( ));
        ...
    tenantConfig.unlock( );
    }
}
```

Usage Pattern to Access Files Associated with a Tenant

In accordance with an embodiment, as noted above, Tenant Manager also enables the storage of files associated with a tenant. A module intending to consume files associated with a tenant will access it as follows:

```
public class AClassConsumingFileForATenant {
@Inject
TenantManager am;
void consumingCode(String tenant) {
    //Get all files belonging to 'tenant' for category "Applications".
    List<File> files = am.getFiles(tenant, "Applications");
    //Get file belonging to 'tenant' for category "Applications
    "whose name is "app1.ear"
    File myApp = am.getFile(tenant, "Applications", "app1.ear");
    //Get root dir belonging to 'tenant' for "category".Files under
    this will be managed by consuming code
    File categoryRootDir = am.getCategoryRootDir(tenant, "category")
    ...
    }
}
```

Usage Pattern to be Used from Commands

In accordance with an embodiment, most of the access for tenant specific data happens from commands. These commands take target tenant as one of the parameters, and either access or mutate data for that tenant. The following pattern can be used to simplify code for these commands:

```
@Service(name = "cloud/createenvironment")
@ExecuteOn({RuntimeType.SINGLE_INSTANCE})
@TenantAware(mutates=true)
public class createEnvironment implements AdminCommand {
    // Parameter that receives target tenant.
    // Refer to description of TenantDefaultCalculator below for more on
    it
    @Param(name = TenantAware.PARAM_TENANT, optional = true,
    defaultCalculator= TenantDefaultCalculator.class)
    private String tenant;
    @Inject
    Tenant tenantConfig;
    @Inject
    TenantCLIHelper tenantCLIHelper
    @Override
    public void execute(AdminCommandContext context) {
        try {
            //No setCurrentTenant( ) required. tenantConfig pointsto target
    tenant due to @TenantAware Environments environment =
    tenantConfig.getEnvironments( );
    // We want to mutate environments, get a writable view for it first
    Environments environments_w
    =tenantCLIHelper.enrollInCurrentTransaction(context,
    environments);
    TenantEnvironment environment
    =environments_w.createChild(TenantEnvironment.class);
    environment.setName(name);
    environments_w.getEnvironments( ).add(environment);
        catch (TransactionFailure e) {
            throw new RuntimeException(e);
```

-continued

```
        catch (PropertyVetoException e) {
            throw new RuntimeException(e);
    }}
}
```

In the above example, the @TenantAware annotation denotes that this command is executed in context of a target tenant. At the implementation level, this annotation is indication to CLI framework that this command needs to be executed inside a wrapper. The wrapper validates existence of target tenant, sets current tenant as target tenant, obtains a lock if asked for, and starts a config transaction on the way in. On the way out it commits the transaction, unlocks and resets current tenant.

CLI Framework Extension for @TenantAware

In accordance with an embodiment, all of the commands that target a tenant are executed in the context of that target tenant. These commands share some common functionality such as validating existence of target tenant; obtaining data from tenant manager in context of the target tenant; if mutating data, obtaining a lock and start a config transaction.

In accordance with an embodiment, this functionality can be abstracted out in a common layer, such that annotating a command as TenantAware provides this functionality. An annotation CommandWrapper can be provided as follows:

```
@Retention(RetentionPolicy.RUNTIME)
@Target(ElementType.ANNOTATION_TYPE)
public @interface CommandWrapper {
    Class<? extends CommandWrapperImpl> value( );
}
```

TenantAware will be defined as a CommandWrapper like as follows:

```
@Retention(RetentionPolicy.RUNTIME)
@Target(ElementType.TYPE)
@CommandWrapper(org.glassfish.cloud.tenantmanager.TenantAwareWrapper.class)
public @interface TenantAware {
    String PARAM_TENANT = "tenant";
    /**
     * Indicates whether this command mutates tenant data.
     */
    boolean mutates( ) default false;
}
```

In accordance with an embodiment, TenantAware is annotated with @CommandWrapper that points to TenantAwareWrapper. When a command is annotated with @TenantAware, CLI framework calls createWrappper( ) method of TenantAwareWrapper to create wrapper that it executes. The wrapper defined by TenantAwareWrapper assumes that target tenant is indicated by a parameter named TenantAware.PARAM_TENANT. It obtains value of that parameter and then validates target tenant, sets current tenant, obtains a lock, starts a config transaction and executes the command. It does the reverse on the way out.

```
@Service
public class TenantAwareWrapper implements CommandWrapperImpl {
@Inject
TenantManager am;
@Override
    public WrappedAdminCommand createWrapper(final Annotation ann,
    final CommandModel model, final AdminCommand command,final
    ActionReport report) {
        return new WrappedAdminCommand( ) {
        @Override
        public void execute(final AdminCommandContext context) {
        // Get the annotation
        TenantAware tenantAware =
        getUnwrappedCommand( ).getClass( ).getAnnotation(TenantAware.class);
        try {
            // To facilitate determining tenant to operate on,commands
            need to declare their 'tenant' parameterwith name
            TenantAware.PARAM_TENANT
            String tenant =
```

```
            getTenantParamValue(TenantAware.PARAM_TENANT,context);
            am.setcurrentTenant(tenant);
            Transaction currentTransaction = new Transaction( );
            TenantDataMutatorAdminCommandContext
            mutatorAdminCommandContext = new
            TenantDataMutatorAdminCommandContext(currentTransaction,
        context); //Save the transaction
        if(tenantAware.mutates( ) ) {
            am.lock( );
            command.execute(mutatorAdminCommandContext);
            // Pass the transaction on stack
            currentTransaction.commit( );
    } finally {
        if(tenantAware.mutates( ) ) {
            am.unlock( );
        }
        am.resetCurrentTenant( );
    }}}}
}
```

Tenant Default Calculator

In accordance with an embodiment, CPAS commands can take a 'user' parameter that represents the user executing the command. The commands operating on tenant specific data, will also take a parameter that specifies which 'tenant' to target. Most of the time 'user' will be tenant admin for the target tenant and may be only associated with one tenant; which makes it possible to default the value for 'tenant' to the tenant 'user' is associated with, and let the 'tenant' parameter be optional.

In accordance with an embodiment, command developers can use defaultCalculator=TenantDefaultCalculator for their 'tenant' parameter for this. The default calculator kicks in when 'tenant' is not specified on command line. If 'user' is associated with more than one tenant and 'tenant' is not explicitly specified, then the command will terminate with an error and will need to be executed after explicitly specifying 'tenant' parameter.

Global Data Storage Helper

In accordance with an embodiment, components of CPAS might need to store data that may not be specific to a tenant and yet needs to be mutated/accessed from CPAS nodes (vs DAS) and hence should not be stored in domain.xml. An example may be data about physical assemblies when physical virtualization is used.

In accordance with an embodiment, Tenant Manager framework provides a helper that allows to store this type of data. The following code snippet illustrates how this can be used by consuming code:

```
public class SomeConsumingCode ... {
    @Inject
    TenantManager am;
    public void execute(...) {
        Lock globalLock = am.getGlobalLock( ); //If you intend to
        mutateglobal configuration, obtain a lock
        globalLock.lock( );
        Global globalConfig = am.getGlobal( );
        MyExtension myExtension =
        globalConfig.getExtensionByType(MyExtension.class)
        //MyExtension is an TenantExtension stored under global.
        myExtension.getXXX( );
        myExtension.setXXX( );
        File globalDataDir =
        am.getGlobalCategoryRootDir("assemblies");
        //Obtain location to store physical assemblies
        globalLock.unlock( );
    }
}
```

Tenant Management

In accordance with an embodiment, the Tenant Manager can provide functionality to manage tenants in a PaaS platform, CloudLogic, or other cloud environment through CLIs.

Tenant Lifecycle Hooks

In accordance with an embodiment, hooks can be provided around tenant lifecycle events like creating a tenant or deleting a tenant. These hooks can be implemented as supplemental commands. A mechanism of supplemental command vs lifecycle listeners can be used to support compatibility with existings mechanisms for extension for all commands. This functionality for example can be used by security module to update authorization policies that refer to tenant.

Tenant Locking

In accordance with an embodiment, a system admin can lock a top level tenant using lock-tenant command, and unlock a tenant using unlock-tenant command. In accordance with an embodiment, once a tenant is locked, it will not be possible for a tenant admin to execute any commands targeting the tenant till system admin unlocks the tenant. However, all the existing services provisioned for that tenant will continue to have both service admin and end user interface available.

In accordance with an embodiment, a system admin can execute commands targeting the tenant. Tenant Locking can be implemented as part of authorization checks while executing a command.

User Management

In accordance with an embodiment, Tenant Manager can provide functionality to manage tenant admin users for a CloudLogic or other PaaS or cloud environment through CLIs, such as: create-user; delete-user; list-users.

Tenant/User Association

In accordance with an embodiment, Tenant Manager can provide functionality to manage tenant to user association through CLIs such as add-tenant-admin; and remove-tenant-admin.

Environment Management

In accordance with an embodiment, Tenant Manager can provide functionality to manage environments through CLIs, such as: create-environment; delete-environment; list-environments Configuration Requirements In accordance with an embodiment, as described above, data managed by Tenant Manager can be stored inside a directory hierarchy. Out-of-the-box (e.g., single instance CPAS), the root of this hierarchy will default to ${com.sun.aas.instanceRoot}/config/tenants-store. To update this location, the set-tenant-store-location command can be executed.

Considerations while Working in Clustered Mode and Parallel Updates

In accordance with an embodiment, a config bean mechanism (WriteableView) for concurrency control can be used within a JVM. This locks per config element and prevents parallel updates to same element.

In accordance with an embodiment, when running in clustered CPAS configuration, t a tenant's session can be made to be sticky to a given CPAS node for performance reasons. However, it is still possible for parallel requests from a tenant to land on different CPAS nodes.

In accordance with various embodiments, the following are examples:

1. Allow parallel updates to overwrite—Tenant Manager will broadcast an event to the cluster for any updates to a tenant's config. CPAS nodes receiving this event will reload cached config in response to the event. This ensures that consuming code never sees any stale data. Note that this may result in the backing store for configObjects to be changed without consuming code knowing about it. If parallel updates are operating on same section of tenant.xml, it may also result in the JVM operating latter to overwrite previous change.

2. Optimistic Lock—Maintain a version number within tenant's config file. If at update, version on disk does not match the version cached, throw an "OptimisticLockException" and reload config data for the tenant. Calling code is expected to handle the exception by retrying the update. This eliminates need to implement broadcasting of events but requires calling code to be more sophisticated.

3. Pessimistic Lock—All the mutating code follows lock-readORupdate-unlock pattern. The code intending to mutate data for a tenant first obtains a lock then initiates a read from config store. This will reduce interVM concurrency but provides a simple programming model and the best protection.

Parallel Updates and Cache

In accordance with an embodiment, once tenant data is accessed it is stored in cache. TenantManager uses separate version file (tenant.xml.lck) to keep cache up to date. Version number is stored in raw format. Checks are performed on read and write. While on read, data is reloaded, on write ModifiedByOther runtime exception is thrown if tenant data was modified before transaction started.

Pattern to Use for Code that is not Using @TenantAware

In accordance with an embodiment, the code that is using @TenantAware, will be guarded by TenantManager#lock( ). For the code that is not using @TenantAware, following pattern can be used for file operations:

```
public class SamplePaaSDeployCommandImpl extends ... {
    @Inject
    TenantManager am;
    public void execute(...) {
        am.lock( )
        // Name of archive supplied by user.
        // We want to deploy only if we have not already
        // deployed an archive with same name.
        String appArchiveName = "...";
        File appArchive = am.getFile("DeployedApplications",
        appArchiveName);
        if(appArchive.exists( )) {
```

-continued

```
            throw new DeploymentException("Application already
            deployed.");
        }
        dumpUploadedAppArchiveAsDeployedApplication-
        (appArchive);
        am.unlock( );
        ...
        // Continue with long running deployment
        ...
        am.lock( );
        if (deploymentSucceeded) {
            updateTenantStoreWithMetaDataAboutDeployedApp( );
        } else {
            //Deployment failed, clean up
            appArchive.delete( );
            cleanupAnyOtherArtifactsCreateDuringDeploy( );
        }
        am.unlock( );
    }
}
```

The above is an example code of a long running PaaS-deploy command where it is not desired to lock using @TenantAware for better concurrency.

For example, an admin may want to deploy a user supplied archive only if it is note already deployed. The above example lock( ) and check for existence of file on line 13, then goes through the long running deployment. At the end if deployment succeeds, the tenant data store is updated. If it fails, the system can clean up any artifacts like services, environments created by this deployment and also delete this file. If this JVM process crashes immediately after executing line 16 that dumps the file, the presence of the file will result in an inconsistent state.

Tenant Management Process

Figure 15:
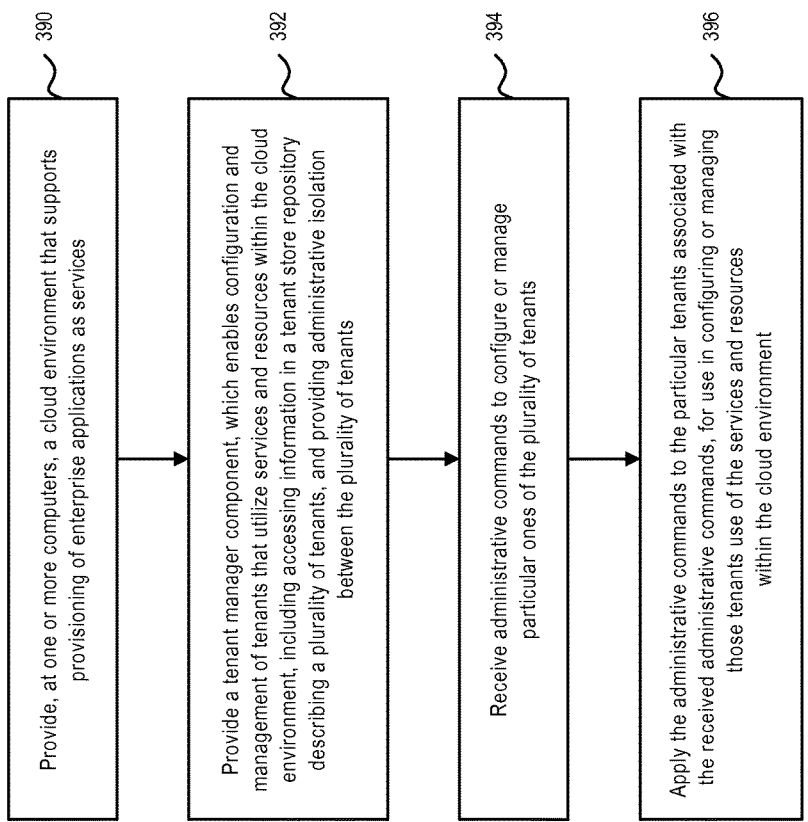
FIG. 15 is a flowchart of a method of providing a tenant manager, for use in a cloud environment, in accordance with an embodiment.

FIG. 15 is a flowchart of a method of providing a tenant manager, for use in a cloud environment, in accordance with an embodiment.

At step 390, a cloud environment that supports provisioning of enterprise applications as services is provided at one or more computers.

At step 392, a tenant manager component is provided, which enables configuration and management of tenants that utilize services and resources within the cloud environment, including accessing information in a tenant store repository describing a plurality of tenants, and providing administrative isolation between the plurality of tenants.

At step 394, administrative commands are received to configure or manage particular ones of the plurality of tenants.

At step 396, the administrative commands are applied to the particular tenants associated with the received administrative commands, for use in configuring or managing those tenants use of the services and resources within the cloud environment Quota Management In accordance with an embodiment, a tenant manager component enables configuration and management of tenants within the cloud environment, wherein the tenants can utilize services and resources within the cloud environment. The tenant manager enables quotas to be associated with one or more tenants restricting their provisioning or usages of the services and resources. An elasticity manager component determines usage of the cloud environment services and resources by the one or more tenants, and provides usage information to the tenant manager, for use in managing the one or more tenants in accordance with their quotas.

For example, in accordance with an embodiment, usage of certain IaaS and PaaS level resources can be controlled by quota. The quotas can be assigned by the Platform Admin when a tenant is created, and can also be assigned when a sub-tenant is created by a Tenant Admin. Examples of quota controlled resources include CPUs, Disk, and number of VMs in use.

In accordance with an embodiment, for IaaS level quota, the PaaS platform CloudLogic or other cloud environment can depend on the underlying IaaS layer to enforce quota limits. The platform, CloudLogic or environment can expose interfaces that allow administrators to establish and manipulate the IaaS quota. The same interfaces will be used for controlling PaaS level quota.

In accordance with an embodiment, at the PaaS layer, quota will be managed by the PaaS platform, CloudLogic or other cloud environment. An example of PaaS quota is the number of services a Tenant Admin is allowed to provision.

In accordance with an embodiment, quota is hierarchical. For example, a tenant/sub-tenant is not only limited by the quota assigned to the them, but also by the quota assigned to the parent tenant. If the parent's quota is fully utilized, then the sub-tenant would be blocked from consuming those resources, even if the sub-tenant itself has available quota.

Figure 16:
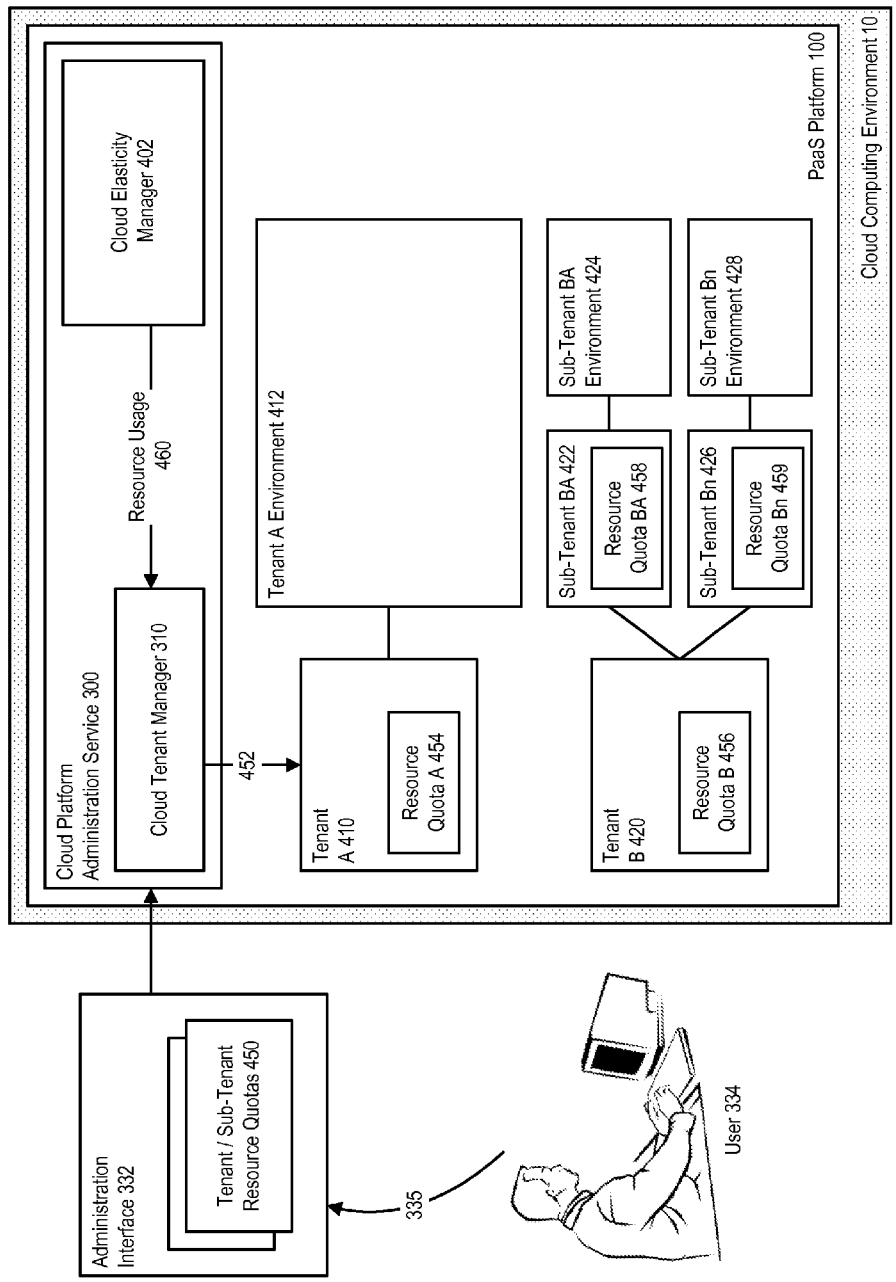
FIG. 16 illustrates the management of quota in a cloud environment, in accordance with an embodiment.

FIG. 16 illustrates the management of quota in a cloud environment, in accordance with an embodiment. As shown in FIG. 16, an elasticity manager 402 can provide resource usage information to a cloud tenant manager.

In accordance with an embodiment, each of a plurality of tenants, such as tenant A 410 and tenant B 420, can be associated with a tenant environment that allows services to be run for that tenant. Sub-tenants can also be associated with a (subn-tenant) environment.

For example, as shown in FIG. 16, a tenant B can include a plurality of sub-tenants BA 422 and Bn 426.

As also shown in FIG. 16, a tenant A can be associated with its environment 412, within which services can be provisioned and run, while each of the sub-tenants BA and Bn can be similar associated with their own environments 424, 428 respectively.

In accordance with an embodiment, a user can associate resource quotas 450, using the cloud tenant manager 452, with one or more tenants or sub-tenants, for example resource quota A 454, resource quota B 456, resource quotas BA 458 and Bn 459.

The cloud elasticity manager can then provide information 460 about resource usage within each environment to the tenant manager, for use in comparing each tenant's usage against its quota.

Figure 17:
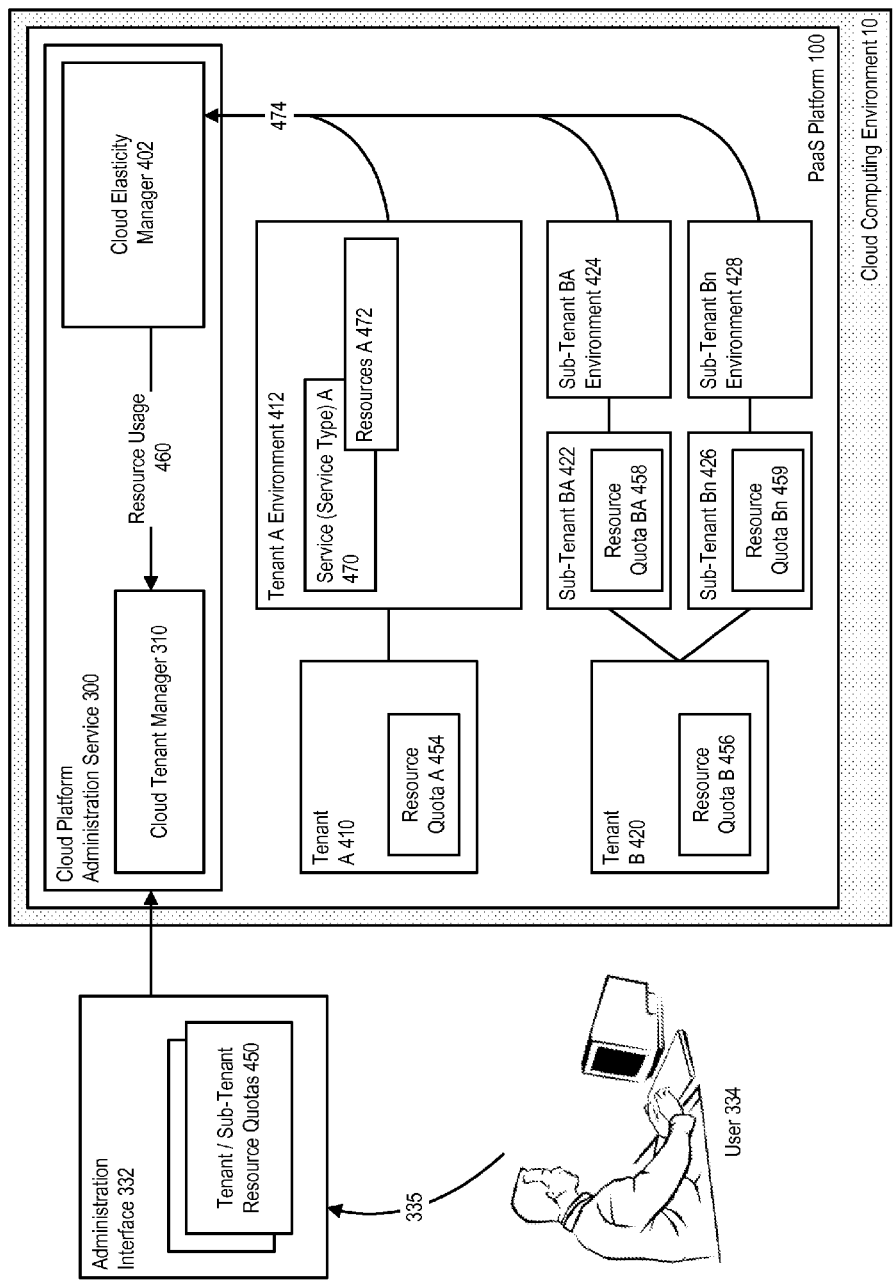
FIG. 17 further illustrates the management of quota in a cloud environment, in accordance with an embodiment.

FIG. 17 further illustrates the management of quota in a cloud environment, in accordance with an embodiment.

As shown in FIG. 17, in accordance with an embodiment, as services, or service types 470 utilize resources 472, information is communicated 474 to the cloud elasticity manager.

Figure 18:
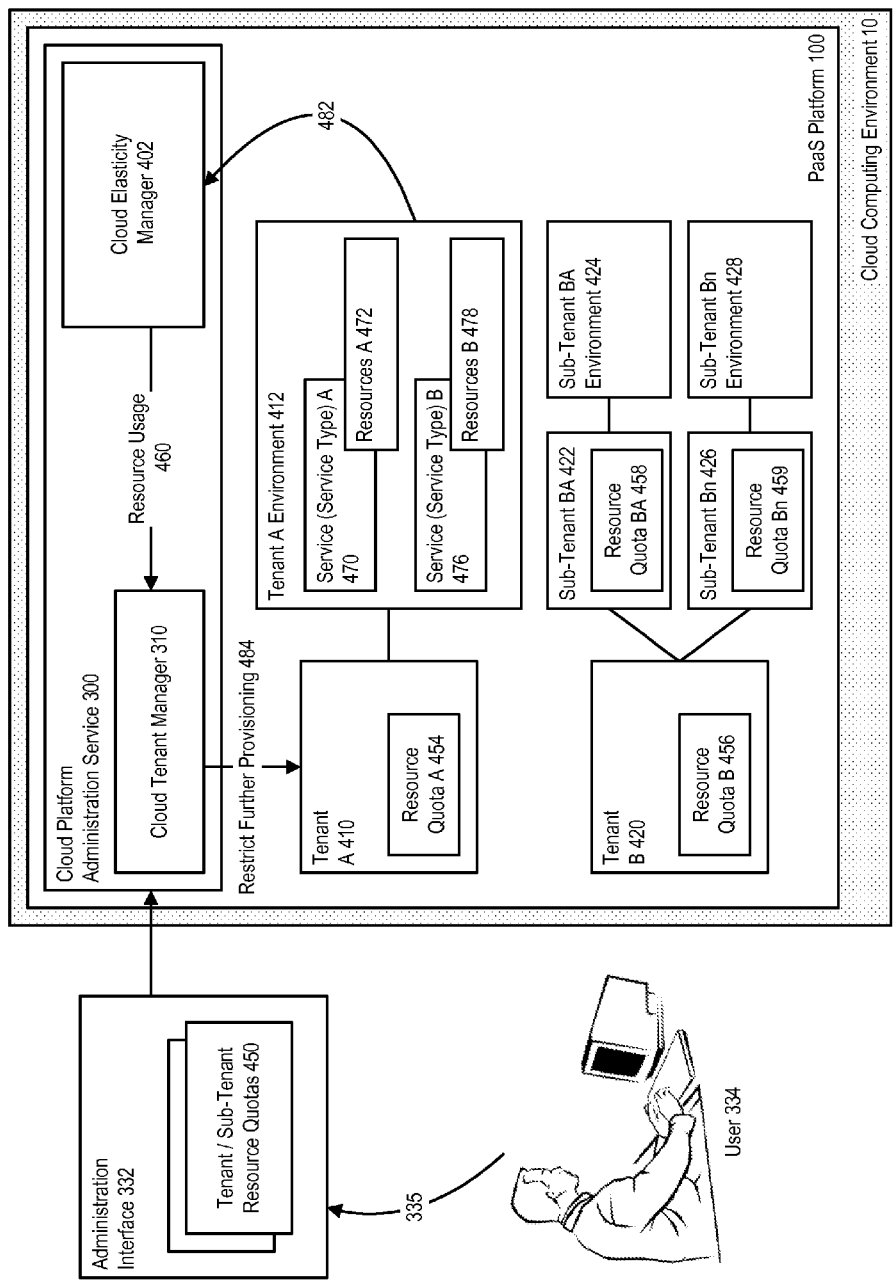
FIG. 18 further illustrates the management of quota in a cloud environment, in accordance with an embodiment.

FIG. 18 further illustrates the management of quota in a cloud environment, in accordance with an embodiment.

As shown in FIG. 18, as tenants add, for example, more services 476 to their environment, which continue to use resources 478, then information about that tenant's resource usage is provided to the elasticity manager 482.

In accordance with an embodiment, if the usage exceed the tenants (or sub-tenants) quota, then the cloud tenant manager can throttle 484, or otherwise prevent, the tenant from adding or using further services or resources, as defined by the quotas.

In accordance with an embodiment, a Quota Management will provide mechanisms to control consumption of various quota controlled resources by a given, e.g., Cloud Logic, tenant or sub-tenant. The following resources will support a quota:

Iaas Layer: Cores: Number of CPUs; ram Amount of RAM in MB; instances Number of VMs; ip-reservations Number of IP reservations; disk Amount of disk in MB.

PaaS layer: non-expiring-services Number of provisioned services which have no expiration date; expiring-services Number of provisioned services which have an expiration date; service type specific Number of provisioned services of a specific service type;

Several dynamic quota types can also be supported, for example Service Type and Service Resource Type quotas.

Quota Characteristics

In accordance with an embodiment, quota may only be associated with tenants, sub-tenants and environments, rather than, e.g., user specific quota or the ability to create arbitrary quota buckets that can be used on a case by case basis.

In accordance with an embodiment, a Platform Admin can assign quota to a tenant. A Platform Admin can also establish a default quota for tenants (used as a template when a tenant is created); establish a default quota for sub-tenants (used as a template when a sub-tenant is created); establish a default quota for environments (used as a template when an environment is created); or establish a default quota for self-service tenants (used as a template when a self-service tenant is created).

A Platform Admin can not change sub-tenant or environment quota. In accordance with an embodiment, if a quota is not set and default quota not established then the quota for that resource is unlimited.

In accordance with an embodiment, aTenant Admin can assign quota to sub-tenants and environments directly owned by the tenant.

In accordance with an embodiment, the assigned sub-tenant or environment quota can exceed the parent's tenant's quota, but the actual resource usage is constrained by the sub-tenant's quota and tenant's quota. The resource usage of a sub-tenant or an environment is limited by both the available quota of the sub-tenant and its parent's quota. In some instances, the aggregate quota for all the tenant's sub-tenants and environments can exceed the tenant's quota. (referred to as over allocation).

In accordance with an embodiment, only hard quota limits are supported.

Default Quota

In accordance with an embodiment, default quota values for each controlled resource are supported. The out-of-the box defaults can allow unlimited quota. The Platform Admin will be able to establish new default values. At tenant creation, each tenant can inherit the default quota values if not overridden at time of creation. If defaults values are changed, then all existing tenants continue to use their original default values. Only newly created tenants inherit the defaults.

Quota Limits

In accordance with an embodiment, the Platform Admin can update quotas assigned to the tenant. The Tenant Admin can update quotas assigned to the sub-tenant or their environments. In accordance with an embodiment, it is possible to assign unlimited quota for a given resource type.

Quota Enforcement

In accordance with an embodiment, IaaS level quota types can be enforced at the IaaS level (e.g., Nimbula); while PaaS level quota types will be enforced at the PaaS level (e.g., CloudLogic). The number of provisioned services type quota can be enforced in the service lifecycle (e.g., create-service, renew-service, etc.) workflow.

In accordance with an embodiment, if the quota for an existing tenant or environment is lowered then it will not impact any existing usage, even if the lowered value cause the existing usage to exceed the quota. However, new resources can not be utilized by the tenant until current resource usage drops below the new quota level.

Having available quota does not guarantee that the resources will actually be available to fulfill that quota.

Quota Monitoring

In accordance with an embodiment, the Platform Admin can view assigned quota and current consumption for all the tenants (and their sub-tenants). The Tenant Admin can view assigned quota and current consumption for all the tenants s/he belongs to as well as sub-tenants owned by those tenants. The Environment Admin can view assigned quota and current consumption for those environments the admin is associated with.

Self Service Quota Defaults

In accordance with an embodiment, a self-service tenant is a tenant that is dynamically created through an interface (e.g., a console that accepts corp LDAP credentials and creates a tenant for the identified self-service user). A self-service tenant inherit the self service quota defaults. These defaults can be established using the set-default-quotas command.

Data Model

In accordance with an embodiment, assigned quota and consumed quota is a non-negative number. The PaaS platform or cloud environment, for example a CloudLogic site, can store PaaS layer quota assignments, while IaaS layer quota assignment can be stored at an IaaS layer.

Data Model for System Level Data

In accordance with an embodiment, the following config beans can be used to model data stored for supported quota controlled resource types in the system.

```
@Configured
    interface QuotaControlledResourceTypes extends CloudService {
    @Element("*")
    List<QuotaControlledResourceType>
    getQuotaControlledResourceTypes( );
}
@Configured
    interface QuotaControlledResourceType extends Named {
    @Attribute
    int getTenantDefault( );
    void setTenantDefault(int defaultValue);
    @Attribute
    int getSub-tenantDefault( );
    void setSub-tenantDefault(int defaultValue); //XXX TODO Discuss,
    How will this approach
    // scale when we have multi level sub-tenants?
    @Attribute
    int getEnvironmentDefault( );
    void setEnvironmentDefault(int defaultValue);
    @Attribute
    int getSelfServiceDefault( );
    void setSelfServiceDefault(int defaultValue);
    @Attribute
    boolean isIAASQuota( );
    void setIAASQuota( ); //XXX TODO Check
    if HK2 allows not having a set to mark this
    // attribute as readonly
    @Attribut
    String getDescription( );
    void setDescription(String description);
}
```

In accordance with an embodiment, this data can be stored in domain.xml. The following is a snippet of domain.xml after the above entries are added:

```
<cloudservices>
...
<quotacontolledresourcetypes>
    <quotacontolledresourcetypename="ServicesQuota" tenantdefault="
    5" sub-tenantdefault="2" environmentdefault="1"
    selfservicedefault="1" IAASquota="false" description=
    "Quota type for number of services"/>
    <quotacontolledresourcetypename="InstancesQuota" tenantdefault="
    10"sub-tenantdefault="4" environmentdefault="2"
    selfservicedefault="2"IAASquota="true" description="Quota type
    for number of VM instances"/>
</quotacontolledresourcetypes>
...
</cloudservices>
```

In accordance with an embodiment, config modularity can be used to populate above list. For each quota controlled resource type in the system, a config bean extending QuotaControlledResourceType can be provided that defines it, for example:

```
@Configured
interface ServicesQuota extends QuotaControlledResourceType {
    @Attribute(defaultValue = "ServicesQuota")
    int getName( );
    void setName(String name);
    @Attribute(defaultValue = "5")
    int getTenantDefault( );
    void setTenantDefault(int defaultValue);
    @Attribute(defaultValue = "2")
    int getSub-tenantDefault( );
    void setSub-tenantDefault(int defaultValue);
    @Attribute(defaultValue = "1")
    int getEnvironmentDefault( );
    void setEnvironmentDefault(int defaultValue);
    @Attribute(defaultValue = "1")
    int getSelfServiceDefault( );
    void setSelfServiceDefault(int defaultValue);
    @Attribute(defaultValue = "false")
    boolean isIAASQuota( );
    void setIAASQuota( );
    @Attribute(defaultValue = "Quota type for number of services")
    String getDescription( );
    void setDescription(String description);
}
@Configured
interface InstancesQuota extends QuotaControlledResourceType {
    @Attribute(defaultValue = "InstancesQuota")
    int getName( );
    void setName(String name);
    @Attribute(defaultValue = "10")
    int getTenantDefault( );
    void setTenantDefault(int defaultValue);
    .
    .
    .
    @Attribute(defaultValue = "true")
    boolean isIAASQuota( );
    void setIAASQuota( );
}
```

Data Model for Account Level Data

In accordance with an embodiment, a PaaS level quota assigned to an account can be stored in a corresponding tenant.xml. The Tenant and TenantEnvironment can have a child config bean to represent quota consumed at the corresponding level. The IaaS level quota can be stored within the IaaS layer.

```
@Configured
interface QuotaControlledResources {
    @Element("*")
    List<QuotaControlledResource> getQuotaControlledResources( );
}
@Configured
interface QuotaControlledResource extends Named {
    @Attribute
    int getAssigned( ); //1
    => unlimited quota
    void setAssigned(int assignedValue);
    @Attribute
    int getConsumed( ); //quota consumed by all tenants and sub-tenants
    under this tenant
    void setConsumed(int newValue);
}
```

In accordance with an embodiment, at tenant and environment creation, the above can be populated with default quota. The following is a snippet of tenant.xml after above entries are added:

```
<tenant name="acme">
    ...
    <quotacontolledresources>
    <!tenantlevel quota >
    <quotacontolledresourcename="ServicesQuota" assigned="1"consumed="2"/>
    </quotacontrolledresources>
    ...
    <tenantenvironment name="tenantGlobalEnv">
        <quotacontolledresources>
        <!environment level quota >
        <quotacontolledresource name="ServicesQuota" assigned="2"
          consumed="1"/>
        </quotacontrolledresources>
        <service name="globalJavaService">
        ...
        </service>
        ...
    </tenantenvironment>
<tenant name="Hr">
    <quotacontolledresources>
    <!sub
    tenant level quota >
    <quotacontolledresource name="ServicesQuota" assigned="2" consumed="1"/>
    </quotacontrolledresources>
    ...
    <tenantenvironment name="HrTestingEnv">
        <quotacontolledresources>
        <!environment level quota >
        <quotacontolledresource name="ServicesQuota" assigned="2"
          consumed="1"/>
        </quotacontrolledresources>
        <serivce name="HrTestingJavaService">
        ...
        </service>
        ...
    </tenantenvironment>
    ...
</tenant>
```

Dynamic Quota Types—Service Type Quota

In accordance with an embodiment, it is possible to establish quota for service types.

For example, a service type specific quota may be used to control the number of services of the specific service type that can be provisioned by the tenant. A service type specific quota can be created when a new service type is created (via the create-service-type command), and deleted when the service type is deleted.

In accordance with an embodiment, the name of the service type quota corresponds to the name of the service type. Once the service type has been created, the name can appear as output of the list-quota-types command. The name can be used in any quota command that accepts a quote type name.

In accordance with an embodiment, when the service type is deleted (causing the corresponding quota type to be deleted), the quota type can no longer be used and will no longer be seen in quota command output. The service type quota is a dynamic quota type in that its existence is tied to resources that can be dynamically created and deleted by the Platform Admin. As such service type quotas only exist if the Platform Admin creates service types.

In accordance with an embodiment, the number of service type quotas that exist directly depends on the number of service types in existence. Much like static quota types, the Platform Admin and Tenant Admin can control specific values for these quota types on a tenant-by-tenant, or an environment-by-environment basis. The default for any newly created service type quota is unlimited.

The services quota type and the service type quota type are complementary in that, in order to provision a service of a specific service type, there must be a "services" quota and "service type" quota for that particular service type.

Service Resource Type Quota

In accordance with an embodiment, a quota can be established for service resource types. These dynamic quota types have identical semantics to service type quota, except that they will be created and deleted when a service resource types are create or deleted.

Unlike service type quota, there is no relationship with services quota, since service resource type quota only controls the number of service resources of a particular type that can be created.

Quota Enforcement—Service Expiration Quota

In accordance with an embodiment, quota types can be used to define how many expiring vs non-expiring services can be provisioned.

In accordance with an embodiment, a non-expiring service is defined to be a service that uses the PERMANENT reservation type.

In accordance with an embodiment, an expiring service is defined as a service that uses any other reservation type or was provisioned with the -expiration option supported by the create-service command. These quota types will be enforced when the service is created, as well as when/if the service is renewed via the renew-service command.

Create-Service Modifications to Enforce Quota

In accordance with an embodiment, the create-service command can be modified to to enforce service and service type quota. The create service operation will allow a tenant and environment option to uniquely identify the service as well as establish tenant and environment context for the operation. For example, the create-service CLI can look like the following:

```
tadmin --user chris create-service --tenant /acme/hr --environment devEnv
    --serviceType JavaServiceType JavaService
``` where "acme" is the tenant, "hr" is the sub-tenant, "devEnv" is the environment and "JavaService" is the service's name.

In accordance with an embodiment, the command will defer to the quota implementation to verify there is sufficient service and service type quotas to perform the operation. The implementation will lock the tenant store, and proceed to walk up the tenant hierarchy to verify sufficient quotas are available in the environment, sub-tenant and parent tenant. If sufficient quotas are available, then the appropriate service quota (expiring vs non-expiring) and service type (specific) quota will be incremented, the lock will be released, and the create service operation will continue.

If the create-service operation fails without creating the service, or when the service is terminated, then the tenant store will again be locked and the service quota decremented.

Quota Controlled Resource Type

In accordance with an embodiment, when new quota controlled resource types are introduced, the module introducing the new resource type will need to do following: 1. Add a config bean like NumerOfServicesQuota above that defines name of the quota and out-of-the-box default for the quota type. 2. Evaluate the operations that create and free the resource type. 3. Introduce logic to enforce the quota as required by those operations.

Quota Usage

In accordance with an embodiment, environments that utilize, e.g., Nimbula can support hierarchical quota. This allows the format of a quota object to be represented as a hierarchy where each level in the hierarchy may have quota assigned to it, for example:

```
/acme 10
/acme/HR 5
/acme/HR/Env1 3
```

For example, in accordance with an embodiment, if all the quota at the /acme level is used then operations that attempt to use quota at the /acme/HR or /acme/HR/Env1 level would be blocked.

In accordance with an embodiment, for environments such as Cloud Logic, quota objects can be created for tenants, sub-tenants and environments. The named quota objects created in Nimbula can be maintained under quota:/<tenant>/projects in Nimbula. The names stored under "projects" in Nimbula can mirror the hierarchical names used for tenants, sub-tenants and environments in the, e.g., CloudLogic environment.

For example, if a Cloud Logic user creates an environment called Env1 under sub-tenant HR for tenant acme, then a quota object can be created in Nimbula called quota:/acme/projects/acme/HR/Env1. This quota object would be referenced when performing operations in the context of the Env1 environment. If a tenant admin modified quota for their sub-tenant /acme/HR the system can modify the corresponding Nimbula quota object: quota:/acme/projects/acme/H R.

In accordance with an embodiment, use of a hierarchical quota introduces a source of possible confusion to end users. For example if the Environment Admin for Env1 checks their quota they would see they have a limit of 3. But it is possible they could never use 3 because at the /acme level all 10 "objects" have been consumed by entities at the /acme or /acme/HR level. In order to avoid this confusion, an "available" quota indication can be included in the list-quotas command's output:

| padmin --listquotas --tenant /acme/sub-tenant1 | | | |
| --- | --- | --- | --- |
| TYPE | USED | AVAILABLE | QUOTA |
| instances | 10 | 1 | 11 |
| cores | 10 | 5(*) | 20 |
| ram | 3000 | 0 | 3000 |
| ipreservations | 5 | unlimited | unlimited |
| disk | 1000 | 2000 | 3000 |
| non-expiring-services | 5 | 5 | 10 |
| expiring-services | 5 | 5 | 10 |

(*In the above, available resources are reduced due to quota usage in the parent entity. In the above example, the USED column represents actual usage by the tenant or environment. The QUOTA column represents how much quota they were given by their parent. The AVAILABLE column represents what they actually have available to them. This value would never be greater than the QUOTA value. This value could be less than QUOTA—USED if resources have been used higher in the quota hierarchy and there is not enough quota remaining at that level to satisfy the quota requirements of the lower level sub-tenants or environments.

Public Interfaces

In accordance with an embodiment, CLIs for setting/retrieving default quotas and setting/retrieving quotas assigned to tenants/sub-tenants/environments can be provided. The parameter 'value' for all the commands below can be either a non negative integer or 'UNLIMITED' to correspond with actual quota value or unlimited quota. A value of '0' implies no quota assigned.

Some example commands and outputs can include:

Subcommand Set-Default-Quotas

Set the default quota for tenants, sub-tenants or self-service tenant.
Operand attr=value:* (where attrs can be cores, disk, instances, ipreservations, services) At least one attr is required.
Options [--scope tenant|sub-tenant|environment|self-service] (default: tenant)

```
padmin setdefaultquotas
    scope sub-tenant instances=4:disk=1000:cores=4
```

Subcommand List-Default-Quotas

List the default quota for tenants, sub-tenants or self-service tenant.
Operand None
Options [--scope tenant|sub-tenant|environment|self-service] (default: tenant)

padmin listdefaultquotas

| TYPE | QUOTA |
| --- | --- |
| instances | 20 |
| cores | 20 |
| ram | unlimited |
| ipreservations | unlimited |
| disk | 8000 |
| nonexpiringservices | 2 |
| expiringservices | 5 |

Subcommand List-Quota-Types

Lists the available quota types and their description. The quota type can be changed by used in other quota commands.
Operand None
Options [--long/-l]

padmin listquotatypes

| TYPE | DESCRIPTION |
| --- | --- |
| instances | Number of VM instances which may be launched |
| cores | Number of processor cores which may be allocated |
| ram | Amount of RAM that can be allocated in MB |
| ipreservations | Number of IP reservations allowed |
| disk | A mount of storage that can be allocated in MB |
| nonexpiringservices | Number of services with no expiration date that can be provisioned |
| expiringservices | Number of services with an expiration date that can be provisioned |

Subcommand Update-Quotas

Update one or more quotas for a tenant, sub-tenant or environment
Operand attr=value:* (where attrs can be cores, disk, instances, ipreservations, services) At least one attr is required.
Options --tenant <tenant/path> (path of tenant or sub-tenant)
Options [--environment <environment>] (name of the environment)
padmin --updatequotas --tenant acme instances=9:disk=2000:cores=18

Subcommand List-Quotas

List quota limits and current usage for a tenant or sub-tenant.
Operand [attr:*] (where attrs can be cores, disk, instances, ipreservations, services) If no attrs provided then all will be displayed
Options --tenant <tenant/path> (path of tenant or sub-tenant)
Options --environment <environment> (name of the environment)
Options --limit/-m (show only quota types that are at or over their limit)

| TYPE | USED | AVAILABLE | QUOTA |
| --- | --- | --- | --- |
| padmin --listquotas --tenant /acme/sub-tenant1 | | | |
| instances | 10 | 1s | 11 |
| cores | 10 | 5(*) | 20 |
| ram | 3000 | 0 | 3000 |
| ipreservations | 5 | unlimited | unlimited |
| disk | 1000 | 2000 | 3000 |
| nonexpiringservices | 5 | 5 | 10 |
| expiringservices | 5 | 5 | 10 |
| padmin listquotas | | | |
| tenant /acme/sub-tenant1 instances:cores | | | |
| instances | 10 | 1 | 11 |
| cores | 10 | 5(*) | 20 |

Subcommand Create-Tenant

The create-tenant command will accept the --quotas option to allow quotas to be set when the tenant or sub-tenant is created.
Operand tenant or sub-tenant name
Options [--quotas attr=value:*] (where attrs can be cores, disk, instances, ipreservations, services)
tadmin create-tenant --quotas instances=9:disk=2000:cores=18 /acme/venus Subcommand Create-Environment The create-environment command will accept the --quotas option to allow quotas to be set when the environment is created.
Operand environment name
Options [--quotas attr=value:*] (where attrs can be cores, disk, instances, ipreservations, services)

```
tadmin create-environment --tenant /acme --quotas
    instances=9:disk=2000:cores=18 Env1
```

Console Impact

In accordance with an embodiment, during create tenant/sub-tenant/environment operations the admin should be able to control the amount of resources assigned (via quota). The platform/tenant/sub-tenant admin should be able to change the quota values for tenants/sub-tenants/environments they own. The tenant/sub-tenant/environment admin should be able to view their available quota.

In accordance with an embodiment, the Platform Admin should be able to control the quota defaults for tenants/sub-tenants and environments. The Platform/tenant/sub-tenant admin should be able to view quota defaults.

In accordance with an embodiment, the Console should be prepared for a create-service or scale up operation to fail due to lack of quota for the resource. Service Type and Service Resource Type quota is dynamic—in that when either type is created, a new quota type comes into existence. When a service type or service resource type is deleted the corresponding quota type is deleted. The Console must be able to deal with quota types coming and going dynamically.

Process for Management of Quota

Figure 19:
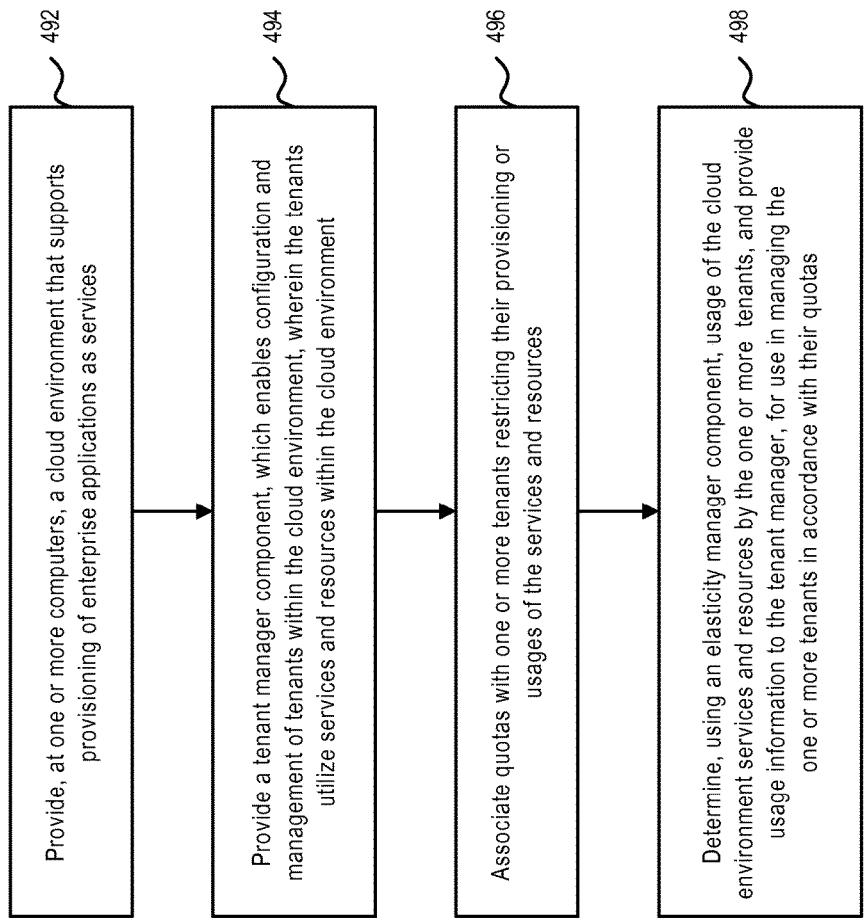
FIG. 19 is a flowchart of a method of providing management of quota in a cloud environment, in accordance with an embodiment.

FIG. 19 is a flowchart of a method of providing management of quota in a cloud environment, in accordance with an embodiment.

At step 492, a cloud environment that supports provisioning of enterprise applications as services is provided at one or more computers.

At step 494, a tenant manager component is provided, which enables configuration and management of tenants within the cloud environment, wherein the tenants utilize services and resources within the cloud environment.

At step 496, quotas are associated with one or more tenants restricting their provisioning or usages of the services and resources.

At step 498, a determination is made, using an elasticity manager component, of usage of the cloud environment services and resources by the one or more tenants, and provide usage information to the tenant manager, for use in managing the one or more tenants in accordance with their quotas.

Service Expiration

In accordance with an embodiment, the system includes a plurality of services which can be used by applications within the cloud environment, wherein the services can be associated with and utilize resources within the cloud environment. A service expiration component associates reservations with the services, periodically determines a status of the reservations and of any expired services associated therewith, and instructs the system to release the resources of expired services, for use by other services.

In accordance with an embodiment, resource usage is one of the concerns that a Platform Administrator needs to handle. For example, in addition to quota, a lot of times services that are created are not used after the initial use of the service. In order to reclaim resources, the system, for example a PaaS platform, CloudLogic or other cloud environment can support expiring of services. When creating a service, a type of reservation can be associated by the tenant admin creating the service. The reservation types available in the system are defined by the Platform Administrator.

In accordance with an embodiment, an Expiration Manager automatically starts whenever CPAS starts, and schedules itself to run the next time a service needs expiration attention, for example, when a notification (e.g., email) is due to be sent out, or reminder messages of the impending expiration; notification after expiring a service; notification after terminating a service; weekly notification with a summary of actions; notification that a service should be stopped; or that a service should be terminated; or that a service just changed; or that a summary report is due to be generated. A CEM (Cloud Event Manager) can be used for sending the above messages, for example via email.

Figure 20:
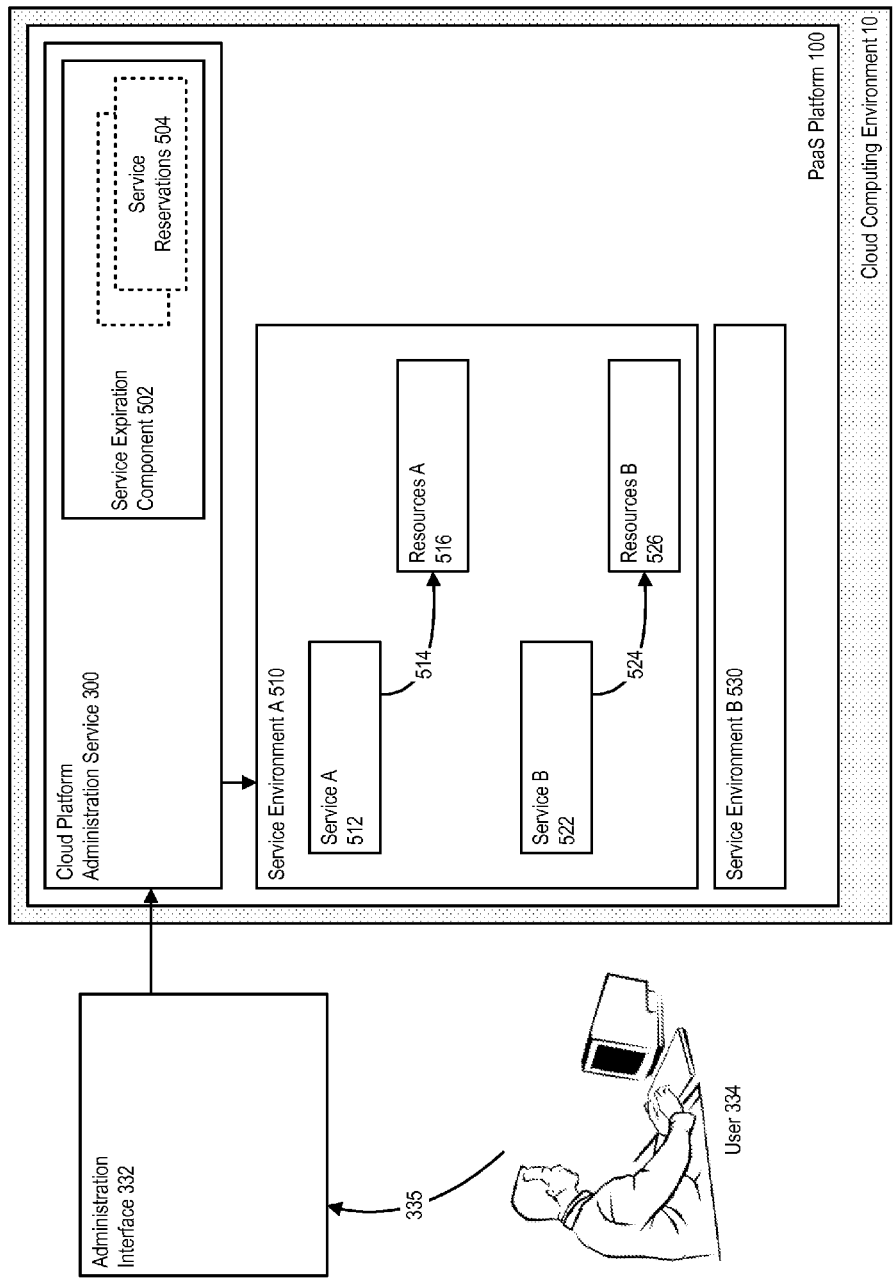
FIG. 20 illustrates service expiration in a cloud environment, in accordance with an embodiment.

FIG. 20 illustrates service expiration in a cloud environment, in accordance with an embodiment. As shown in FIG. 20, in accordance with an embodiment, a service expiration component 502 allows service reservations 504 to be associated with services.

In accordance with an embodiment, each of a plurality of service environments, for example service environment A 510, and service environment B 530, can include services, such as Service A 512 and Service B 522, that are associated with 514, 524 or otherwise utilise resources A 516 and resources B 526 respectively.

Figure 21:
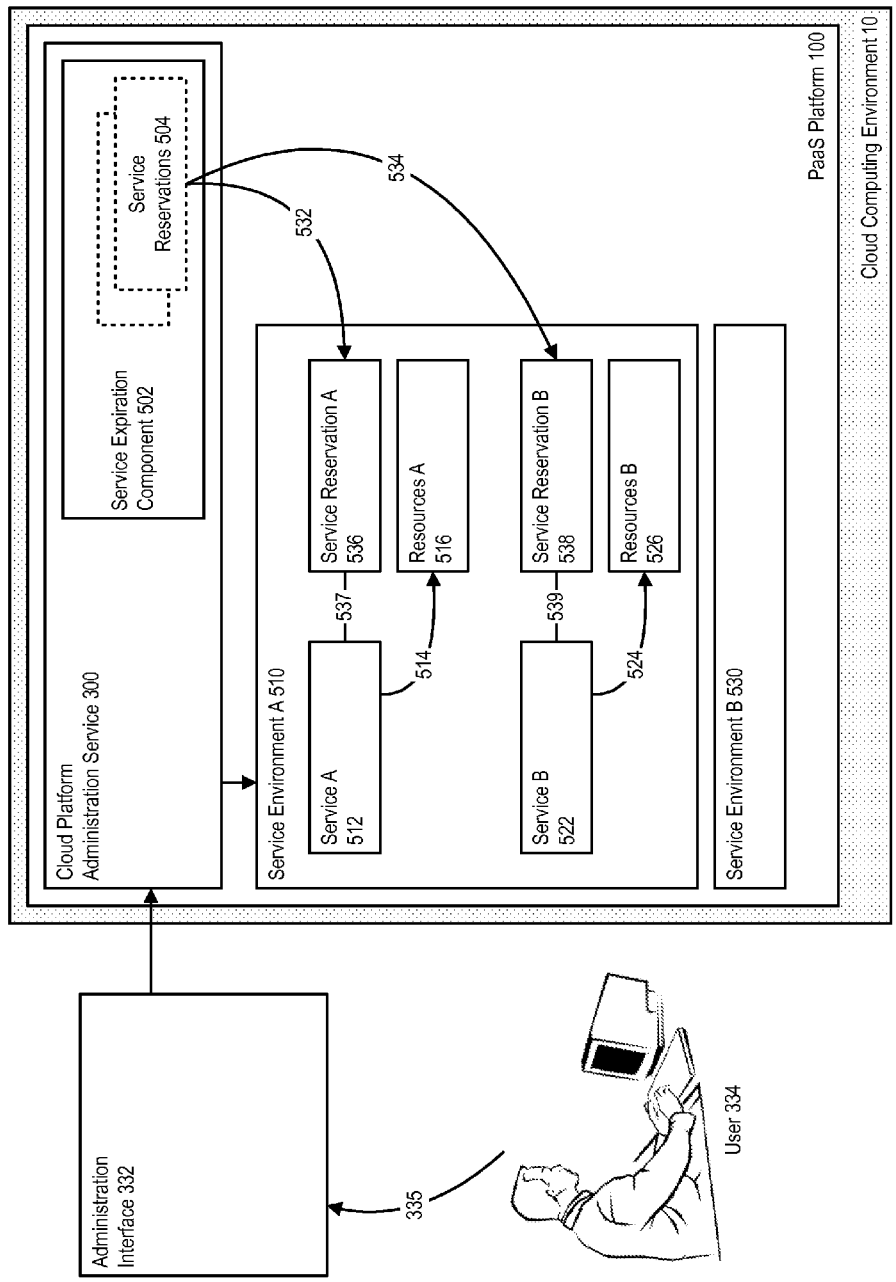
FIG. 21 further illustrates service expiration in a cloud environment, in accordance with an embodiment.

FIG. 21 further illustrates service expiration in a cloud environment, in accordance with an embodiment.

As shown in FIG. 21, in accordance with an embodiment, the cloud platform administration service and service expiration component can associate 532, 534 reservations, such as a service reservation A 536 and a service reservation B 538, with the service A and B 537, 539 respectively, that allow those services to use those resources for a period of time.

Figure 22:
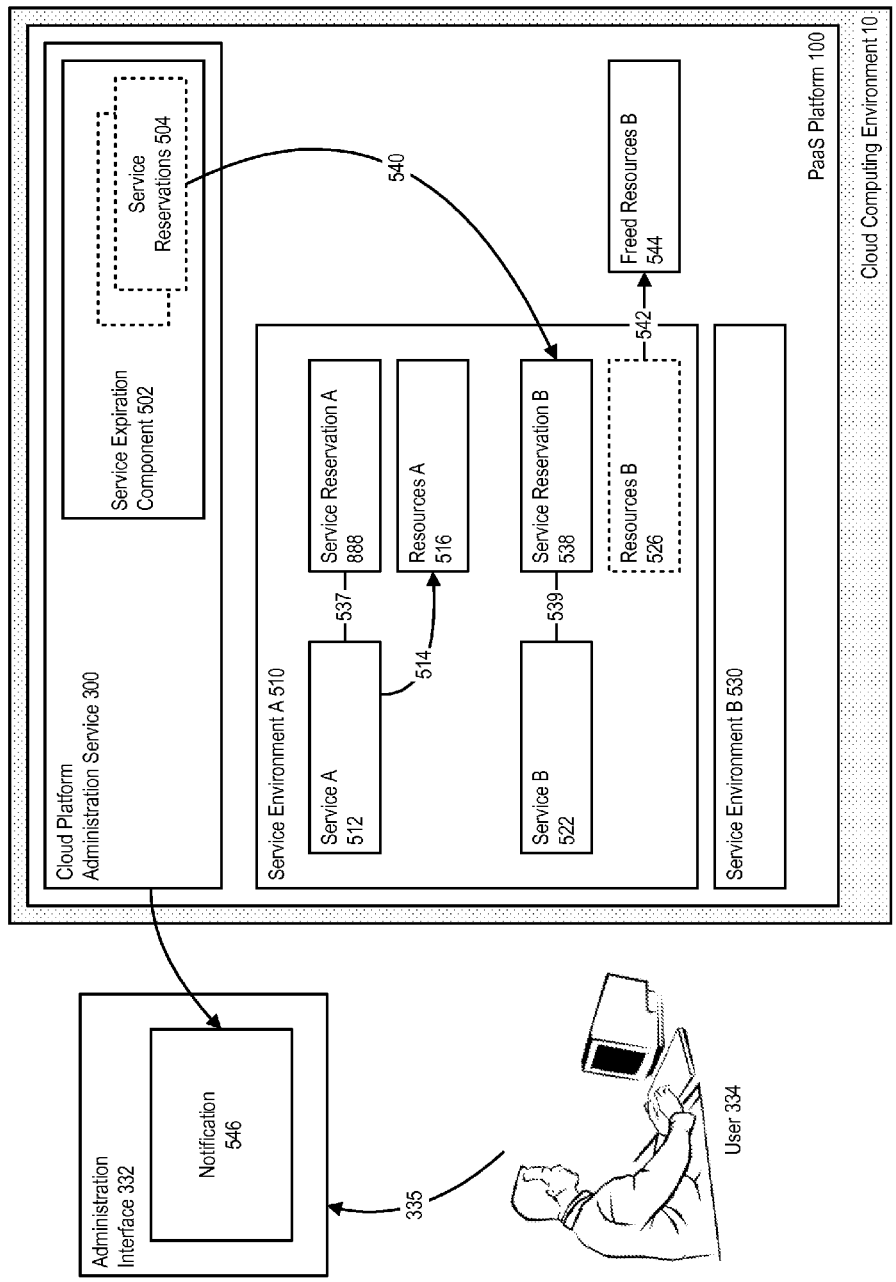
FIG. 22 further illustrates service expiration in a cloud environment, in accordance with an embodiment.

FIG. 22 further illustrates service expiration in a cloud environment, in accordance with an embodiment.

As shown in FIG. 22, if at a later period of time, the service expiration component determines 540 that a particular reservation has expired, then the reservation can be expired 542, and its resource freed up 544, for use by other services.

Figure 23:
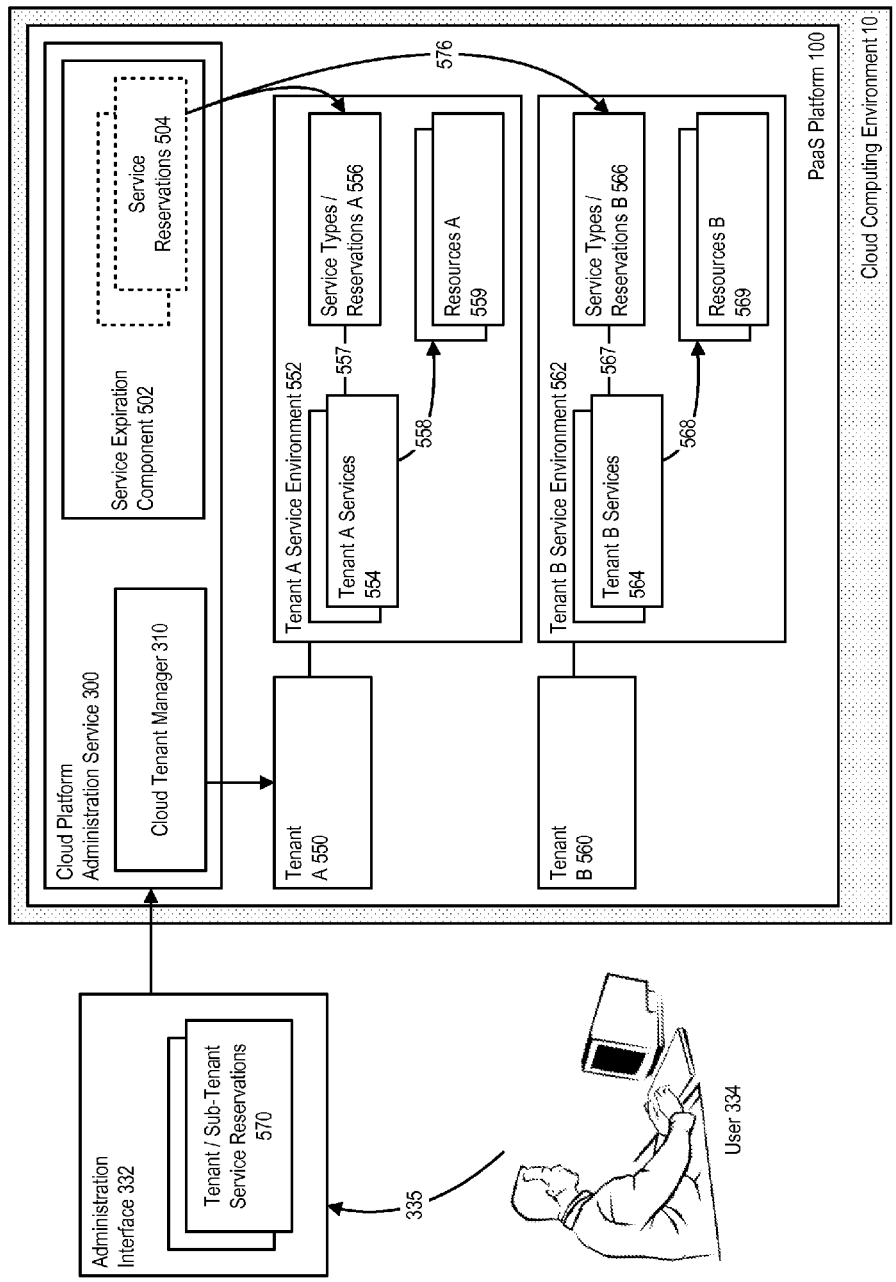
FIG. 23 illustrates service expiration in a multitenant cloud environment, in accordance with an embodiment.

FIG. 23 illustrates service expiration in a multitenant cloud environment, in accordance with an embodiment.

As shown in FIG. 23, in accordance with an embodiment, each of a plurality of tenants, such as tenant A 550 and tenant B 560, can be associated with a tenant's service environment such as 552 and 562 respectively. Similar to that described above, services 554, 564 can receive reservations 556, 566 that are associated with the services 557, 567, and are used to utilize 558, 568 resources 559, 569.

In accordance with an embodiment, a user can specify a service reservation 570. The service expiration component can allocate 576 reservations, and subsequently determine expired reservations, so that resources can be freed up.

Generally, older services that are using resources can pile up. To prevent maintenance problems keeping track of such services, the system can timestamp when a service will expire when the service is created, which will then be expired in a timely fashion.

In accordance with an embodiment, when a service enters the expired state it can be stopped, and possibly deleted, the next time that the Expiration Manager wakes.

In accordance with an embodiment, all services can have an expiration timestamp, which can be an absolute calendar time. If the service never expires it will be marked as such. The service will be considered expired once that timestamp has moved into the past.

In accordance with an embodiment, the high-level requirements for operating an Expiration Manager are:

The configuration for the Expiration Manager must be persisted in domain.xml.

Admin Commands must be provided for the administrators to list and edit the configuration for the Expiration Manager.

An Admin Command must be provided for listing the expiration times for services.

Each service must have an absolute expiration timestamp assigned to it.

If no reservation-type is specified when creating a service then the default reservation-type from the global Expiration Manager configuration can be applied to that service.

An Admin Command to arbitrarily change the expiration time of any existing service must be provided for administrators.

Expiration must be consistently enforced. No expired service will be allowed to start.

No scaleup will be allowed on an expired service that is running (an abnormal situation).

If the auto-delete flag is true then services can be automatically deleted upon expiration plus the auto-delete-wait period.

In accordance with an embodiment, the Expiration Manager can be provided as an HK2 Service running in CPAS. It can be provided as a startup service so it will always run when CPAS is started.

Subsequently, the Expiration Manager can wake up periodically and handle any services that have expired. In accordance with an embodiment, the Expiration Manager wakes up "just-in-time". I.e. it does not poll but, rather, knows when the next time it is needed, and arranges to wake up at that time.

In accordance with an embodiment, when the Expiration Manager runs, it gets the list of all expired services. If there are any such services it performs expiration tasks as follows: 1. At the configured time before expiration send a notification email; 2. stop the service; and 3. terminate the service if configured to do so and possibly after a configured delay after expiration. If auto-delete is false, do not terminate the service.

In accordance with an embodiment, after running the above task(s), the Service then performs the tasks: setup itself to run again the next time one of the above 3 tasks is needed to start; go to sleep; and ongoing—maintain a listener thread that listens for changes in the time of the next task. For example, if the next task is to send out an email notification in one month, and an administrator changes that to tomorrow, then the task that is scheduled to run in one month will be modified to instead run the next day.

In accordance with an embodiment, when a service is created it will have an expiration time attached. The time can be calculated by adding the appropriate expiration time period to the current UTC time. The appropriate time period will be taken from the service-type configuration. The expiration period is optional in the service-type. If it is not specified, then the value from the Expiration Manager configuration will be used.

Notification

In accordance with an embodiment, a CloudLogic Event Service can be used to send messages (e.g., email) at configurable times before expiration.

For example, a user can specify an arbitrary list of times to send reminder messages before expiration, for example to send an email to the administrator 1 month, 1 week and 1 day before expiration the "notify" attribute of the service element would be: "P1M, P1W, P1D". Another email is sent immediately after expiration. For example, it can report whether or not the service was stopped. An email can be sent when the service is terminated.

In accordance with an embodiment, the Expiration Manager will maintain a simple log of its actions, and can, for example, send a weekly summary of its past activity to the administrator via email.

Administrator Usage Walk-Through

In accordance with an embodiment, there will be one Expiration Manager in CPAS. One config element will always be in domain.xml for storing the properties. Administrators can be allowed to configure the properties of the Expiration Manager, but not delete it. Instead of deleting the Expiration Manager, a way can be provided to enable/disable it. The configuration for the Expiration Manager will be generated anytime CPAS starts and it is not already present. Thus, there is no need for create or delete commands.

The following is an exemplary end-to-end walk-through for an Administrator configuring a freshly installed CloudLogic installation, in accordance with an embodiment.

Start-Domain

```
$ padmin start-domain
...
```

Create-Account
$ padmin create-account a1
Account a1 created successfully. The Account Administrator for this account is: admin. The command create-account executed successfully.
List-Accounts

```
$ padmin list-accounts
a1
```

The administrator checks the properties of the Expiration Manager:
Get-Expiration-Service-Config

```
$ padmin get-expiration-service-config
    --default-reservation-type PERMANENT
    --enabled true
```

The administrator decides to change the attributes of the Expiration Manager. In this example, the default-reservation-type expiration is changed from PERMANENT to long. The Expiration Manager is verified to be set to enabled.
Configure-Expiration-Service

```
$ padmin configure-expiration-service
    --defaultreservationtype long
    --enabled true
```

Verify the changes:
Get-Expiration-Service-Config

```
$ padmin get-expiration-service-config
default-reservation-type long
enabled true
```

Create a virtualization provider. In this case a physical (native) provider can be used:
Create-Virtualization-Provider-Physical
$ padmin create-virtualization-provider-physical veep
Check the providers:
List-Virtualization-Providers

```
$ padmin list-virtualization-providers
veep physical default
```

Load the java-lite SDP:
Load-Sdp

```
$ padmin load-sdp java-lite-service-native.sdp
SDP loaded with name Java-Service-Lite.
Assembly uploaded with name glassfish, version 1.
service-definition-package element created with name Java-Service-Lite.
Application deployed with name
com.oracle.glassfish.paas.java-lite-service-sme-
4.0.0.SNAPSHOT.
```

Check the sdp:
List-Sdps

```
$ padmin list-sdps
Oracle-Traffic-Director
JavaDB
OracleDatabase
Java-Service-Lite
```

Create a service type using the new sdp:
Create-Service-Type

```
$ padmin create-service-type --sdp Java-Service-Lite JSType1
A service type with name JSType1 has been created.
```

The Administrator creates 4 reservation types:
Create-Reservation-Type

```
$ padmin create-reservation-type --duration P15D
    --autodelete true --autodeletewait --notify P1D short
$ padmin create-reservation-type --duration P6M
    --autodelete true --autodeletewait T36H --notify P1W, P1D medium
$ padmin create-reservation-type --duration P1Y
    --autodelete true --autodeletewait P7D long
$ padmin create-reservation-type --duration P1M
    --autodelete false --autodeletewait P2D --notify -1 nonotify
```

Verify the new reservation-types. Notice that since long had no notify option, it will get a reasonable value calculated by the Expiration Manager itself. A value of "−1" or "0" for notify means do not notify.
List-Reservation-Types $ padmin list-reservation-types

| NAME | DURATION | AUTO-DELETE | AUTO-DELETE-WAIT | NOTIFY BEFORE | DE-FAULT |
|---|---|---|---|---|---|
| short | 15 days | true | NONE | P1D | NO |
| medium | 6 months | true | P1DT12H | P1W, P1D | NO |
| long | 1 year | true | P1W | P1M, P2D, P1D | NO |
| nonotify | 1 month | false | 2 days | NONE | NO |
| PERMANENT | — | false | NONE | NONE | YES |

Change the default reservation-type for services that are created without specifying a reservation-type:
Set-Default-Reservation-Type

```
$ padmin set-default-reservation-type long
Default reservation-type set to long.
```

Verify that the default is now long:
List-Reservation-Types $ padmin list-reservation-types

| NAME | DURATION | AUTO-DELETE | AUTO-DELETE-WAIT | NOTIFY BEFORE | DE-FAULT |
|---|---|---|---|---|---|
| short | 15 days | true | NONE | P1D | NO |
| medium | 6 months | true | P1DT12H | P1W, P1D | NO |
| long | 1 year | true | P1W | P1M, P2D, P1D | YES |
| nonotify | 1 month | false | 2 days | NONE | NO |
| PERMANENT | — | false | NONE | NONE | NO |

For the following create-service calls, today is defined to be 2013 May 15. Create and start a new service with a reservation-type of short:
Create-Service

```
$ cadmin create-service --service-type JSType1
    --reservation-type short shortservice
38%: create-service.Pre-Provisioning Phase.pre-provisioning association:
Checked...
50%: create-service.Provisioning Phase.Service Provisioning:
Create Service [shortservice]
96%: create-service.Post-Provisioning Phase.post-provisioning association:
Checked...
Successfuly created the service, shortservice.
It will expire in 15 days on 2013-05-30
```

Create and start a new service with an absolute expiration date. No reservation-type is specified and it is an error to specify both --expiration and --reservation-type
Create-Service

```
$ cadmin create-service --service-type JSType1 --expiration 2018-07-11
    --auto-delete false xlongservice
38%: create-service.Pre-Provisioning Phase.pre-provisioning association:
Checked...
50%: create-service.Provisioning Phase.Service Provisioning: Create
Service
[shortservice]
96%: create-service.Post-Provisioning Phase.post-provisioning association:
Checked...
Successfuly created the service, xlongservice.
It will expire on 2018-07-11.
```

Create-Service

In accordance with an embodiment, the same --expiration option can be used to specify both durations and absolute dates. The auto-delete-wait can also be specified as an absolute date or a duration relative to the expiration date:

```
$ cadmin create-service --service-type JSType1 --expiration P10Y6M
    --auto-delete-wait P1M xxlongservice
38%: create-service.Pre-Provisioning Phase.pre-provisioning association:
Checked...
50%: create-service.Provisioning Phase.Service Provisioning: Create
Service
[shortservice]
96%: create-service.Post-Provisioning Phase.post-provisioning association:
Checked...
Successfuly created the service, xxlongservice.
It will expire on 2023-11-15.
```

Check that the new services are present. Verify that the expiration time was set to 15 days from now (now is May 15, 2013) for shortservice; and on 2018 Jul. 11 for xlongservice; and 10 years, 6 months from today for xxlongservice:

List-Services

| | | | | $ cadmin list-services | | | |
|---|---|---|---|---|---|---|---|
| NAME | TYPE | STATE | RSV-TYPE | Created | Expires | AutoDelete | ExpireState |
| short | 1 | RNG | short | 2013-05-15T10:00 | 2013-05-30T10:00 | 2013-05-30T10:00 | ACTIVE |
| medium | 1 | RNG | medium | 2012-11-30T11:14 | 2013-05-30T11:14 | 2013-05-31T23:14 | ACTIVE |
| long | 1 | STPD | long | 2013-02-22T07:13 | 2014-02-22T07:13 | NEVER | ACTIVE |
| perm | 1 | RNG | PERMANENT | 2013-04-02T05:11 | NEVER | NEVER | ACTIVE |
| nn | 1 | STPD | nonotify | 2013-04-15T05:11 | 2013-05-15T05:11 | 2013-05-17T05:11 | EXPO-WAIT |
| xlong | 1 | RNG | somename | 2013-05-15T10:02 | 2018-07-11T10:02 | NEVER | ACTIVE |
| xxlong | 1 | RNG | thername | 2013-05-15T10:06 | 2023-11-15T10:06 | 2023-12-15T10:06 | ACTIVE |

If the user tryes to start nnservice which has expired but has not been deleted yet (for example it is currently May 15, 2013, 10 AM UTC, and is in the waiting-to-be-deleted state) the system will refuse to start it since it has expired:

```
$ cadmin start-service oldservice
oldservice expired on 2013-05-15 and can no longer be started.
It will automatically be deleted on 2013-05-17.
```

In this example, the Account Administrator agrees to renew an expired service for 1 year. Note that the command simply adds the time associated with the given reservation-type to the current time. The sum is the new expiration time. For example, if it is January 15 and the service expires on February 15 and the reservation-type is for 2 months, then the new expiration date is March 15 not April 15. In summary, the additional time period is not added to the current expiration time; but is instead added to the current actual time. The renew-service will accept either a --reservation-type, or nothing which means use the saved duration:
Renew-Service

```
$ cadmin renew-service --reservation-type long oldservice
oldservice has been renewed for an additional 1 year.
It expires one year from today on 2014-05-16
```

Make sure that the renewed service can now be started:
Start-Service

```
$ cadmin start-service oldservice
oldservice has started.
```

Similar to create-reservation-type, a new command can be added to allow changing the duration of an existing reservation-type. In this example the reservation type is changed from short from 15 days to 30 days. This will have no effect on any existing services. The new duration will only be applied to new services that use that reservation-type.
Configure-Reservation-Type

```
$ padmin configure-reservation-type --duration 30d short
Expiration period changed from 15 days to 30 days for reservation-type short
```

List-Reservation-Types

| | | | | |
|---|---|---|---|---|
| | | $ padmin list-reservation-types | | |
| NAME | DURATION | AUTO-DELETE | AUTO-DELETE-WAIT | DE-FAULT |
| short | 30 days | true | none | NO |
| medium | 6 months | true | 36 hours | NO |

-continued

| | | | | |
|---|---|---|---|---|
| | | $ padmin list-reservation-types | | |
| NAME | DURATION | AUTO-DELETE | AUTO-DELETE-WAIT | DE-FAULT |
| long | 1 year | true | 1 week | YES |
| PERMANENT | — | false | none | NO |

To round out the CrUD commands the system can support deletion. For example, the medium reservation-type can be deleted:
Delete-Reservation-Type

```
$ padmin delete-reservation-type medium
reservation-type medium was deleted
```

List-Reservation-Types

| | | | | |
|---|---|---|---|---|
| | | $ padmin list-reservation-types | | |
| NAME | DURATION | AUTO-DELETE | AUTO-DELETE-WAIT | DE-FAULT |
| short | 15 days | true | none | NO |
| long | 1 year | true | 1 week | YES |
| PERMANENT | — | false | none | NO |

Reservation-Type Element
One reservation-type, PERMANENT, is special. It may not be deleted and its attributes may not be changed. These elements are contained by the service-expiration-manager element.

```
<reservationtype name="short" duration="P2W1D" autodelete="true"
    autodeletewait="0" notify="P1D"/>
<reservationtype name="medium" duration="P6M" autodelete="true"
    autodeletewait="P1DT12H" notify="P1W, P1D"/>
<reservationtype name="long" duration="P1Y" autodelete="false"
    autodeletewait="P1W"/>
<reservationtype name="ultrashort" duration="P2D" autodelete="true"
    autodeletewait="P1M, P2D, P1D"/>
<reservationtype name="PERMANENT" duration="1"autodelete="false"
    autodeletewait=""notify=""/>
```

Service Element
In accordance with an embodiment, new required attributes can be added, including, for example creation-time; original-reservation-type; reservation-duration; auto-delete; auto-delete-wait; and notify-before-delete.
In accordance with an embodiment, a copy of the contents of the reservation-type can be kept separately, because the reservation-type can be changed at any time. This is mainly for keeping a paper trail of what happened—services can run for a very long time, and the system can not necessarily calculate the expiration-time using the creation-time and the reservation-duration because of the renew-service command. In accordance with an embodiment, a viz. reservation-duration is simply a copy of the original duration.

```
<service name="myservice" expirationtime=" 20130728T11: 03:17
    "creationtime=" 20130128T11:03: 17" reservationtype="medium"
    reservationduration="P6M"
    autodelete=" true" autodeletewait=" P2DT12H"
    notifybeforedelete=" P2W,P1W,P1D" >
    ....
</service>
```

Service-Expiration-Manager Element

In accordance with an embodiment, config-modularity can be used for this configuration.

Expiration-Service Attribute Description

In accordance with an embodiment, this is enabled If false, then the service does not run or do anything at all. The default is true or auto-delete. A boolean for setting can be used to indicate whether or not the Expiration Manager service will actually delete services. The default is true.

In accordance with an embodiment, auto-delete-wait is the period of time to wait after expiration to permanently delete the service. The default is 0.

In accordance with an embodiment, when CPAS starts up it can schedule the Expiration Manager to run the next time a service will expire. The Expiration Manager is a start-up service so it is guaranteed to always be able to schedule itself to run. It will also be listening for changes in the config that would change the time of the next expiring service. If this is the very first time that CPAS is started then the above element will likely not exist. In that case it can create the element and add it to domain.xml with the given defaults.

In accordance with an embodiment, the Expiration Manager can perform a sanity check on the element when it starts—it will make sure there is one and only one such element and that the values make sense.

In accordance with an embodiment, auto-delete is true by default—but the default reservation-type is PERMANENT. Thus if the administrator does nothing, the system will not surprise them by deleting the service.

In accordance with an embodiment, to avoid performance problems the Expiration Manager can start a few minutes after the server starts. For example, an exemplary configuration can be:

```
<serviceexpirationmanager wakeupinterval=" PT12H" autodelete=" false"
autodeletewait=" P1D" enabled="true"
defaultexpirationtype="PERMANENT"
    <reservationtypes>
        <reservationtype name="short" duration="P2W1D" autodelete="true"
            autodeletewait="0" notify="P1D"/>
        <reservationtype name="medium" duration="P6M" autodelete="true"
            autodeletewait="P1DT12H" notify="P1W, P1D"/>
        <reservationtype name="long" duration="P1Y" autodelete="false"
            autodeletewait="P1W"/>
        <reservationtype name="ultrashort" duration="P2D"
        autodelete="true"
            autodeletewait="P1M, P2D, P1D"/>
        <reservationtype name="PERMANENT" duration="1"
        autodelete="false"
            autodeletewait=""notify=""/>
    </reservationtypes>
</expirationservice>
```

In accordance with an embodiment, reservation-type element will represent various reservations allowed in the system. The out-of-the-box default is PERMANENT. A Platform Administrator may change the default using setdefaultreservation-type command. The function isExpired( ) returns true if the expiration-time is sometime in the past. The function ExpireInfo getAllExpireInfos( ) get all the info about every Service. The function getExpired( ) returns a (possibly empty, but never null) Collection of all expired services; it simply calls isExpired( ) on every service. The function java.util.Date getExpirationTime( ) returns the expiration-time as a Date object. The function void setExpirationTime(java.util.Date) sets the expiration-time; which will be called by the renew-service command.

Time Denotation

In accordance with an embodiment, the system can support the international ISO 8601 standard for representing calendar times and durations.

Time Duration

In accordance with an embodiment, a duration is coded as a 'P' followed by years, months, days and/or a T followed by hours, minutes, seconds. The granularity level is generally hours, for example, 12 hours as a wakeup-interval (T12H). A half a year can be specified as P6M rather than P0.5Y.

Calendar Time

In accordance with an embodiment, text strings can be handled to denote calendar time. All times must be in legal ISO 8601 format. Before a calendar time field will be allowed to be updated, that time must be validated to make sense. All timestamps are UTC times. All dates must have a day. I.e. YYYY-MM is disallowed. Either of these formats are accepted: YYYY-MM-DD or YYYYMMDD The time can be appended to the date with a leading T like this: YYYY-MM-DDTHH:MM or YYYYMMDDTHH:MM. Seconds are allowed but will be ignored. Some example Calendar Dates in Designation English include:

| | |
|---|---|
| 2013-07-04T13:00 | 1 PM on the Fourth of July, 2013 |
| 20130901 | Sep. 1, 2013 |
| 20160531T18 | 6 PM, May 31, 2016 |
| 20141111T11:11:11 | 11:11:11 AM on Nov. 11, 2014 |

In accordance with an embodiment, scheduling backups is very different than setting up expiration times. For example, backups need to be specified like so: Backup every 30 minutes Backup on the first and fifteenth day of the month Backup every Sunday night at 20:15:03. Backup scheduling is much richer and more complex than expiration times, for example the concept of "every" is not needed for expiration.

In accordance with an embodiment, the Expiration can be setup like this: Expire in <some period of time from now> i.e., add that period to NOW to get the timestamp in the future. Do something <some period of time> before (or after) the expiration time.

In accordance with an embodiment, the configuration of expiration requires these two things: Absolute Time (e.g., Jan. 1, 2014, 21:12:12) Time Chunk (e.g., 4 months, 16 days, 5 hours.

In accordance with an embodiment, the Orchestration module maintains the concept of a 'Service Status', to which a new status, namely: EXPIRED can be added, which is defined that a Service is EXPIRED if and only if both of these conditions are true: 1. the service's expiration date is in the past; and 2. the service is stopped.

Status Transition

In accordance with an embodiment, a service's status can Transition To Expired: The EXPIRED status can only be reached from the STOPPED status. If the Expiration Manager wishes to make a service's status EXPIRED, it can first move the service to status STOPPED. At that point the status automatically becomes EXPIRED.

In the status change of Transition From Expired: The EXPIRED status can transition to 2 other possible statuses: 1. STOPPED. If a service is renewed, the status transitions from EXPIRED to STOPPED immediately; and 2. DESTROYING. A user is allowed to terminate an EXPIRED service. The Expiration Manager itself may also be allowed to do this if so configured. In that case the status goes directly from EXPIRED to DESTROYING.

Process for Service Expiration

Figure 24:
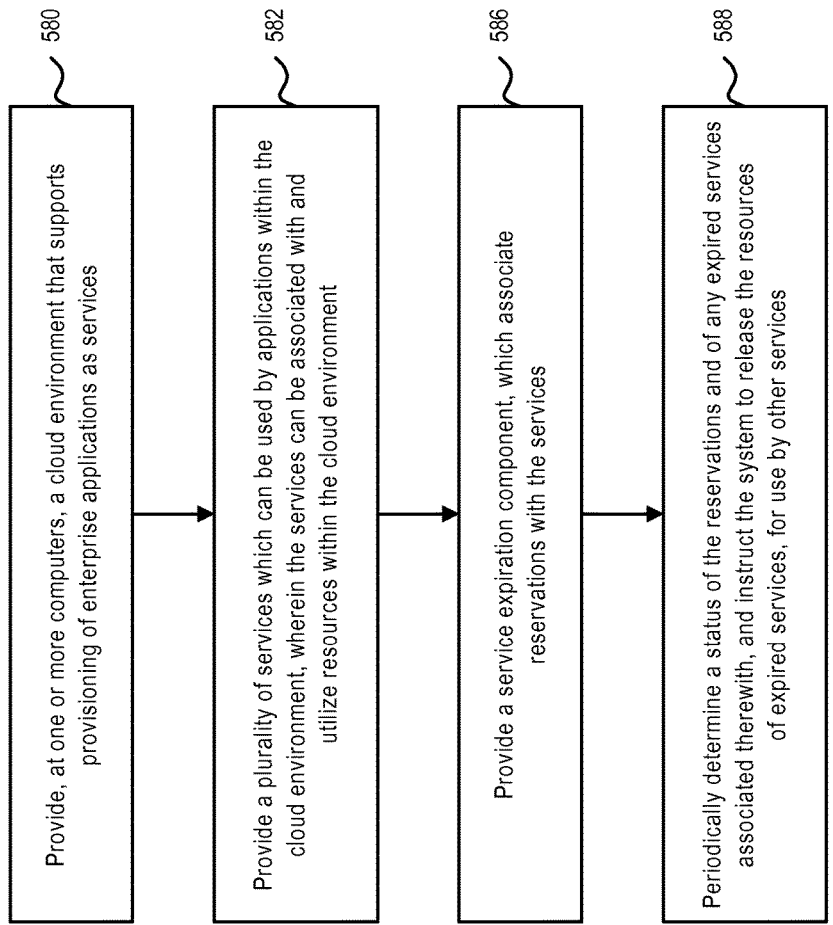
FIG. 24 is a flowchart of a method of providing service expiration in a cloud environment, in accordance with an embodiment.

FIG. 24 is a flowchart of a method of providing service expiration in a cloud environment, in accordance with an embodiment.

At step 580, a cloud environment that supports provisioning of enterprise applications as services is provided at one or more computers.

At step 582, a plurality of services which can be used by applications within the cloud environment are provided, wherein the services can be associated with and utilize resources within the cloud environment.

At step 586, a service expiration component is provided, which associates reservations with the services.

At step 588, a determination is periodically made as to the status of the reservations and of any expired services associated therewith, and instruct the system to release the resources of expired services, for use by other services.

Cloud Entity Locking

In accordance with an embodiment, the system includes a plurality of services which can be used by applications within the cloud environment, wherein the services can be associated with and utilize resources within the cloud environment. A service locking component provides locking of a cloud entity, such as a service's configuration or usage of resources, including determining a requested configuration or usage by each of the services of resources, and if the requested configuration is not allowed, or the usage by a particular service reaches an allocation of resources for that service, instructing the system to lock the entity, for example the service, at its current configuration or usage of resources.

In accordance with an embodiment, a PaaS platform, CloudLogic or other cloud environment can support locking a Service and service-type. A service may be locked for one or more reasons, for example a service is behaving badly and the Platform Administrator wants to quarantine the service in question. In this case the service will be stopped and locked and not allowed to be restarted till it has been un-locked.

As another example, locking a service may be used to stop scaling operations and keep the service running at the current state. In this case the service will continue to run and serve requests. However none of the scaling operations will be performed on the service. Locking a service can also be used to prevent auto-scale up; or to prevent unwanted configuration changes to the service.

Figure 25:
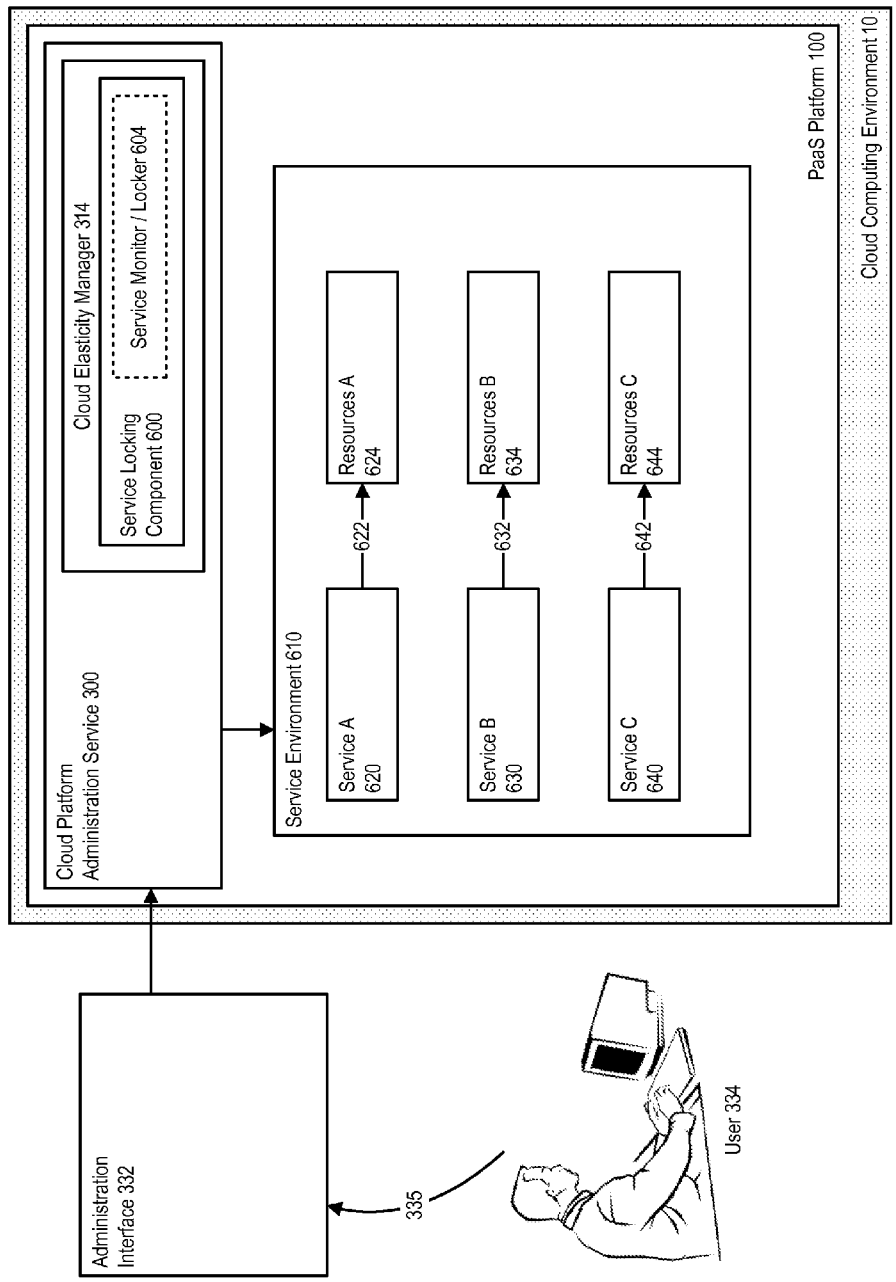
FIG. 25 illustrates service locking in a cloud environment, in accordance with an embodiment.

FIG. 25 illustrates service locking in a cloud environment, in accordance with an embodiment.

As shown in FIG. 25, a cloud environment elasticity manager can include a service locking component 600 with a service monitor/locker logic 604.

In accordance with an embodiment, a service environment 610 can include a plurality of services, such as, for example, service A 620, service B 630 and service C 640, each of which respectively are associate with 622, 632, 642 or otherwise use resources, including resources A 624, resources B 634, and resources C 644.

Figure 26:
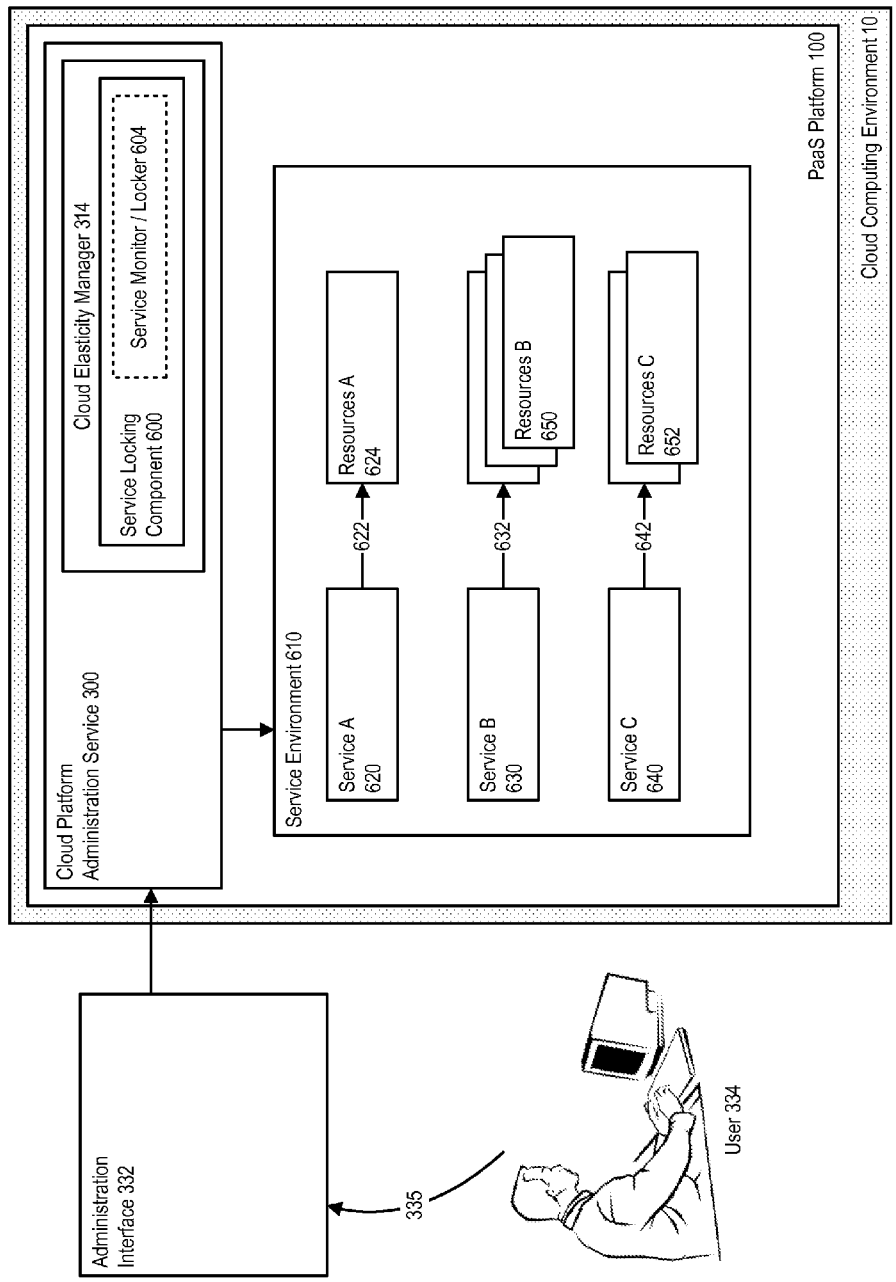
FIG. 26 further illustrates service locking in a cloud environment, in accordance with an embodiment.

FIG. 26 further illustrates service locking in a cloud environment, in accordance with an embodiment.

As shown in FIG. 26, as the system runs, each service can continue to use resources, including in this example increased usage by service B and service C of their resources 650, 652 respectively.

Figure 27:
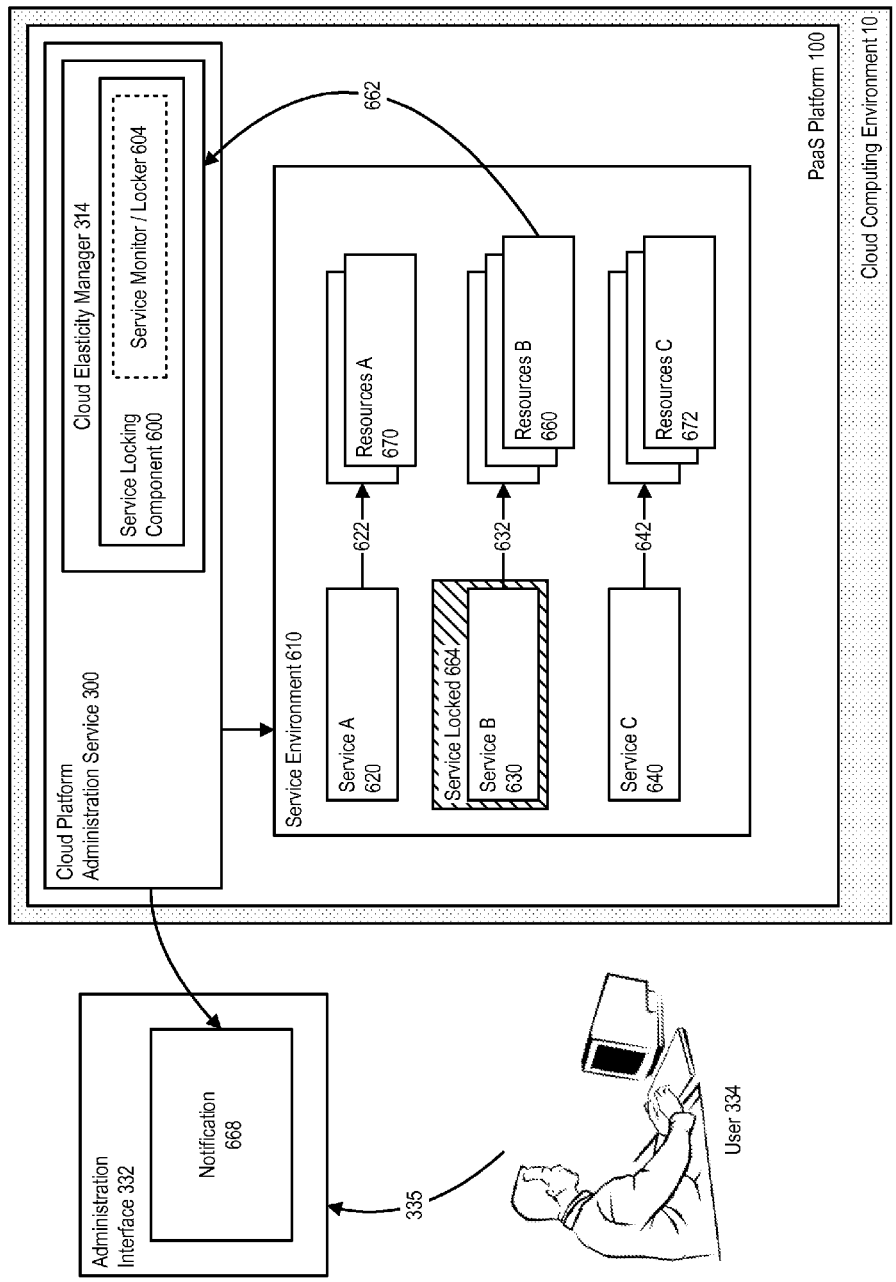
FIG. 27 further illustrates service locking in a cloud environment, in accordance with an embodiment.

FIG. 27 further illustrates service locking in a cloud environment, in accordance with an embodiment.

As shown in FIG. 27, if the system determines that a particular services resources 660 exceed a particular amount, for example a defined quota, then the service monitor can determine the usage 662, and cause the CPAS to lock that service 664. Other services can continue to add or otherwise utilize resources if necessary 670, 672.

Figure 28:
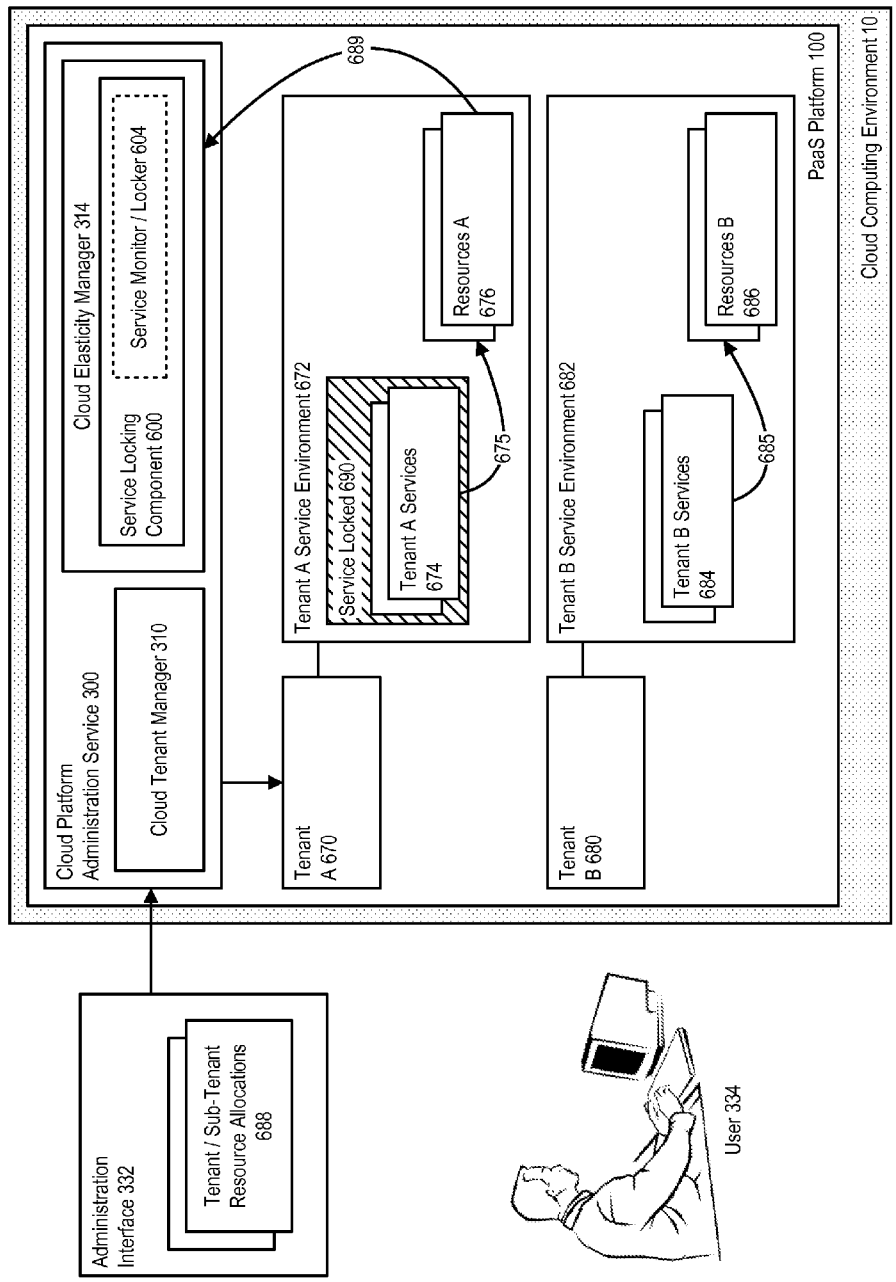
FIG. 28 illustrates service locking in a multitenant cloud environment, in accordance with an embodiment.

FIG. 28 illustrates service locking in a multitenant cloud environment, in accordance with an embodiment.

As shown in FIG. 28, in accordance with en embodiment, each of a plurality of tenants, for example tenants A 670 and tenants B 60, can be associated with their own service environment 672, 682 that allows services, e.g., services 674, 684, to be associated with 675, 685 or to otherwise utilize resources 676 686.

In accordance with an embodiment, a user can specify resource allocations or other restrictions, for example quotas, on services 688.

Information about resource usage can be communicated 689 to the service monitor/locker for use in optionally locking 690 service for particular tenants.

In addition to locking of services for purposes of controlling access to or utilization of available resources, in accordance with various embodiments, locking can also be used to lock services from unwanted configuration changes, or to lock other cloud entities, such as the console, from using resources or being reconfigured.

Use Cases

In accordance with an embodiment, the following are examples of various use cases that can use cloud entity locking:

Use Case 1—Quarantine:

For example, in a particular instance, the service is behaving improperly, e.g., using too many resources. The Platform Administrator would like to shut it down and disable it from starting again.

Use Case 2—No Service Console

For example, in a particular instance, a customer has the service configured well. He does not want anyone to be able to use the service-console.

Use Case 3—Locking Service Types

For example, locking can be useful for making sure a service-type may no longer be used to create new services based on it.

Use Case 4—Locking Service Resource Types

For example, locking can be useful for making sure a service-resource-type may no longer be used to create new service resources based on it.

Use Case 5—Locking Service Resources

For example, locking can be used to stop the Service Resource and not allow it to start again.

Use Case 6—Locking Elasticity

For example, in a particular instance, a user has started a service and does not wish for it to grow or to shrink (e.g., a customer prefers manual management of scaling, perhaps because the service is very critical). This use case is already handled by the Elasticity Manager Subcommands. The Cloud Administrator can use the these subcommands:

```
cadmin disable-auto-scaling
cadmin enable-auto-scaling
```

Use Case 7—Locking Configuration

For example, in a particular instance, a customer has the service configured perfectly. The service is critically important, and they do not want anybody to change the configuration of the service.

In accordance with various embodiments, the concepts of Locked and Unlocked vary depending on the target entity.

For example in accordance with an embodiment, a service when locked will be stopped at the time of locking, and will not be started again until unlocked.

A Service Type when locked can not be used for creating any new services, but existing services can continue to use it, and it can be used to create services.

A Resource when locked will be stopped at the time of locking, and can not be started again, until unlocked.

A Resource service when locked cannot be used for creating any new service Resources, but existing service resources can continue to use it, and it can be used to create new service resources.

In accordance with an embodiment, locking states are unrelated to lifecycle states, e.g., RUNNING, STOPPED, etc. In accordance with an embodiment, Commands can include lock-lock the entity; unlock-unlock the entity; list-locks-list locked entities—including locked service consoles; start-service-do not allow locked services to start; start-serviceresource-do not allow locked service resources to start; list-services; list-service-types; list-serviceresources; and list-serviceresource-types. Examples usages of some of these are described below.

Lock $ padmin lock --type type name

Generally, the system may not be able to distinguish all possible types from their name. For example, a use can have a service and a servicetype with the same name. Thus an additional parameter can be used to identify what kind of entity it is. Running lock on an entity that is already in this state is an error.

Unlock $ padmin unlock --type [ ] name

It is an error to run unlock on an entity that is not locked. After running the command successfully, all constraints caused by being locked are lifted.

List-Locks $padmin list-locks [--type type] [name] details:

In accordance with an embodiment, when no additional arguments are provided, all discoverable locked entities will be displayed. With a type argument but no parameter, all locked entities of that type will be displayed. With a type argument and a parameter, that type of entity with that name will be displayed—if it is locked. With a parameter but no type argument, all discoverable entities with that name that are locked will be displayed. After running the command successfully, all constraints caused by being locked are lifted.

Start-Service

The command will be modified. If a service has the locked attribute set to true, start-service will refuse to start it and emit an error message to that effect.

Start-Service-Resource

The command will be modified. If a resource has the locked attribute set to true, start-service-resource will refuse to start it and emit an error message to that effect.

List-Services

The command will be modified to display the LOCKED attribute for long listings

List-Service-Types

The command will be modified to display the LOCKED attribute for long listings

List-Service-Resources

The command will be modified to display the LOCKED attribute for long listings

List-Service-Resource-Types

The command will be modified to display the LOCKED attribute for long listings Note: list-tenants --long already shows the locked attribute Lock-Console The way an administrator can lock and unlock a console is as follows:

padmin lock --type SERVICE-CONSOLE servicename
padmin unlock --type SERVICE-CONSOLE servicename Configuration Element New or Modify Description service Modify Add 2 boolean attributes: locked and console-locked service-type Modify Add 1 boolean attribute: locked
resource Modify Add 1 boolean attribute: locked
resource-type Modify Add 1 boolean attribute: locked Service Element The service elements will all have 1 new required boolean attribute

```
<service name="s1" ... locked="true" consolelocked="true">
<servicetypename="st1" ... locked="true">
<resource name="sr1" ... locked="true">
<resourcetypename="srt1" ... locked="true">
```

Note that there is no config element representing a service's console, so it can be persisted by adding an attribute to the service element.

Service Config-Api

Config Element Type Method Name Description service boolean isLocked( ) returns true if the service is locked.

service boolean isConsoleLocked( ) returns true if the service's console is locked.

service-type boolean isLocked( ) returns true if the service-type is locked.

resource boolean isLocked( ) returns true if the resource is locked resource-type boolean isLocked( ) returns true if the resource-type is locked Process for Service Locking FIG. 29 is a flowchart of a method of supporting service locking in a cloud environment, in accordance with an embodiment.

At step 690, a cloud environment that supports provisioning of enterprise applications as services is provided at one or more computers.

At step 692, a plurality of services which can be used by applications within the cloud environment are provided, wherein the services can be associated with and utilize resources within the cloud environment.

At step 694, the service locker determines a requested configuration or usage by each of the services of resources.

At step 696, if the requested configuration is not allowed, or the usage by a particular service reaches an allocation of resources for that service, then the service locker instruct the system to lock the service at its current configuration or usage of resources.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for providing service expiration in a cloud computing environment, comprising:

a computer, including one or more processors, and a cloud environment executing thereon that supports provisioning of services, wherein the cloud environment includes, for each service type of a plurality of service types, a service definition package that includes information that enables the cloud environment to provide the service type within the cloud environment, wherein the service type can then be provisioned as an instance of the service;

wherein the services, upon provisioning, can be associated with and utilize resources within the cloud environment; and a service expiration component that associates each of the services that are defined by one or more service definition packages and have been provisioned within the cloud environment, with an expiration time, including receiving input that enables a plurality of reservation types to be defined and associated with the services, wherein each reservation type defines attributes including a duration to be associated with the execution and expiration of a service within the cloud environment, and associating reservations with particular ones of the services defined by the one or more service definition packages, to enable the particular ones of the services to utilize the resources of the cloud environment for periods of time as determined by their reservation types and corresponding expiration times; and periodically determines, based on their expiration times, a status of one or more expired services, and instructs the system to release the resources of the cloud environment that are utilized by the one or more expired services;

wherein the system enables configuration and management of tenants within the cloud environment, wherein the tenants utilize the services and resources within the cloud environment, wherein each tenant can be associated with a service environment within which services can deployed for use by that tenant.

2. The system of claim 1, wherein the system includes an administration interface, and communicates notifications of the expired services to the administration interface.

3. The system of claim 1, wherein reservations can be combined with quotas for particular tenants, which restrict their provisioning or usages of the services and resources.

4. A method of providing service expiration in a cloud computing environment, comprising:

providing, at a computer including one or more processors, a cloud environment that supports provisioning of services, wherein the cloud environment includes, for each service type of a plurality of service types, a service definition package that includes information that enables the cloud environment to provide the service type within the cloud environment, wherein the service type can then be provisioned as an instance of the service;

wherein the services, upon provisioning, can be associated with and utilize resources within the cloud environment; and providing a service expiration component that associates each of the services that are defined by one or more service definition packages and have been provisioned within the cloud environment, with an expiration time, including receiving input that enables a plurality of reservation types to be defined and associated with the services, wherein each reservation type defines attributes including a duration to be associated with the execution and expiration of a service within the cloud environment, and associating reservations with particular ones of the services defined by the one or more service definition packages, to enable the particular ones of the services to utilize the resources of the cloud environment for periods of time as determined by their reservation types and corresponding expiration times; and periodically determines, based on their expiration times, a status of one or more expired services, and causes the resources of the cloud environment that are utilized by the one or more expired services to be released;

wherein tenants within the cloud environment utilize the services and resources within the cloud environment, wherein each tenant can be associated with a service environment within which services can deployed for use by that tenant.

5. The method of claim 4, further comprising providing an administration interface, and communicating notifications of the expired services to the administration interface.

6. The method of claim 4, wherein reservations can be combined with quotas for particular tenants, which restrict their provisioning or usages of the services and resources.

7. A non-transitory computer readable storage medium, including instructions stored thereon which when read and executed by one or more computers cause the one or more computers to perform the steps comprising:

providing, at a computer including one or more processors, a cloud environment that supports provisioning of services, wherein the cloud environment includes, for each service type of a plurality of service types, a service definition package that includes information that enables the cloud environment to provide the service type within the cloud environment, wherein the service type can then be provisioned as an instance of the service;

wherein the services, upon provisioning, can be associated with and utilize resources within the cloud environment; and providing a service expiration component that associates each of the services that are defined by one or more service definition packages and have been provisioned within the cloud environment, with an expiration time, including receiving input that enables a plurality of reservation types to be defined and associated with the services, wherein each reservation type defines attributes including a duration to be associated with the execution and expiration of a service within the cloud environment, and associating reservations with particular ones of the services defined by the one or more service definition packages, to enable the particular ones of the services to utilize the resources of the cloud environment for periods of time as determined by their reservation types and corresponding expiration times; and periodically determines, based on their expiration times, a status of one or more expired services, and causes the resources of the cloud environment that are utilized by the one or more expired services be released;

wherein tenants within the cloud environment utilize the services and resources within the cloud environment, wherein each tenant can be associated with a service environment within which services can deployed for use by that tenant.

8. The non-transitory computer readable storage medium of claim 7, further comprising providing an administration interface, and communicating notifications of the expired services to the administration interface.

9. The non-transitory computer readable storage medium of claim 7, wherein reservations can be combined with quotas for particular tenants, which restrict their provisioning or usages of the services and resources.

10. The system of claim 1, wherein each of the particular ones of the services are associated with a timestamp when the service is created, wherein the timestamp is used by the system to determine when the service is to be expired.

11. The system of claim 1, wherein each reservation type further defines attributes including at least one of service deletion or notification, to be performed upon expiration of the period of time determined by that reservation type.

12. The method of claim 4, wherein each of the particular ones of the services are associated with a timestamp when the service is created, wherein the timestamp is used to determine when the service is to be expired.

13. The method of claim 4, wherein each reservation type further defines attributes including at least one of service deletion or notification, to be performed upon expiration of the period of time determined by that reservation type.

14. The non-transitory computer readable storage medium of claim 7, wherein each of the particular ones of the services are associated with a timestamp when the service is created, wherein the timestamp is used to determine when the service is to be expired.

15. The system of claim 1, further comprising a plurality of service environments, wherein each service environment includes one or more services, and wherein each service within a service environment can be associated with a service reservation for use with that service in utilizing the resources within the cloud environment.

16. The system of claim 1, wherein an expiration time can be associated with a service when the service is created.

17. The system of claim 1, further comprising stopping the one or more expired services prior to releasing the resources of the cloud environment that are utilized by the one or more expired services, for use by other ones of the services.

18. The method of claim 4, further comprising providing a plurality of service environments, wherein each service environment includes one or more services, and wherein each service within a service environment can be associated with a service reservation for use with that service in utilizing the resources within the cloud environment.

19. The method of claim 4, wherein an expiration time can be associated with a service when the service is created.

20. The method of claim 4, further comprising stopping the one or more expired services prior to releasing the resources of the cloud environment that are utilized by the one or more expired services, for use by other ones of the services.

* * * * *